US009046694B2

(12) United States Patent
Hirata

(10) Patent No.: US 9,046,694 B2
(45) Date of Patent: Jun. 2, 2015

(54) COOLING APPARATUS FOR ENDOSCOPE AND ENDOSCOPE SYSTEM

(75) Inventor: Yasuo Hirata, Tokyo (JP)

(73) Assignee: OLYMPUS MEDICAL SYSTEMS CORP. (JP)

( * ) Notice: Subject to any disclaimer, the term of this patent is extended or adjusted under 35 U.S.C. 154(b) by 1614 days.

(21) Appl. No.: 12/048,292

(22) Filed: Mar. 14, 2008

(65) Prior Publication Data
US 2008/0242927 A1 Oct. 2, 2008

(30) Foreign Application Priority Data

Mar. 19, 2007 (JP) ................................ P2007-070982

(51) Int. Cl.
*A61B 1/00* (2006.01)
*A61B 1/04* (2006.01)
*A61B 1/12* (2006.01)
*G01N 21/00* (2006.01)
*G02B 23/24* (2006.01)

(52) U.S. Cl.
CPC .................................. *G02B 23/2492* (2013.01)

(58) Field of Classification Search
CPC ........... A61B 1/00119; A61B 1/00154; A61B 1/00131; A61B 1/00135; A61B 1/015; A61B 1/12; A61B 1/28; G01N 21/954; F41A 31/02; G02B 23/2476; G02B 23/2492
USPC ................. 600/121–125, 127, 129, 155–159, 600/104–106, 114; 356/241.1–241.6
See application file for complete search history.

(56) References Cited

U.S. PATENT DOCUMENTS

| 4,643,022 | A | | 2/1987 | Werlberger et al. |
| 4,920,961 | A | * | 5/1990 | Grossi et al. ..................... 606/14 |
| 5,486,155 | A | * | 1/1996 | Muller et al. .................. 600/137 |
| 5,697,888 | A | * | 12/1997 | Kobayashi et al. ........... 600/159 |
| 7,121,098 | B2 | | 10/2006 | Hatcher |

(Continued)

FOREIGN PATENT DOCUMENTS

| JP | 55-45380 | 3/1980 |
| JP | 56-004104 | 1/1981 |

(Continued)

OTHER PUBLICATIONS

Office Action issued by the Japanese Patent Office on Jul. 26, 2011 in connection with corresponding Japanese Patent Application No. 2005-281468 and English Translation thereof.

(Continued)

*Primary Examiner* — Ryan Henderson
(74) *Attorney, Agent, or Firm* — Ostrolenk Faber LLP

(57) ABSTRACT

The endoscope cooling device is to cool an insertion portion having an observation portion at the distal end. The device is provided with an inner sheath into which the distal end portion of the insertion portion including the observation portion is inserted to form a first flow path of a cooling fluid between the outer circumferential face of the insertion portion and the inner circumferential face of the inner sheath, an outer sheath into which the inner sheath is inserted to form a second flow path of the cooling fluid between the outer circumferential face of the inner sheath and the inner circumferential face of the outer sheath, a regulating means for regulating the distal end portion in moving at least either through the inner sheath or the outer sheath, and a fluid supply means for supplying the cooling fluid to the first flow path and the second flow path.

5 Claims, 46 Drawing Sheets

(56) References Cited

U.S. PATENT DOCUMENTS

| | | |
|---|---|---|
| 2005/0085692 A1* | 4/2005 | Kiehn et al. .................. 600/130 |
| 2005/0281520 A1 | 12/2005 | Kehoskie et al. |
| 2006/0038988 A1 | 2/2006 | Thermos |
| 2006/0217693 A1* | 9/2006 | Gowda et al. .................. 606/15 |

FOREIGN PATENT DOCUMENTS

| | | |
|---|---|---|
| JP | 57-045515 | 3/1982 |
| JP | 57-200003 | 12/1982 |
| JP | S58-1906 | 1/1983 |
| JP | S58-182911 | 12/1983 |
| JP | S58-184200 | 12/1983 |
| JP | S59-127738 | 8/1984 |
| JP | 61-171018 | 10/1986 |
| JP | S61-203715 | 12/1986 |
| JP | H1-94914 | 6/1989 |
| JP | 01-183620 | 7/1989 |
| JP | H2-14539 | 1/1990 |
| JP | 02-038950 | 2/1990 |
| JP | 02-250017 | 10/1990 |
| JP | 2-136214 | 11/1990 |
| JP | 02-278219 | 11/1990 |
| JP | H4-9010 | 1/1992 |
| JP | 04-258915 | 9/1992 |
| JP | 05-150171 | 6/1993 |
| JP | 05-75721 | 10/1993 |
| JP | 05-297289 | 11/1993 |
| JP | 09-033728 | 2/1997 |
| JP | 09-238896 | 9/1997 |
| JP | 2000-046482 | 2/2000 |
| JP | 2001-104489 | 4/2001 |
| JP | 2003-038437 | 2/2003 |
| JP | 2005-342010 | 12/2005 |
| JP | 2007-065234 | 3/2007 |

OTHER PUBLICATIONS

Office Action issued by the Japanese Patent Office on Jun. 14, 2011 in connection with corresponding Japanese Patent Application No. 2005-250608 and English Translation thereof.

Office Action issued by the Japanese Patent Office on Jun. 28, 2011 in connection with corresponding Japanese Patent Application No. 2005-299825 and English Translation thereof.

Office Action issued by the Japanese Patent Office on Jun. 12, 2012 in connection with corresponding Japanese Patent Application No. 2007-070982 and English Translation thereof.

* cited by examiner

COOLING APPARATUS FOR ENDOSCOPE AND ENDOSCOPE SYSTEM

CROSS-REFERENCE TO RELATED APPLICATIONS

Priority is claimed on Japanese Patent Application No. 2007-070982 filed on Mar. 19, 2007, the content of which is incorporated herein by reference.

BACKGROUND OF THE INVENTION

1. Field of the Invention

The present invention relates to an endoscope cooling device to be attached at an insertion portion of an endoscope for observing a test substance and to an endoscope system including the endoscope cooling device and the endoscope.

2. Description of Related Art

Conventionally, there has been used an endoscope having an insertion portion, which can be inserted into a test substance in order to make observable a narrowed part such as a duct for which an observer is, otherwise, unable to make a direct visual observation (for example, refer to Japanese Unexamined Patent Application, First Publication No. 2005-342010). An observation portion such as a solid-state image sensor (for example, a CCD) is disposed at the distal end of an insertion portion of the endoscope, thus making it possible to observe a test substance in the vicinity of the distal end of the insertion portion. Further, an illuminating means is installed at the distal end of the insertion portion, thus making it possible to illuminate the vicinity of the distal end of the insertion portion and preferably observe the test substance.

In this instance, since the insertion portion of the endoscope is provided as described above at the distal end with an observation portion such as a solid-state image sensor (for example, a CCD) and an illuminating means, it is restricted to a maximum allowable working temperature of up to about 80° C., in relation to heat-resistant temperatures of these devices taken into account. As a result, when the endoscope is used as an industrial endoscope in an attempt to observe the interior of an engine, the structure of which is complicated, it is impossible to make an observation as it is with the insertion portion inserted therein because the temperatures are raised to 200° C. or higher at completion of operation. Thus, the endoscope finds limited application. Therefore, an industrial endoscope has been proposed, which allows an operator to make an observation under the above high-temperature environment (for example, refer to Japanese Unexamined Patent Application, First Publication No. 2000-46482).

The industrial endoscope disclosed in the document (Japanese Unexamined Patent Application, First Publication No. 2000-46482) is provided with an inner flexible body, an insertion portion having an outer flexible body installed by forming a space for flowing a fluid between itself and the inner flexible body, an outer casing fixed to the proximal end of the outer flexible body, the interior of which is communicatively connected to a space in which the fluid flows, and a valve fixed to the outer casing and allowing the fluid to flow into the outer casing. Then, the valve is connected to a fluid supply device for supplying a cooling fluid by using a supply duct, thus allowing the cooling fluid to flow, by which the cooling fluid is released from the distal end from the interior of the outer casing through a space between the inner flexible body and the outer flexible body. Thus, the endoscope can be used at high temperatures due to cooling by the cooling fluid.

SUMMARY OF THE INVENTION

A first aspect of the endoscope cooling device of the present invention is an endoscope cooling device for cooling an insertion portion having an observation portion at the distal end. The endoscope cooling device is provided with an inner sheath into which the distal end portion of the insertion portion including the observation portion is inserted to form a first flow path of a cooling fluid between the outer circumferential face of the insertion portion and the inner circumferential face of the inner sheath, an outer sheath into which the inner sheath is inserted to form a second flow path of the cooling fluid between the outer circumferential face of the inner sheath and the inner circumferential face of the outer sheath, and a regulating means for regulating the distal end portion in moving at least either through the inner sheath or the outer sheath, and a fluid supply means for supplying the cooling fluid to the first flow path and the second flow path.

In the first aspect of the endoscope cooling device of the present invention, the regulating means may regulate the distal end portion in moving rotationally around the central axis at least either through the inner sheath or the outer sheath or may regulate the distal end portion in moving back and forth in the direction of the central axis at least either through the inner sheath or the outer sheath.

In the first aspect of the endoscope cooling device of the present invention, the regulating means may be provided with a raised portion installed at one end of the inner sheath and the outer sheath or the distal end portion and a recessed portion installed at the other end of the inner sheath and the outer sheath or the distal end portion and engaged with the raised portion.

In the first aspect of the endoscope cooling device of the present invention, the regulating means may be provided with an auxiliary member fitted to the outside of the distal end portion. In this instance, the raised portion or the recessed portion is preferably formed on the auxiliary member.

The first aspect of the endoscope cooling device of the present invention may be provided with a cap attached to the distal end of the outer sheath to close the distal end. In this instance, the regulating means is preferably provided with a fixing portion fixed to the distal end portion and an engagement portion projecting outwardly from the fixing portion and held between the distal end of the outer sheath and the cap.

In the first aspect of the endoscope cooling device of the present invention, the regulating means may be provided with a first annular member elastically deformed and fitted between the outer circumferential face of the distal end portion and the inner circumferential face of the inner sheath and a second annular member elastically deformed and fitted between the outer circumferential face of the inner sheath and the outer sheath.

In the first aspect of the endoscope cooling device of the present invention, an opening portion penetrating through the inner sheath in a radial direction may be formed at the distal end of the inner sheath.

The first aspect of the endoscope cooling device of the present invention may be provided with an arrangement means for arranging the distal end portion at the center of the inner sheath.

In the first aspect of the endoscope cooling device of the present invention, the regulating means may also act as the arrangement means.

The first aspect of the endoscope cooling device of the present invention may be provided with a cap attached at the distal end of the outer sheath to close the distal end. In this instance, the cooling fluid preferably flows through the first flow path toward the distal end of the insertion portion and turns back in the vicinity of the distal end of the inner sheath to flow through the second flow path toward the proximal end of the outer sheath.

In the first aspect of the endoscope cooling device of the present invention, the cooling fluid may be supplied in a circulating manner to the first flow path and the second flow path.

The first aspect of the endoscope cooling device of the present invention may be provided with a first sealing member arranged between the outer circumferential face at the proximal end of the insertion portion and the inner circumferential face of the inner sheath to seal the first flow path and a second sealing member arranged between the outer circumferential face at the proximal end of the inner sheath and the inner circumferential face of the outer sheath to seal the second flow path.

In the first aspect of the endoscope cooling device of the present invention, at least one of the first sealing member and the second sealing member may be an elastically deformable rubber member.

In the first aspect of the endoscope cooling device of the present invention, the cooling fluid may be discharged backward from the proximal end of the outer sheath.

A second aspect of the endoscope cooling device of the present invention is a endoscope cooling device for cooling an insertion portion having an observation portion at the distal end, which is provided with a sheath into which the distal end portion of the insertion portion including the observation portion is inserted to form a flow path of a cooling fluid between the outer circumferential face of the insertion portion and the inner circumferential face of the sheath, a regulating means for regulating the distal end portion in moving through the sheath, and a fluid supply means for supplying the cooling fluid to the flow path.

In the second aspect of the endoscope cooling device of the present invention, the regulating means may regulate the distal end portion in moving rotationally around the central axis through the sheath or may regulate the distal end portion in moving back and forth through the sheath in the direction of the central axis.

In the second aspect of the endoscope cooling device of the present invention, the regulating means may be provided with a raised portion installed at one end of either the sheath or the distal end portion and a recessed portion installed at the other end of either the sheath or the distal end portion and engaged with the raised portion.

In the second aspect of the endoscope cooling device of the present invention, the regulating means may be provided with an auxiliary member fitted to the outside of the distal end portion. In this instance, the raised portion or the recessed portion is preferably formed on the auxiliary member.

The second aspect of the endoscope cooling device of the present invention may be provided with an urging means for pressing the raised portion against the recessed portion.

In the second aspect of the endoscope cooling device of the present invention, the urging means may be a spring member or the cooling fluid flowing through the flow path toward the distal end of the insertion portion.

The second aspect of the endoscope cooling device of the present invention may be provided with an arrangement means for arranging the distal end portion at the center of the sheath.

In the second aspect of the endoscope cooling device of the present invention, the arrangement means may be a raised portion projecting from one end of either the outer circumferential face of the distal end portion or the inner circumferential face of the sheath and in contact with the other end of either the outer circumferential face of the distal end portion or the inner circumferential face of the sheath.

In the second aspect of the endoscope cooling device of the present invention, the regulating means may also act as the arrangement means.

In the second aspect of the endoscope cooling device of the present invention, the cooling fluid may flow through the flow path toward the distal end of the insertion portion and be discharged forward from the distal end of the sheath.

The second aspect of the endoscope cooling device of the present invention may be provided with a cap having an opening portion and attached at the distal end of the sheath. In this instance, it is preferable that the cooling fluid flows through the flow path toward the distal end of the insertion portion and is discharged in front of the sheath through the opening portion of the cap.

The second aspect of the endoscope cooling device of the present invention may be provided with a cap attached at the distal end of the sheath to close the distal end. In this instance, an opening portion penetrating through the sheath in a radial direction is formed at the distal end of the sheath. The cooling fluid may flow through the flow path toward the distal end of the insertion portion and be discharged around the sheath through the opening portion of the sheath.

The second aspect of the endoscope cooling device of the present invention may be provided with a porous member arranged between the outer circumferential face at the distal end of the insertion portion and the inner circumferential face of the sheath. In this instance, water used as the cooling fluid may flow through the flow path toward the distal end of the insertion portion and be supplied to the porous member.

In the second aspect of the endoscope cooling device of the present invention, the sheath may be partially composed of a porous member. In this instance, it is preferable that the cooling fluid flows through the flow path toward the distal end of the insertion portion and is discharged around the sheath through the porous member.

In the second aspect of the endoscope cooling device of the present invention, the sheath may be closed at the distal end. In this instance, it is preferable that the cooling fluid flows through a working channel of the insertion portion and is discharged from an outlet of the working channel installed at the distal end portion, flowing through the flow path toward the proximal end of the insertion portion.

The second aspect of the endoscope cooling device of the present invention may be provided with a sealing member arranged between the outer circumferential face at the proximal end of the insertion portion and the inner circumferential face of the sheath to seal the flow path.

In the second aspect of the endoscope cooling device of the present invention, the sealing member may be an elastically deformable rubber member.

The endoscope system of the present invention is provided with any one of the above-described endoscope cooling devices and an endoscope having the insertion portion.

DESCRIPTION OF THE PREFERRED EMBODIMENTS

First Embodiment

An explanation will be made for a first embodiment of the endoscope system of the present invention by referring to FIG. 1 to FIG. 4.

Figure 1:
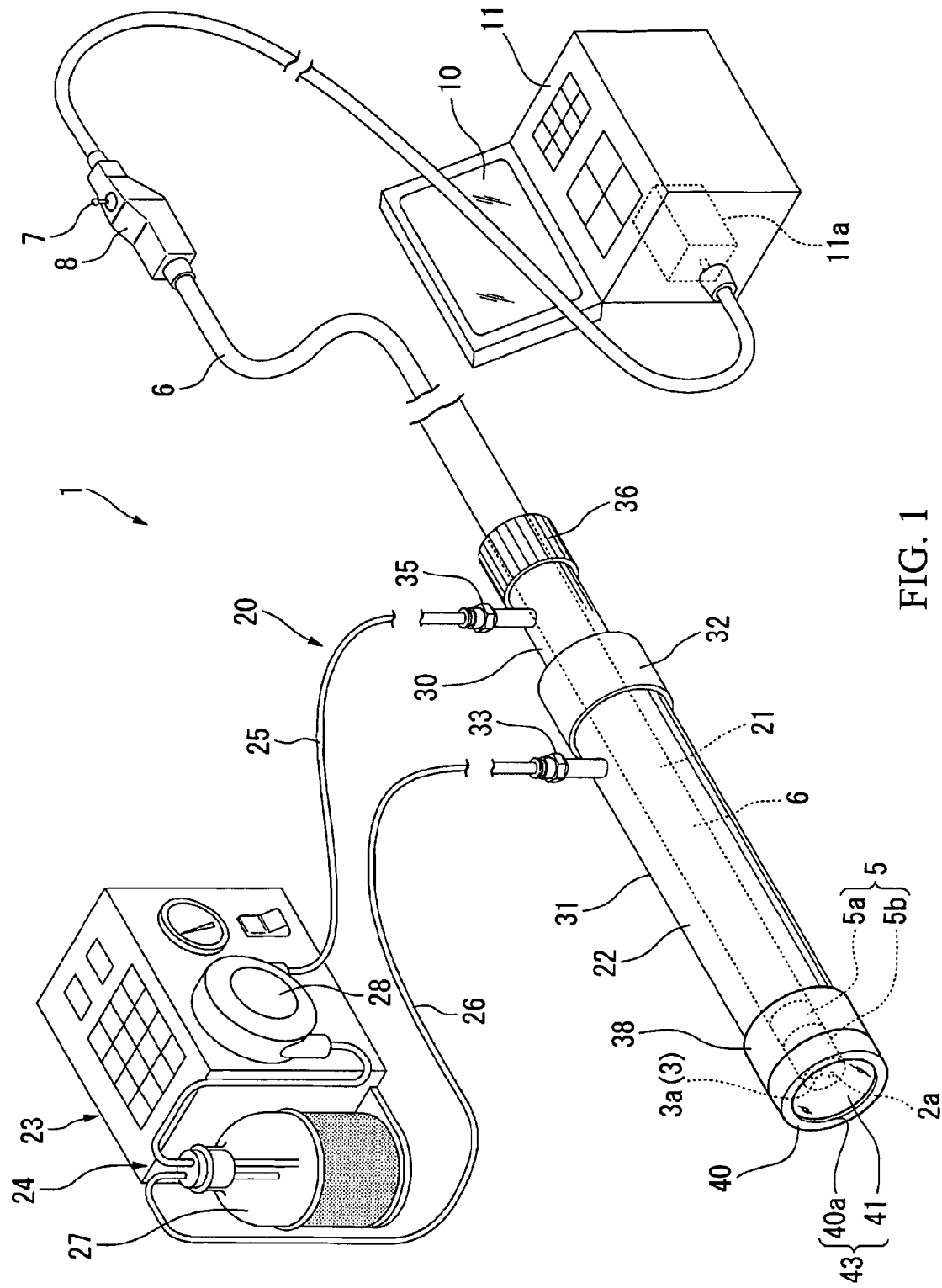
FIG. 1 is an overall block diagram showing a first embodiment of the endoscope system of the present invention.

As shown in FIG. 1, the endoscope system of the present embodiment is provided with a direct-viewing type endoscope 1 and an endoscope cooling device 20, which allows a cooling fluid such as air and water to flow into an insertion portion 6 of the endoscope 1, thereby cooling the distal end of the insertion portion 6.

The endoscope 1 is provided with an elongated and flexible insertion portion 6 operable in a bending manner, and an operating portion 8 equipped with a joy stick 7 for operating the insertion portion 6 in a bending manner. The insertion portion 6 is provided at the distal end with a distal end portion 5 having an illuminating portion 2 and an observation portion 3. The illuminating portion 2 is an LED emitting light from a supply of electricity. The observation portion 3 is provided with an observation lens 3a exposed from the distal end portion 5 and a CCD (not illustrated) built into the distal end portion 5 to pick up an image enlarged by the observation lens 3a. The distal end portion 5 is provided with a main body portion 5a and an adaptor 5b attached at the distal end of the main body portion 5a in a removable manner. Further, the endoscope 1 is provided with a device main body 11 at which a display portion 10 is disposed for visually displaying a test substance picked up by the CCD. Further, an electric source 11a is built into the device main body 11, which is connected to the LED, as an illuminating portion 2, by an electrical wire (not illustrated) inserted into the insertion portion 6, by which the LED can emit light.

As shown in FIG. 1, the endoscope cooling device 20 is provided with a sheath 22 which forms a cooling flow path 21 for allowing a cooling fluid to flow between the outer circumferential face of the insertion portion 6 and itself and is attached at the distal end of the insertion portion 6, and a fluid flowing portion 23 for supplying the cooling fluid to the cooling flow path 21 and recovering the cooling fluid. The fluid flowing portion 23 is provided with a cooling fluid supply source 24, a charge pipe 25 for supplying the cooling fluid from the supply source 24 to the cooling flow path 21, and a discharge pipe 26 for recovering the cooling fluid into the supply source 24, all of which are connected to the cooling flow path 21 via connection joints 35, 33 to be described later. Further, the supply source 24 is provided with a tank 27 for reserving the cooling fluid and a pump 28 for supplying the cooling fluid inside the tank 27 to the charge pipe 25.

Figure 2:
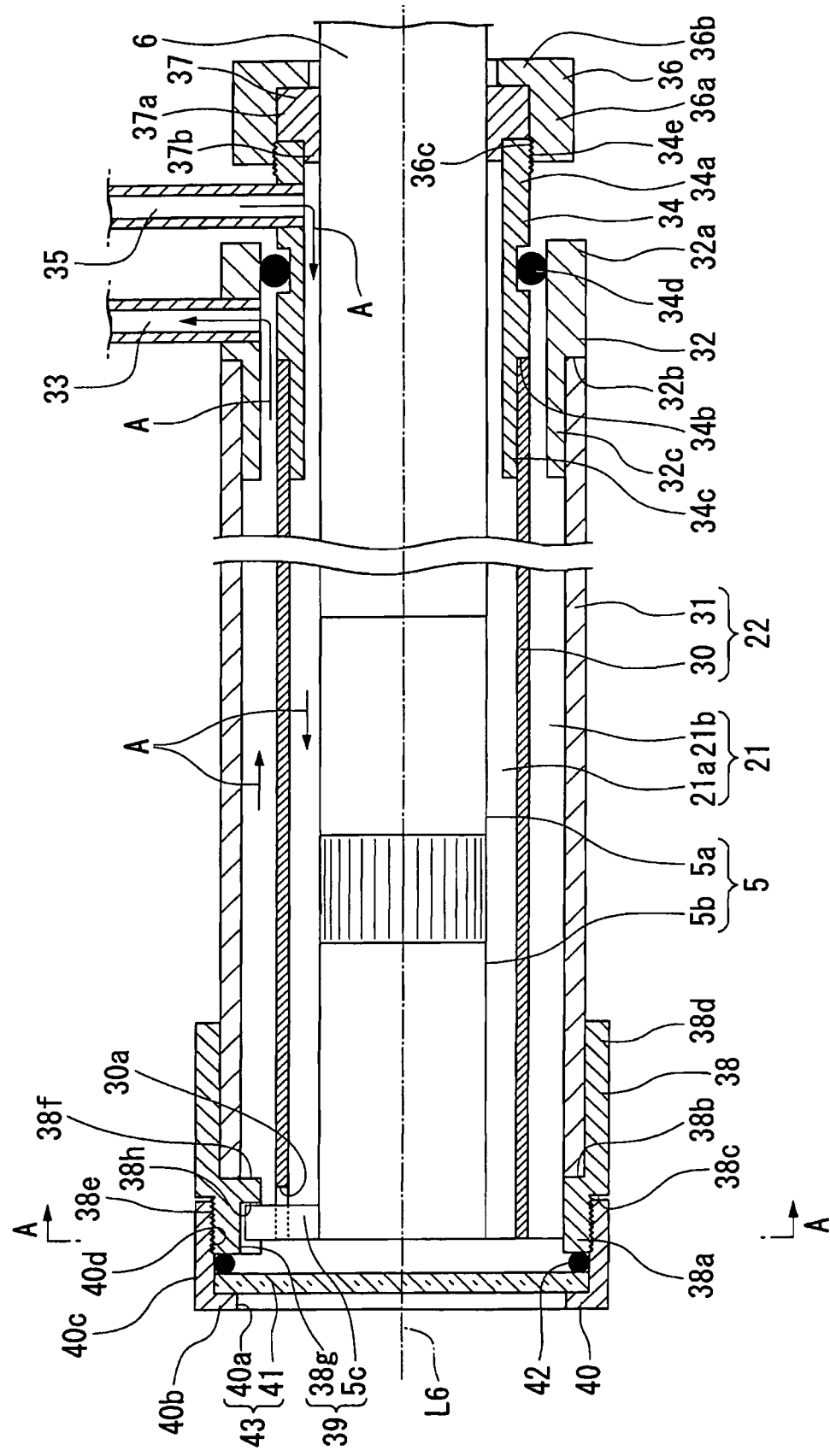
FIG. 2 is a sectional side view of the sheath of the endoscope cooling device included in the first embodiment.
Figure 3:
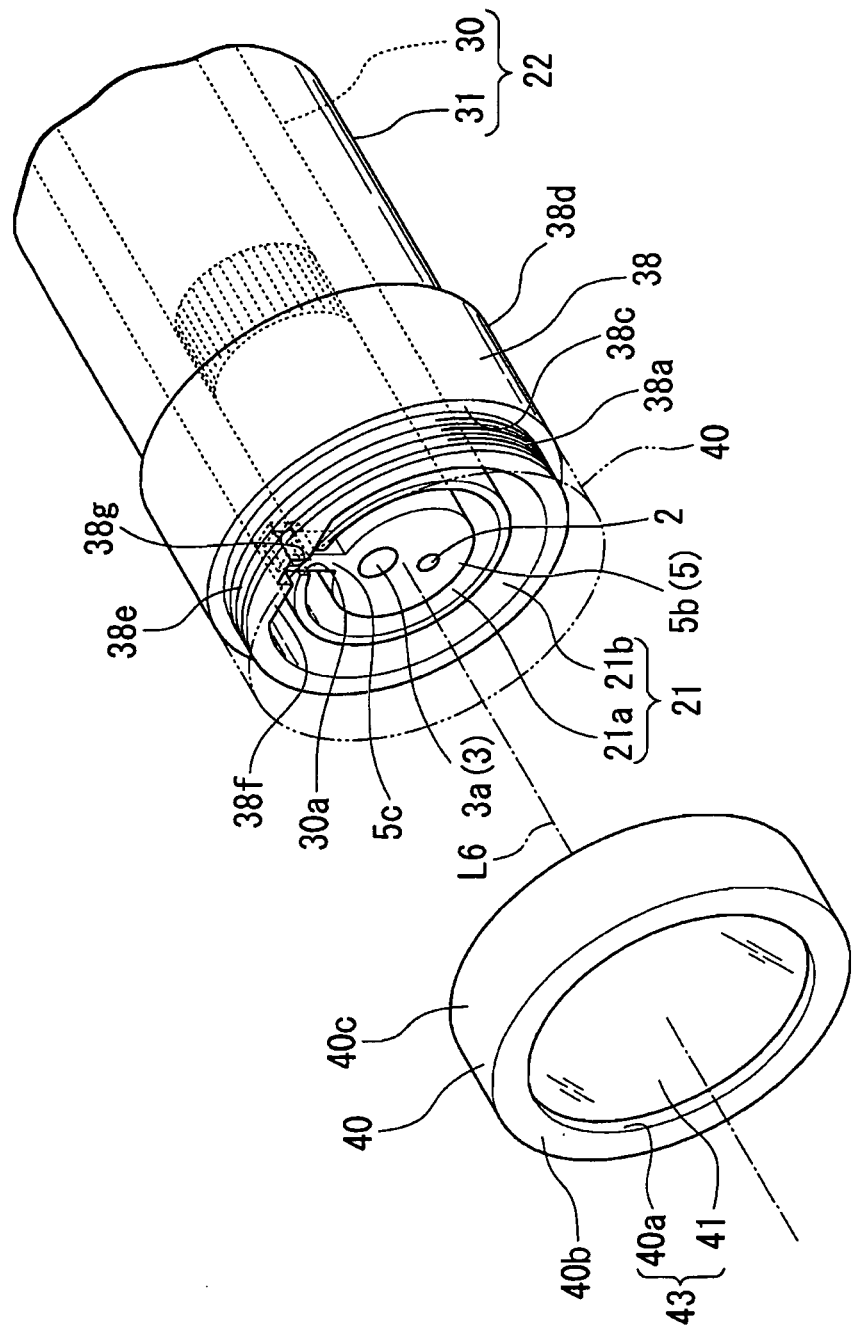
FIG. 3 is an exploded perspective view of the distal end portion of the sheath constituting the endoscope cooling device included in the first embodiment.

As shown in FIG. 1 to FIG. 3, the sheath 22 of the present embodiment is an elastic-type sheath made of a resin such as PTFE and provided with an inner sheath 30 of an approximately circular cross section which forms a first cooling flow path 21a for allowing a cooling fluid A to flow between the outer circumferential face of the insertion portion 6 and itself, with the distal end being opened, and an outer sheath 31 of an approximately circular cross section which forms a second cooling flow path 21b for allowing the cooling fluid A to flow between the outer circumferential face of the inner sheath 30 and itself. In addition, the sheath 22 may be a rigid-type sheath made of a metal member or the like. As shown in FIG. 2, an approximately tubular proximal end outer base 32 is fitted into the proximal end of the outer sheath 31. The proximal end outer base 32 has a main body portion 32a projecting from the proximal end of the outer sheath 31 and a fitting portion 32c having a step portion 32b from the main body portion 32a and reduced in diameter. The fitting portion 32c of the proximal end outer base 32 is fitted into the inner circumferential face of the outer sheath 31 until the proximal end of the outer sheath 31 comes in contact with the step portion 32b and is adhesively fixed to the outer sheath 31. A connection joint 33, which is connected to the discharge pipe 26 of the fluid flowing portion 23, is installed in a projecting manner at the main body portion 32a of the proximal end outer base 32, by which the second cooling flow path 21b is communicatively connected with the fluid flowing portion 23.

As shown in FIG. 2, an approximately tubular proximal end inner base 34 is fitted into the proximal end of the inner sheath 30. The proximal end inner base 34 has a main body portion 34a projecting from the proximal end of the inner sheath 30 and also projecting from the proximal end through the interior of the outer sheath 31 and a fitting portion 34c having a step portion 34b from the main body portion 34a and reduced in diameter. The fitting portion 34c of the proximal end inner base 34 is fitted into the inner circumferential face of the inner sheath 30 until the proximal end of the inner sheath 30 comes in contact with the step portion 34b and is adhesively fixed to the inner sheath 30. Further, an annular groove is formed on the outer circumferential face at the main body portion 34a of the proximal end inner base 34, and an O-ring 34d is fitted to the outside thereof. The O-ring 34d is elastically deformed and interposed between the outer circumferential face of the main body portion 34a of the proximal end inner base 34 and the inner circumferential face of the main body portion 32a of the proximal end outer base 32, thereby sealing the proximal end side of the second cooling flow path 21b between the inner sheath 30 and the outer sheath 31 and regulating it so that the cooling fluid A will not be discharged.

Further, a connection joint 35 to be connected with the charge pipe 25 of the fluid flowing portion 23 is installed at the main body portion 34a of the proximal end inner base 34 in a projecting manner, by which the first cooling flow path 21a is communicatively connected to the fluid flowing portion 23. Still further, a male thread portion 34a is formed on the proximal end outer circumferential face of the main body portion 34a of the proximal end inner base 34, with which a fixing member 36 is screwed. The fixing member 36 has an approximately tubular main body portion 36a and an inner flange portion 36b projecting to the inner circumferential face side at the proximal end of the main body portion 36a. A female thread portion 36c to be screwed with the male thread portion 34e of the proximal end inner base 34 is formed on the distal end inner circumferential face of the main body portion 36a of the fixing member 36. In addition, the inner diameter of the inner flange portion 36b of the fixing member 36 is set to be slightly larger than the outer diameter of the insertion portion 6, and the proximal end side of the insertion portion 6 attached to the inner sheath 30 is inserted thereinto.

At the interior of the main body portion 36a of the fixing member 36, a sealing member 37 is interposed between the proximal end of the proximal end inner base 34 and the inner flange portion 36b of the fixing member 36. The sealing member 37 is an approximately tubular member made of an elastically deformable material such as rubber and provided with a main body portion 37a held between the proximal end of the proximal end inner base 34 and the inner flange portion 36b of the fixing member 36 and a fitting portion 37b reduced in outer diameter from the main body portion 37a and fitted into the inner circumferential face side of the proximal end inner base 34. The outer diameter of the main body portion 37a of the sealing member 37 is set approximately equal to the inner diameter of the main body portion 36a of the fixing member 36. Further, the inner diameter of the main body portion 37a of the sealing member 37 and that of the fitting portion 37b are both set approximately equal to the outer diameter of the insertion portion 6 to be inserted thereinto. Therefore, if the fixing member 36 is tightened with respect to the proximal end inner base 34, with the insertion portion 6 being attached, the sealing member 37 held therebetween swells out to the inner circumferential face and the outer circumferential face, and the insertion portion 6 is fixed by the sealing member 37 to seal the proximal end of the first cooling flow path 21a formed between the insertion portion 6 and the inner sheath 30, thereby a cooling fluid A is regulated so as not to be discharged.

Figure 4:
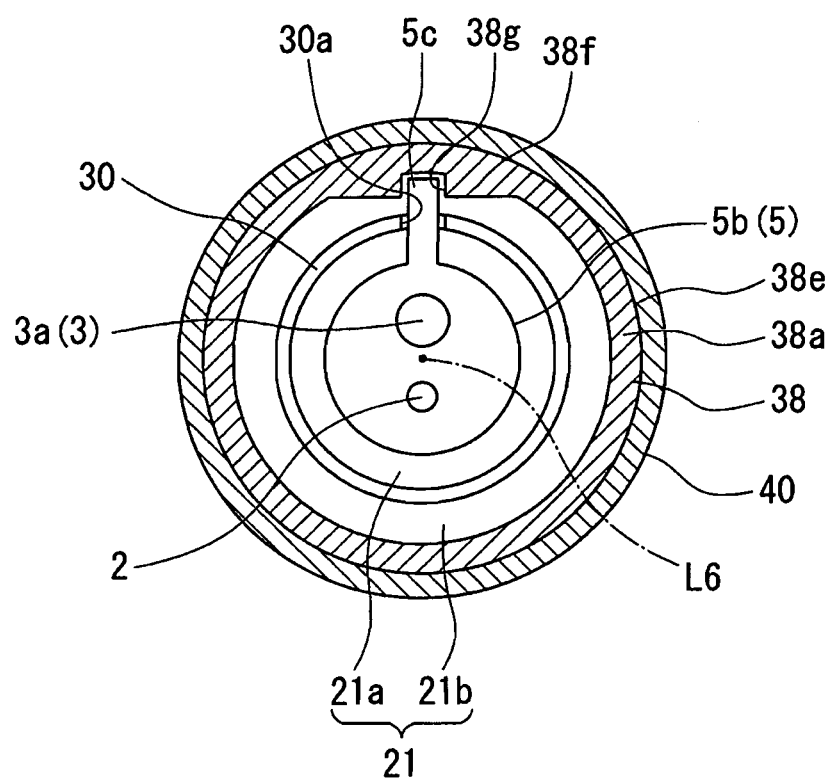
FIG. 4 is a sectional view taken along the cutting-plane line A to A in FIG. 2.

Further, as shown in FIG. 2 to FIG. 4, an approximately tubular distal end outer base 38 is fitted to the outside of the distal end of the outer sheath 31. The distal end outer base 38 has a main body portion 38a projecting from the distal end of the outer sheath 31 and a fitting portion 38d, the outer diameter and the inner diameter of which are expanded from the main body portion 38a, respectively having step portions 38b, 38c. The fitting portion 38d of the distal end outer base 38 is fitted to the outside of the outer sheath 31 until the step portion 38b comes in contact with the distal end of the outer sheath 31 and is adhesively fixed to the outer sheath 31. The main body portion 38a of the distal end outer base 38 is provided with a male thread portion 38d on the outer circumferential face. It is also provided with an engagement portion 38f projecting on the inner circumferential face of the outer sheath 31. The engagement portion 38f is provided with an engaging groove 38g, which is an engaging recessed portion extending in the direction of the central axis L6 at the insertion portion 6 to be attached. The engaging groove 38b is opened at the distal end but closed at the proximal end, thereby forming an end face 38h.

Still further, a notch 30a as an opening portion is formed at a position opposing the engaging groove 38g on the distal end of the inner sheath 30. Further, an engaging raised portion 5c projecting to the outer circumferential face side corresponding to the engaging groove 38g is provided at an adaptor 5b of the distal end portion 5 of the insertion portion 6. The engaging raised portion 5c is inserted into the notch 30a of the inner sheath 30 and fitted into the engaging groove 38, with the insertion portion 6 being attached thereto. Therefore, the insertion portion 6 is regulated in moving rotationally around the central axis L6 due to an engagement of the engaging groove 38g with the engaging raised portion 5c, and the engaging raised portion 5c is guided into the engaging groove 38g and able to move back and forth in the direction of the central axis L6 at the insertion portion 6. However, the engaging raised portion 5c is in contact with the end face 38h of the engaging groove 38g and regulated in moving to the proximal end. In other words, a regulating means 39 is composed of the engaging groove 38g and the engaging raised portion 5c.

In addition, a cap 40 is screwed with the male thread portion 38e of the main body portion 38a at the distal end outer base 38. The cap 40 has a main body portion 40b having an opening portion 40a approximately in a plate shape and an approximately tubular outward fitting portion 40c projecting to the proximal end from the main body portion 40b and fitted to the outside of the distal end outer base 38. A female thread portion 40d is formed on the inner circumferential face of the outward fitting portion 40c of the cap 40 and screwed with the male thread portion 38e of the main body portion 38a of the distal end outer base 38. A cover glass 41 approximately in a plate shape and an O-ring 42 are also interposed between the main body portion 40b of the cap 40 and the distal end of the outer sheath 31 sequentially from the distal end side. Then, the cap 40 is tightened with respect to the distal end outer base 38, by which the cover glass 41 is used to close the opening portion 40a of the cap 40, and the O-ring 42 is elastically deformed to seal a space between the cover glass 41 and the distal end outer base 38. Thereby, a cooling fluid A is regulated so as not to be discharged from the respective distal ends of the first cooling flow path 21a and the second cooling flow path 21b. It is also possible to make an external observation via the cover glass 41 and the opening portion 40a of the cap 40 at the observation portion 3 of the thus attached insertion portion 6, in other words, a window portion 43 is composed of the cover glass 41 and the opening portion 40a.

Next, an explanation will be made for actions of the endoscope 1 and the endoscope cooling device 20, which constitute the endoscope system.

As shown in FIG. 1, where the endoscope 1 is used to observe a test substance, a sheath 22 of the endoscope cooling device 20 is attached at the distal end of the insertion portion 6. In order to attach the sheath 22 to the insertion portion 6, the distal end of the insertion portion 6 free of the adaptor 5b is first inserted into the sheath 22 and projected from the distal end of the sheath 22. After the adaptor 5b is attached to the distal end of the insertion portion 6, the distal end portion of the insertion portion 6 is drawn into the sheath 22 to position the engaging groove 38g with respect to the engaging raised portion 5c for engagement. Then, the cover glass 41, the O-ring 42 and the cap 40 are attached to the distal end of the sheath 22. As described above, the insertion portion 6 to which the sheath 22 has been attached is inserted into a test substance. In this instance, a pump 28 is actuated at a supply source 24 of the fluid flowing portion 23 shown in FIG. 1 to supply a cooling fluid A from the charge pipe 25. As shown in FIG. 2, the thus supplied cooling fluid A flows into a first cooling flow path 21a via a connection joint 35. In this instance, since the proximal end of the first cooling flow path 21a is sealed by a sealing member 37, the cooling fluid A flows into the distal end through the first cooling flow path 21a, without being discharged to the proximal end. Therefore, the insertion portion 6 is preferably cooled by the cooling fluid A flowing through the first cooling flow path 21a.

Next, as shown in FIG. 2, the cooling fluid A, which has flown into the distal end of the first cooling flow path 21a, is to flow to the outer circumferential face from the inner circumferential face of the inner sheath 30 by a distal end opening of the inner sheath 30 or a notch 30a, thereby flowing into a second cooling flow path 21b, because the distal end is closed by the cap 40, the cover glass 41 and the O-ring 42. Then, the cooling fluid A flows into the second cooling flow path 21b from the distal end to the proximal end thereof, and the insertion portion 6, which is positioned inside, is again cooled. Then, since the proximal end of the second cooling flow path 21b is closed by the O-ring 34d, the cooling fluid A flows into the discharge pipe 26 via the connection joint 33 at the proximal end of the second cooling flow path 21b without being discharged from the proximal end. Thereby, the cooling fluid A is subsequently discharged into a tank 27 of the supply source 24, and allowed to flow again from the charge pipe 25 to the first cooling flow path 21a, thus making it possible to cool the insertion portion 6. In other words, upon insertion into a test substance in a state where the endoscope cooling device 20 is attached to the insertion portion 6, the insertion portion 6 is repeatedly cooled, while the outer circumferential face and the distal end face thereof are covered with the cooling fluid A circulating through the first cooling flow path 21a, the second cooling flow path 21b and the fluid flowing portion 23. As a result, the circulating cooling fluid can be used to cool the insertion portion 6 effectively and at a low cost, and also an external test substance can be preferably observed via the window portion 43 by using the observation portion 3 of the insertion portion 6. Further, as described above, the cooling fluid A is allowed to circulate, thereby eliminating the possibility of cooling a test substance by the cooling fluid A flown into the test substance but making it possible to keep temperatures inside the test substance at a constant level and observe the test substance at the insertion portion 6.

In this instance, the engaging raised portion 5c of the regulating means 39 is engaged with the engaging groove 38g, by which the distal end portion 5 of the insertion portion 6 is regulated in moving rotationally around the central axis L6 through the sheath 22. Therefore, it is possible to prevent a change in the observation state due to the fact that the insertion portion 6 is rotated inside the sheath 22 to result in a subsequent rotation of an image acquired via the window portion 43 by the observation portion 3. In other words, when the insertion portion 6, which has been inserted into the sheath 22, is inserted into a test substance to make an observation, it is possible to exactly observe the interior of the test substance. Further, in the present embodiment, the engaging raised portion 5c is able to move back and forth in the direction of the central axis L6 inside the engaging groove 38g and also regulated in moving up to the proximal end until the engaging raised portion 5c comes in contact with an end face 38h. As a result, when the insertion portion 6 is inserted into a curved test substance, the insertion portion 6 is allowed to move back and forth through the outer sheath 31 in the direction of the central axis L6, thus making it possible to eliminate a difference in the peripheral length between the insertion portion 6 and the outer sheath 31 positioned at the outer circumference. The insertion portion 6 is regulated by the end face 38h in moving excessively to the proximal end, thus making it possible to prevent a great change in distance between the cover glass 41 and the observation portion 3. Thereby, it is possible to prevent a great change in the state where a light reflected on the cover glass 41 enters the observation portion 3 to result in a change in the observation state.

In the present embodiment, in addition to the regulating means 39, the insertion portion 6 is provided with the engaging raised portion 5c and the outer sheath 31 is provided with the engaging groove 38g, which acts as an engaging recessed portion. However, the present invention is not limited thereto. Similar effects can be obtained by providing the recessed portion on the insertion portion 6 and providing the engaging raised portion on the outer sheath 31. Further, the engaging groove 38g has the end face 38h on the proximal end side to regulate the insertion portion 6 in moving to the proximal end in the direction of the central axis L6. However, the present invention is not limited thereto. For example, the notch 30a of the inner sheath 30 is regulated in length so that the engaging raised portion 5c can be locked on the proximal end of the notch 30a, thus making it possible to obtain similar effects.

Further, the length of the engaging raised portion 5c in the direction of the central axis L6 is made approximately equal to the distance from the end face 38h of the proximal end of the engaging groove 38g to the inner surface of the cover glass 41, by which the distal end portion 5 of the insertion portion 6 can be positioned exactly.

Second Embodiment

Next, an explanation will be made for a second embodiment of the endoscope system of the present invention by referring to FIG. 5 to FIG. 7. In the present embodiment, members common to those used in the previous embodiment will be given the same numerals or symbols, the explanation of which will be omitted.

Figure 5:
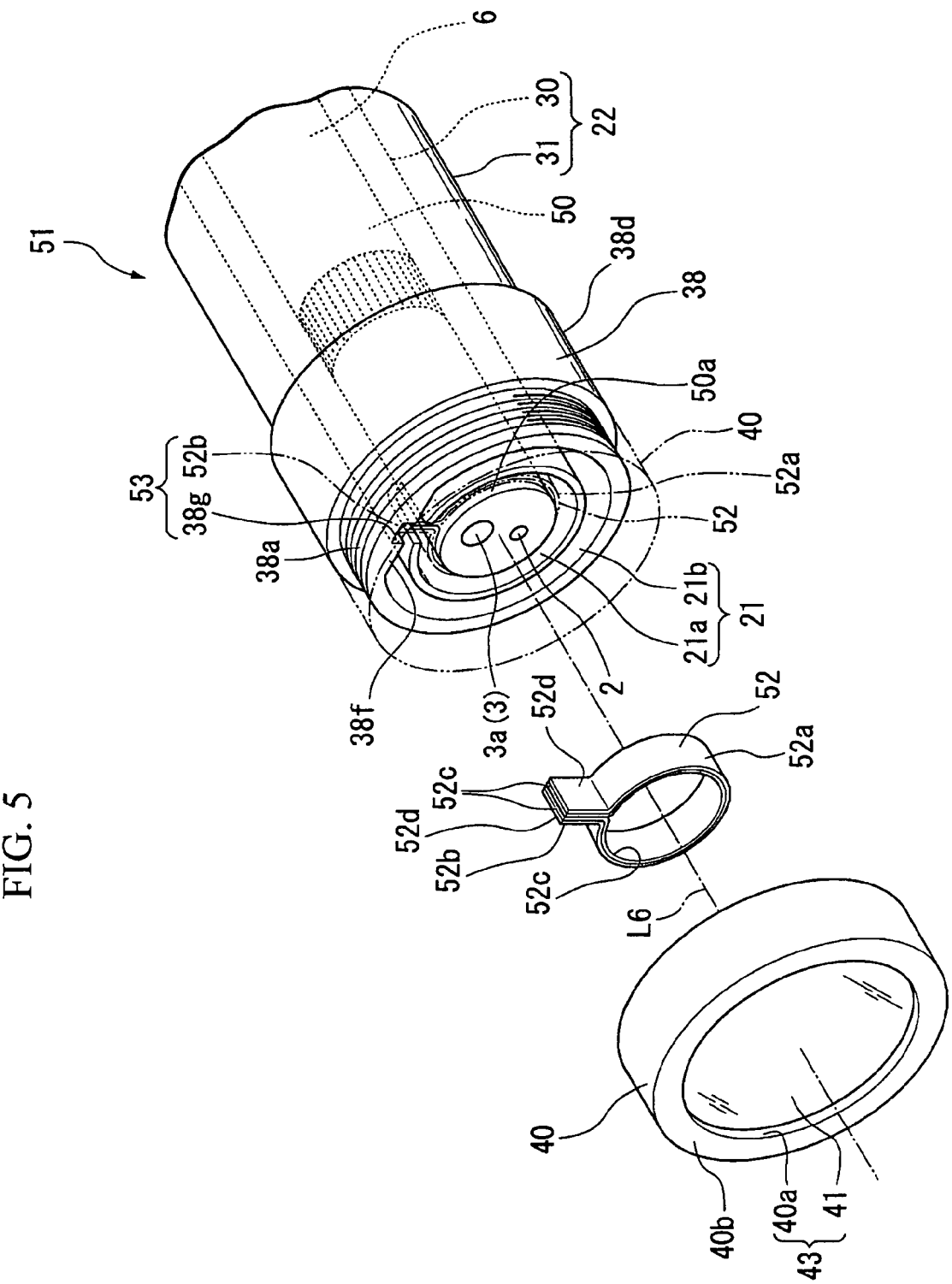
FIG. 5 is a view showing a second embodiment of the endoscope system of the present invention and an exploded perspective view of the distal end portion of the sheath constituting the endoscope cooling device included in the present embodiment.
Figure 6:
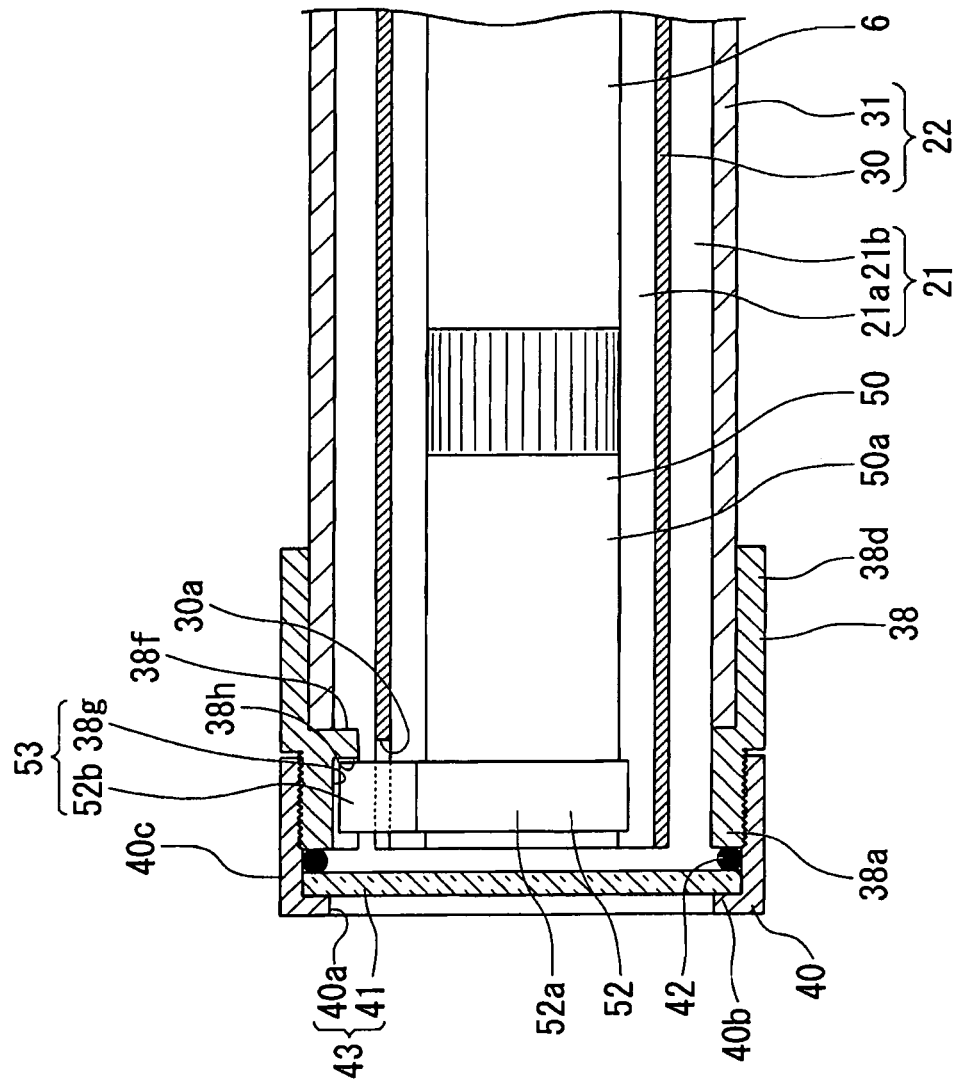
FIG. 6 is a side sectional view of the sheath of the endoscope cooling device included in the second embodiment.

As shown in FIG. 5 and FIG. 6, in the endoscope 1 of the present embodiment, an adaptor 50a at the distal end portion 50 of the insertion portion 6 does not have an engaging raised portion as in the first embodiment. Then, the endoscope cooling device 51 of the present embodiment is provided with an annular insertion portion fixing ring 52 fitted to the outside of the adaptor 50a of the distal end portion 50. The insertion portion fixing ring 52 has an outward fitting portion 52a formed substantially in a C shape and an engaging raised portion 52b projected in a radial direction outward from both ends of the outward fitting portion 52a. Further, the insertion portion fixing ring 52 is a double structure made up of an interior portion 52c formed of a soft elastic member such as rubber and an exterior portion 52d formed of a hard elastic member such as metal and covering the outside of the interior portion 52c, and interior portions 52c opposed at the engaging raised portion 52b are in contact with each other. Then, the insertion portion fixing ring 52 gives an elastical shrinkage to the interior portion 52c in the thickness direction, by which the outward fitting portion 52a is fitted to the outside of the adaptor 50a at the distal end portion 50, and the engaging raised portion 52b is also fitted into the engaging groove 38g of the distal end outer base 38. Therefore, the insertion portion 6 and the insertion portion fixing ring 52 are fixed by friction generated therebetween. Further, the engaging raised portion 52b of the insertion portion fixing ring 52 is mutually engaged with the engaging groove 38g, and the proximal end of the engaging groove 38g is closed by an end face 38h. In other words, a regulating means 53 is composed of the engaging raised portion 52b and the engaging groove 38g.

In the endoscope cooling device 51 of the present embodiment, the regulating means 53 is used to regulate the insertion portion 6 in moving rotationally around the central axis L6. Therefore, as with the first embodiment, it is possible to prevent the change in the observation state due to the fact that an image acquired by the observation portion 3 via the window portion 43 is rotated and also to exactly observe a test substance. Further, in the present embodiment, the engaging raised portion 52b gives an elastical shrinkage to the interior portion 52c and is fitted into the engaging groove 38g, thereby the engaging groove 38g is pressed in the width direction due to a restoring force resulting from the interior portion 52c to increase friction between the engaging raised portion 52b and the engaging groove 38g. The friction can be used to regulate the engaging raised portion 52b in moving also in the direction of the central axis L6 through the engaging groove 38g, in other words, the regulating means 53 can be used to regulate the outer sheath 31 in moving back and forth in the direction of the central axis L6 at the insertion portion 6. Therefore, it is possible to prevent the change in the observation state due to the fact that there is a change in the distance between the observation portion 3 of the insertion portion 6 and the cover glass 41 or there is a great change in the state where a light reflected on the cover glass 41 enters the observation portion 3.

In addition, the end face 38h is formed on the engaging groove 38g in the present embodiment as well. Therefore, for example, even when an external force larger than the frictional force generated between the engaging groove 38g and the engaging raised portion 52b acts on the insertion portion 6 toward the proximal end thereof in the direction of the central axis L6, the engaging raised portion 52b is in contact with the end face 38h, thereby preventing an excessively great distance between the cover glass 41 and the observation portion 3. Further, since the engaging raised portion 52b of the regulating means 53 is usable by fitting the insertion portion fixing ring 52 to the outside of the adaptor 50a, it is applicable to various types of adaptors because no raised portion is required to be installed on the adaptor 50a itself. Still further, an adaptor-free constitution is provided, which may be directly fitted to the outside of the main body portion 5a of the distal end portion 5.

Figure 7:
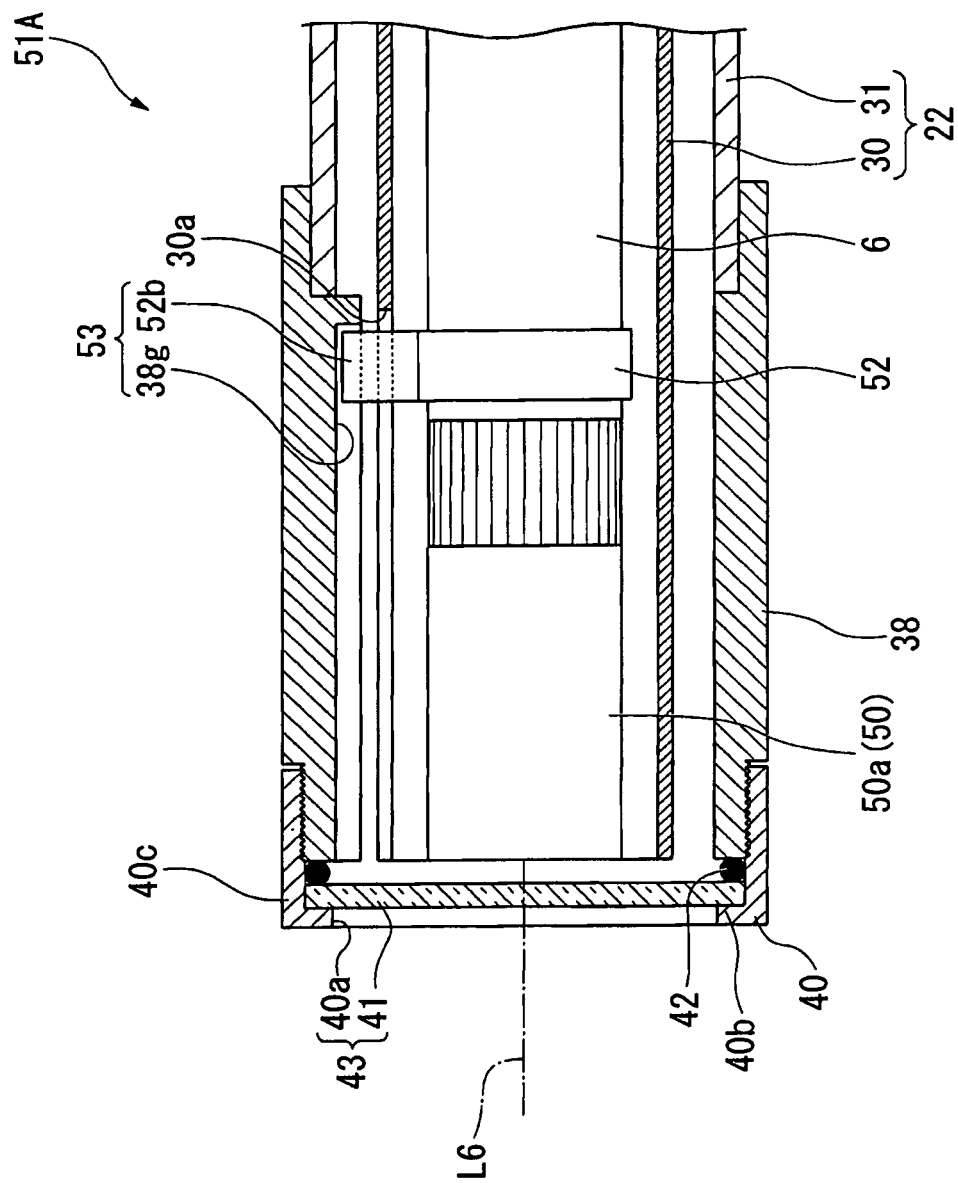
FIG. 7 is a view showing an exemplified variation of the second embodiment and a sectional side view of the distal end portion constituting the sheath of the endoscope cooling device included in the exemplified variation.

FIG. 7 shows an exemplified variation of the present embodiment. In the endoscope cooling device 51A of the present exemplified variation, an insertion portion fixing ring 52 is fitted not into an adaptor 50a but to the outside of an insertion portion 6, which is further at the back end from the adaptor 50a. On the other hand, a distal end outer base 38 is extended in the direction of the central axis L6 and an engaging groove 38g is accordingly extended in the same direction. Further, a notch 30a of an inner sheath 30 is also extended in the length direction of the sheath 30, corresponding to the engaging groove 38g. According to the endoscope cooling device 51A of the present exemplified variation, in addition to the effects similar to those of the second embodiment, there is found no actions of an opposing force from a sheath 22 on an adaptor 50a via the regulating means 53 even when the insertion portion 6 is rotated inside the sheath 22. The adaptor 50a attached at the distal end of the insertion portion 6 will not be loosened, thereby the distal end portion 50 of the insertion portion 6 can be more effectively regulated in rotational movement. Further, it is possible to attach or detach the adaptor 50a, with the insertion portion fixing ring 52 being attached to the insertion portion 6.

Third Embodiment

Next, an explanation will be made for a third embodiment of the endoscope system of the present invention by referring to FIG. 8 and FIG. 9. In the present embodiment, members common to those used in the previous embodiments will be given the same numerals or symbols, an explanation of which will be omitted.

Figure 8:
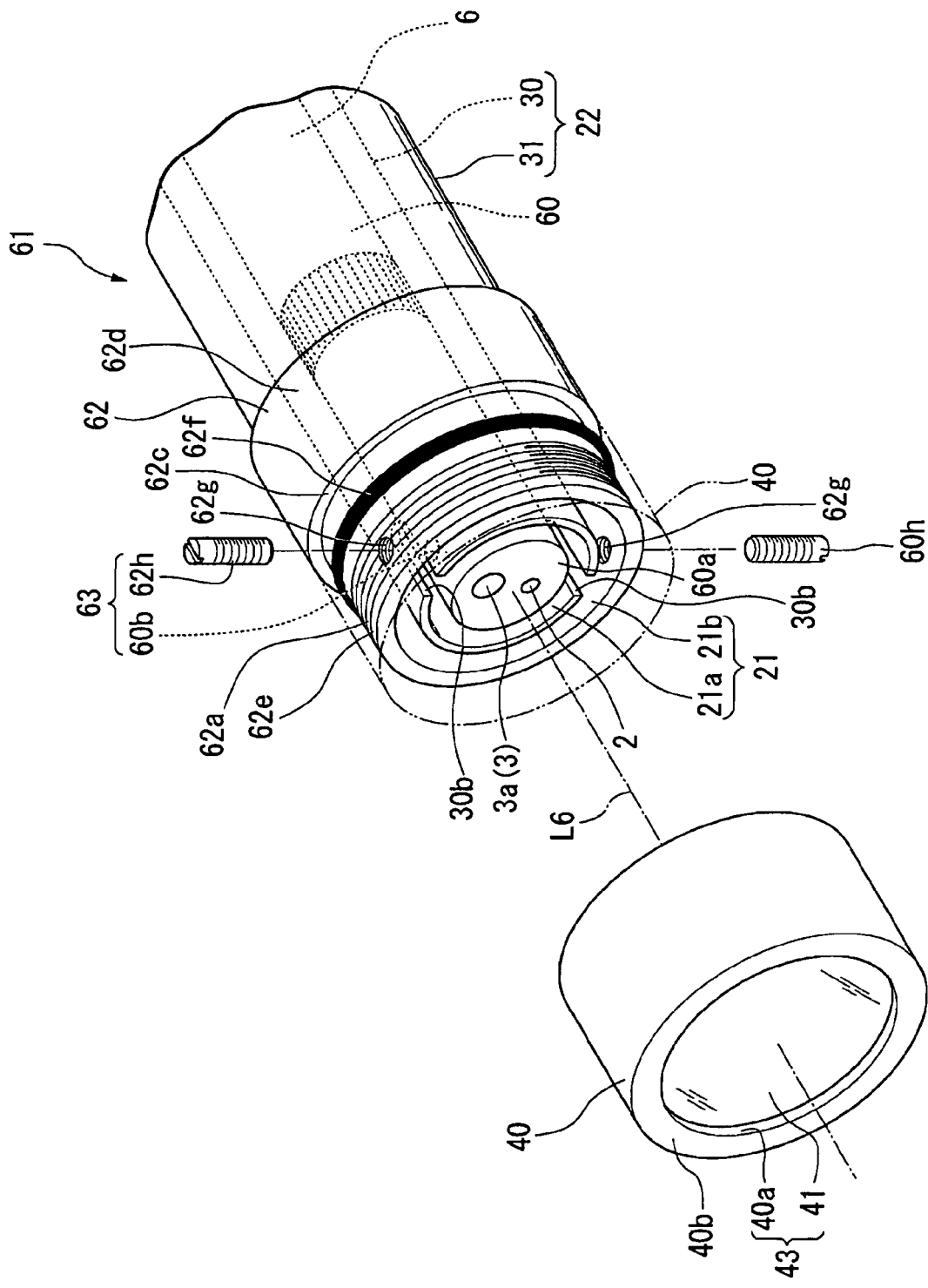
FIG. 8 is a view showing a third embodiment of the endoscope system of the present invention and an exploded perspective view of the distal end portion of the sheath constituting the endoscope cooling device included in the present embodiment.
Figure 9:
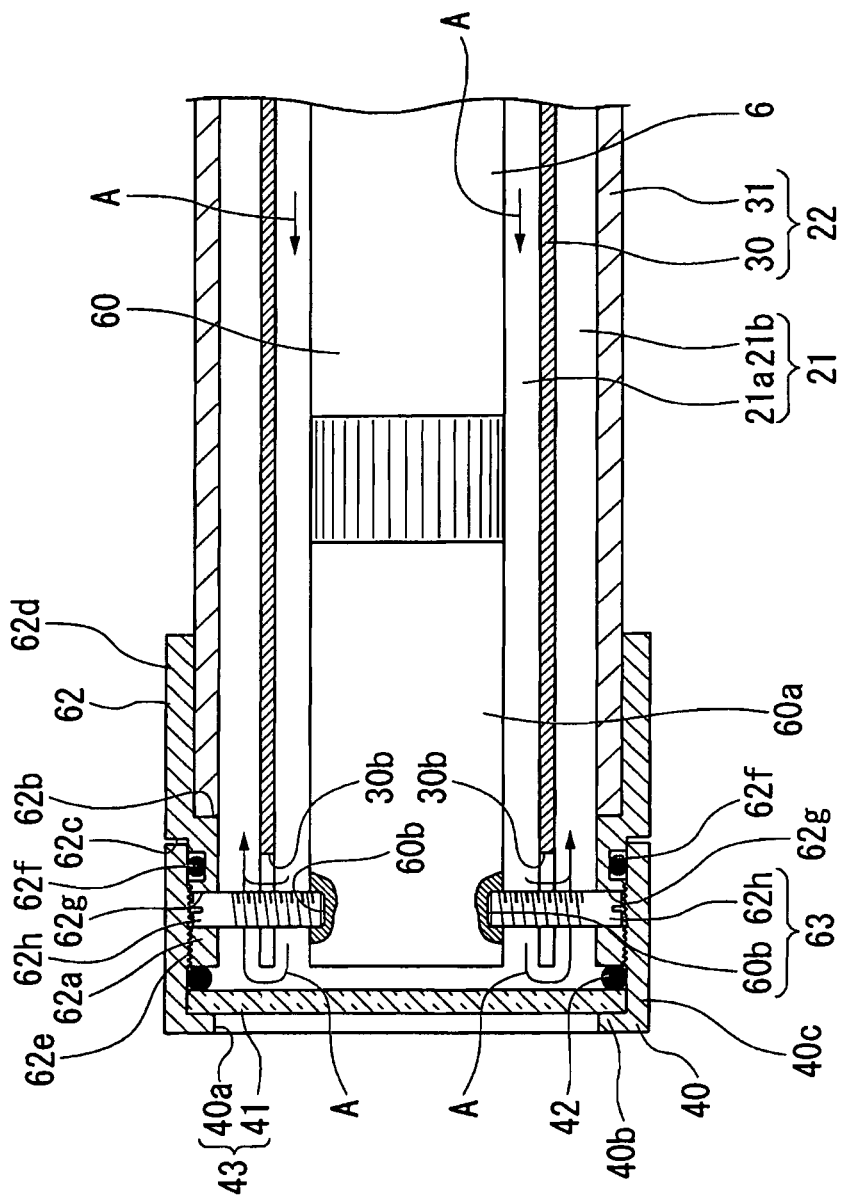
FIG. 9 is a sectional side view of the sheath of the endoscope cooling device included in the third embodiment.

As shown in FIG. 8 and FIG. 9, in the insertion portion 6 of the endoscope of the present embodiment, an engaging recessed portion 60b corresponding to a fixing thread portion 62h to be described later is formed at the adaptor 60a of the distal end portion 60. The endoscope cooling device 61 is provided with a distal end outer base 62 fitted to the outside of the distal end of the outer sheath 31. The distal end outer base 62 has a main body portion 62a projected from the distal end of the outer sheath 31 and an outward fitting portion 62d, the outer diameter and the inner diameter of which are expanded from the main body portion 62a, respectively having the step portions 62b, 62c. The outward fitting portion 62d of the distal end outer base 62 is fitted to the outside of the outer sheath 31 until the step portion 62b comes in contact with the distal end of the outer sheath 31 and is adhesively fixed to the outer sheath 31. The main body portion 62a of the distal end outer base 62 is provided at the distal end of the outer circumferential face with a male thread portion 62e and at the proximal end with an annular groove, an O-ring 62f is fitted to the outside thereof. The O-ring 62f is elastically deformed in a state where a cap 40 is screwed with the male thread portion 62e, thereby sealing a space between the cap 40 and the distal end outer base 62. A thread hole 62g penetrating from the outer circumferential face to the inner circumferential face is also formed further at the distal end from the O-ring 62f at the main body portion 62a of the distal end outer base 62, and a fixing thread portion 62h, which is an engaging raised portion, is screwed so as to project toward the inner circumferential face. In the present embodiment, the thread hole 62g and the fixing thread portion 62h are installed at two points so as to oppose each other. Further, the notch 30b as an opening portion is formed at a position opposing the thread hole 62g at the distal end of the inner sheath 30. Then, the fixing thread portion 62h is inserted into the inner circumferential face of the notch 30b of the inner sheath 30 and fitted into the engaging recessed portion 60b of the adaptor 60a at the distal end portion 60. A regulating means 63 is composed of the engaging recessed portion 60b and the fixing thread portion 62h.

In the endoscope cooling device 61 of the present embodiment, the regulating means 63 is used to regulate the insertion portion 6 in moving rotationally around the central axis L6, thereby making it possible to prevent the change in the observation state due to the fact that an image acquired by the observation portion 3 via the window portion 43 is rotated. Further, the regulating means 63 is used to regulate the insertion portion 6 in moving back and forth in the direction of the central axis L6 as well, thereby making it possible to prevent the change in the observation state due to the fact that the distance is changed between the observation portion 3 of the insertion portion 6 and the cover glass 41 or a light reflected on the cover glass 41 enters the observation portion 3.

Fourth Embodiment

Next, an explanation will be made for a fourth embodiment of the endoscope system of the present invention by referring to FIG. 10 and FIG. 11. In the present embodiment, members common to those used in the previous embodiments will be given the same numerals or symbols, an explanation of which will be omitted.

Figure 10:
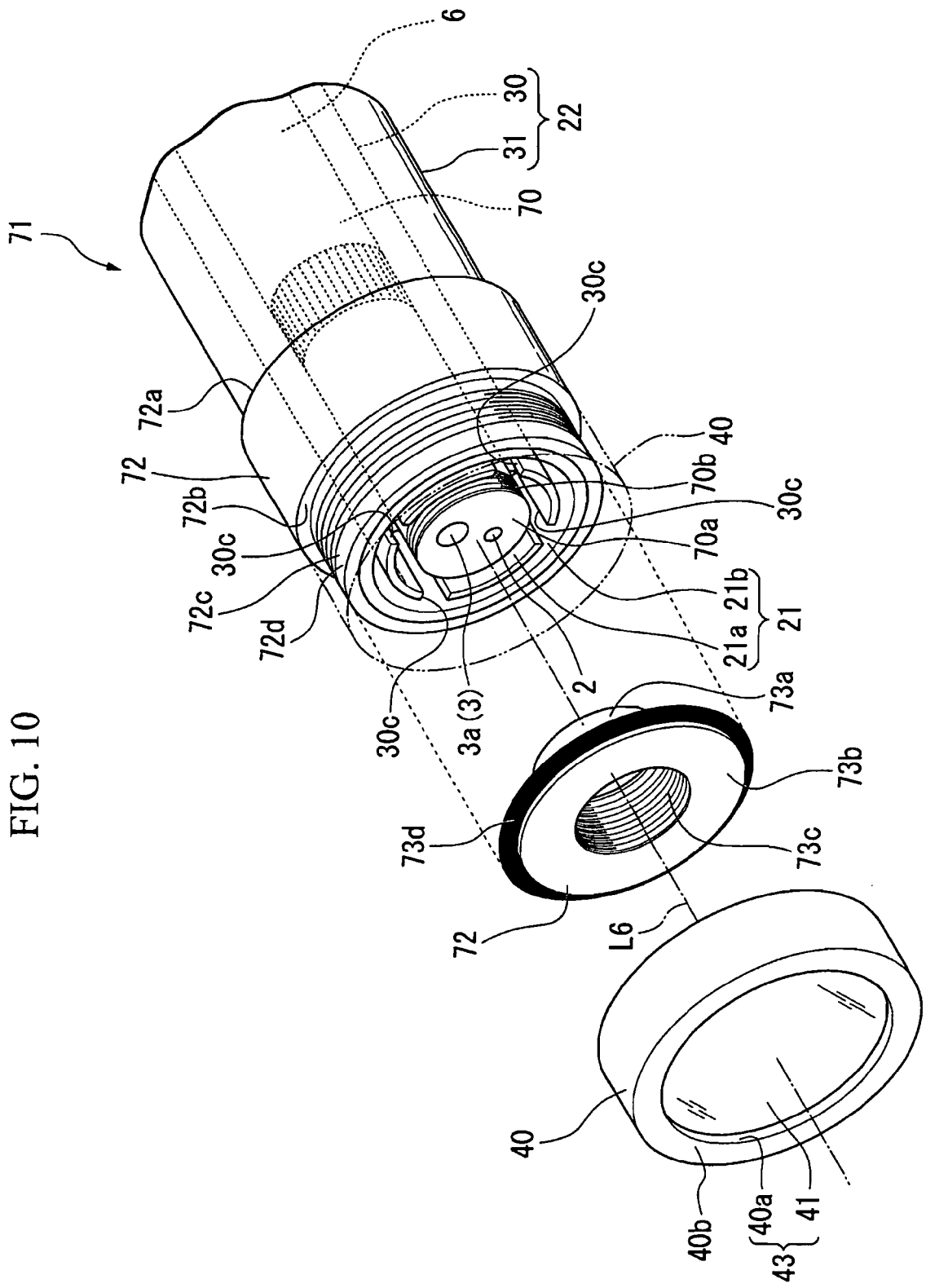
FIG. 10 is a view showing a fourth embodiment of the endoscope system of the present invention and an exploded perspective view of the distal end portion of the sheath constituting the endoscope cooling device included in the present embodiment.
Figure 11:
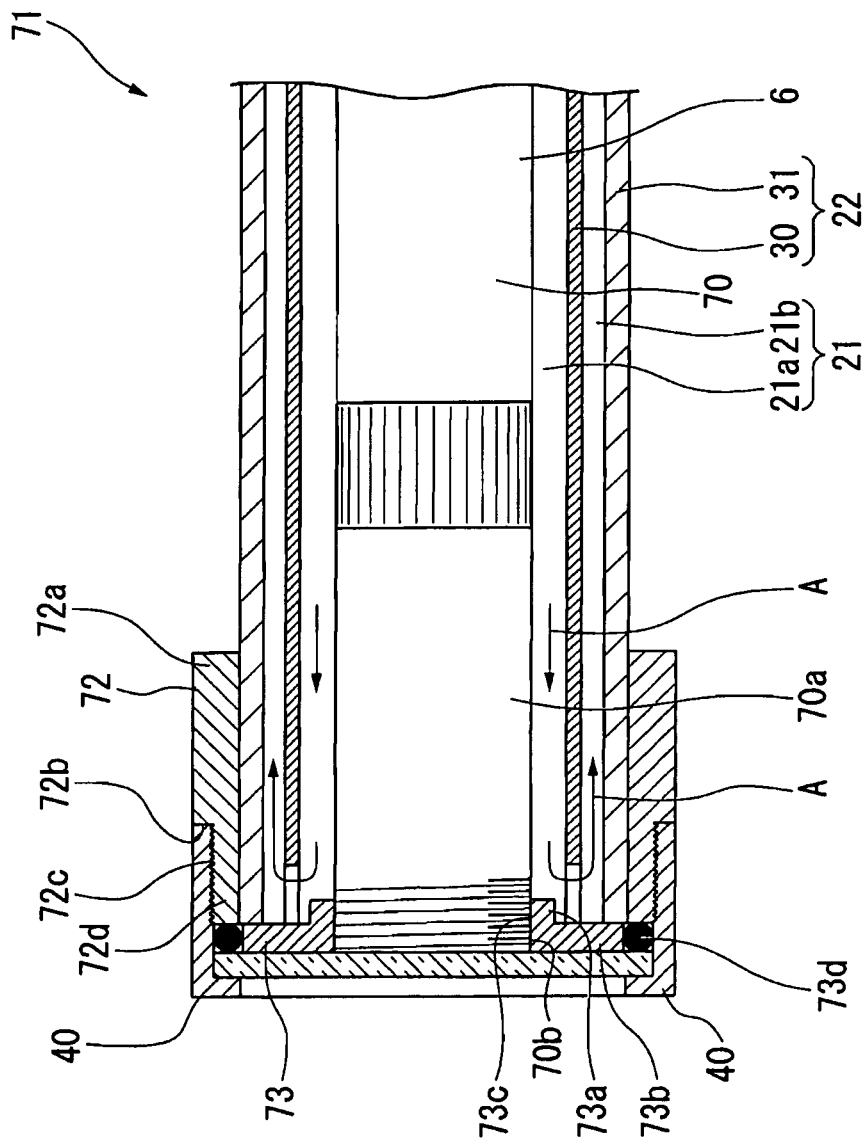
FIG. 11 is a sectional side view of the sheath of the endoscope cooling device included in the fourth embodiment.

As shown in FIG. 10 and FIG. 11, in the insertion portion 6 of the endoscope of the present embodiment, a male thread portion 70b is formed on the distal end outer circumferential face at the adaptor 70a of the distal end portion 70. The endoscope cooling device 71 is provided with a distal end outer base 72 fitted to the outside of the distal end of the outer sheath 31. The distal end outer base 72 is provided with a large diameter portion 72a at the proximal end and a minor diameter portion 72c, the outer diameter of which is reduced from the large diameter portion 72a and extended to the distal end, having the step portion 72b. A male thread portion 72d is formed on the outer circumferential face of the minor diameter portion 72c, with which the female thread portion 40d of the cap 40 is screwed. Further, the endoscope cooling device 71 has a fixing ring 73 as a regulating means. The fixing ring 73 is provided with an approximately tubular fixing portion 73a fitted to the outside of the adaptor 70a at the distal end portion 70 of the insertion portion 6 and an engagement portion 73b projecting in a flange shape from the outer circumferential face of the distal end of the fixing portion 73a. A female thread portion 73c is formed on the inner circumferential face of the fixing portion 73a and screwed with the male thread portion 70b of the adaptor 70a, by which the fixing ring 73 is fixed to the adaptor 70a. Further, an O-ring 73d is fitted to the outside of the outer circumferential end at the engagement portion 73b of the fixing ring 73. Then, the engagement portion 73b of the fixing ring 73 and the O-ring 73d are held between the cap 40 and the outer sheath 31 or the distal end of the distal end outer base 72 via the cover glass 41 in an assembled state, and the O-ring 73d is elastically deformed. Further, a plurality of notches 30c as an opening portion is formed at the distal end of the inner sheath 30.

In the endoscope cooling device 71 of the present embodiment, since the engagement portion 73b of the fixing ring 73 is held between the cap 40 and the distal end of the outer sheath 31, the insertion portion 6 to which the fixing ring 73 has been fixed is regulated in moving rotationally around the central axis L6 and moving back and forth in the direction of the central axis 6. Therefore, as with the above-described embodiments, it is possible to prevent the change in the observation state due to the fact that an image acquired by the observation portion 3 via the window portion 43 is rotated. It is also possible to prevent the change in the observation state due to the fact that the distance is changed between the observation portion 3 of the insertion portion 6 and the cover glass 41 or a light reflected on the cover glass 41 enters the observation portion 3. Further, the notch 30c is formed on the inner sheath 30, by which a cooling fluid is allowed to flow preferably between the first cooling flow path 21a and the second cooling flow path 21b even when the distal end opening on the inner sheath 30 is closed by the fixing ring 73.

Figure 12:
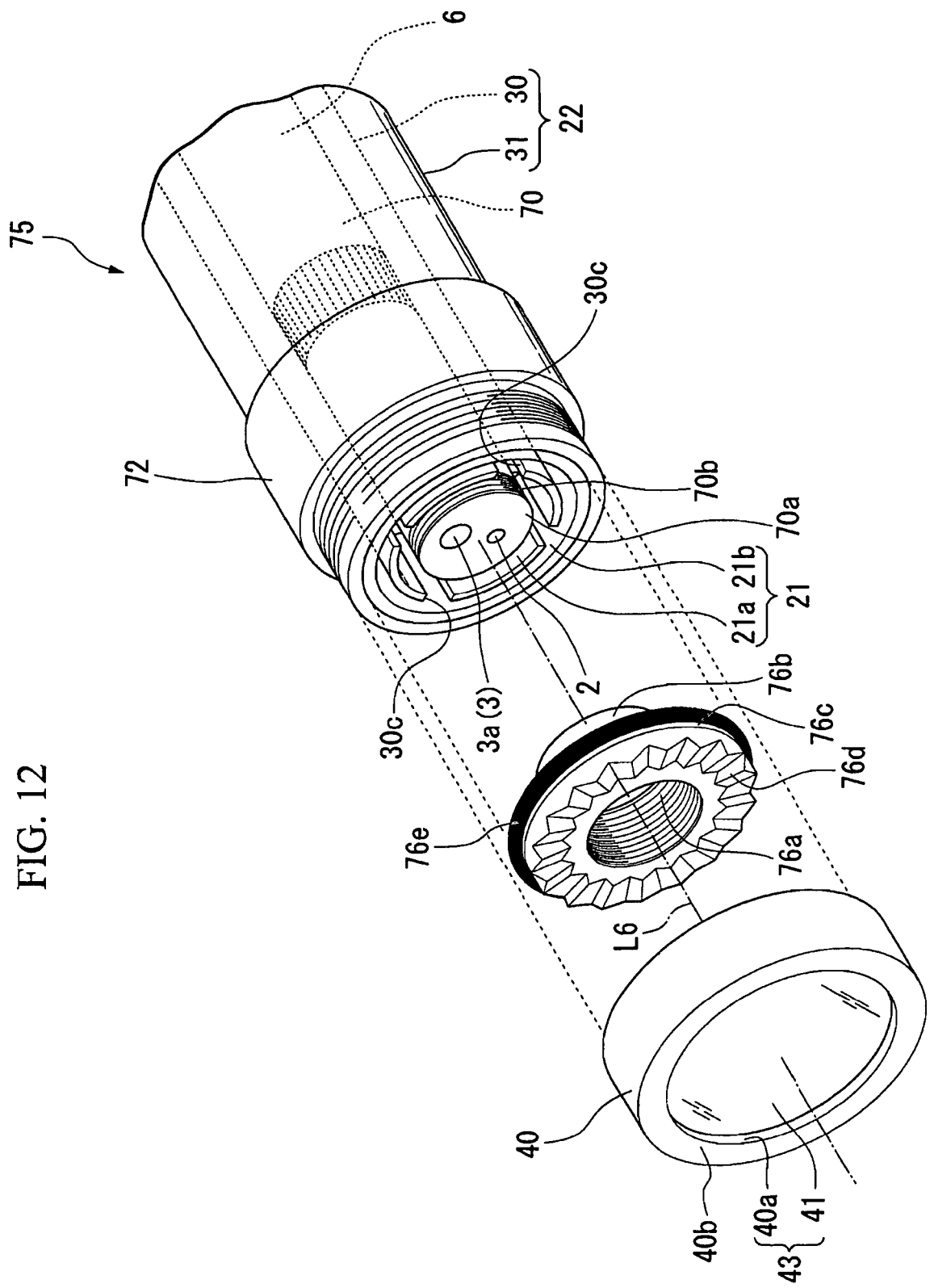
FIG. 12 is a view showing an exemplified variation of the fourth embodiment and an exploded perspective view of the distal end portion of the sheath constituting the endoscope cooling device included in the exemplified variation.

FIG. 12 shows an exemplified variation of the endoscope cooling device 71 of the present embodiment. In the endoscope cooling device 75 of the exemplified variation, the fixing ring 76, which has a female thread portion 76a formed on the inner circumferential face, has a fixing portion 76b screwed into the male thread portion 70b of the adaptor 70a at the distal end portion 70 and an engagement portion 76c projecting in a flange shape from the fixing portion 76b. The engagement portion 76c is formed of an elastic member such as rubber, and irregularities are formed in a radial manner on the distal end face 76d. Further, an O-ring 76e is fitted to the outside of the outer circumferential end of the engagement portion 76c. In the exemplified variation as well, the insertion portion is regulated in moving back and forth in the direction of the central axis L6 and irregularities are also formed on the distal end face 76d at the engagement portion 76c of the fixing ring 76 in contact with the cover glass 41, thereby effectively causing friction between the cover glass 41 and the distal end face 76d, making it possible to more effectively regulate the insertion portion in moving rotationally around the central axis L6.

Fifth Embodiment

Next, an explanation will be made for a fifth embodiment of the endoscope system of the present invention by referring to FIG. 13. In the present embodiment, members common to those used in the previous embodiments will be given the same numerals or symbols, an explanation of which will be omitted.

Figure 13:
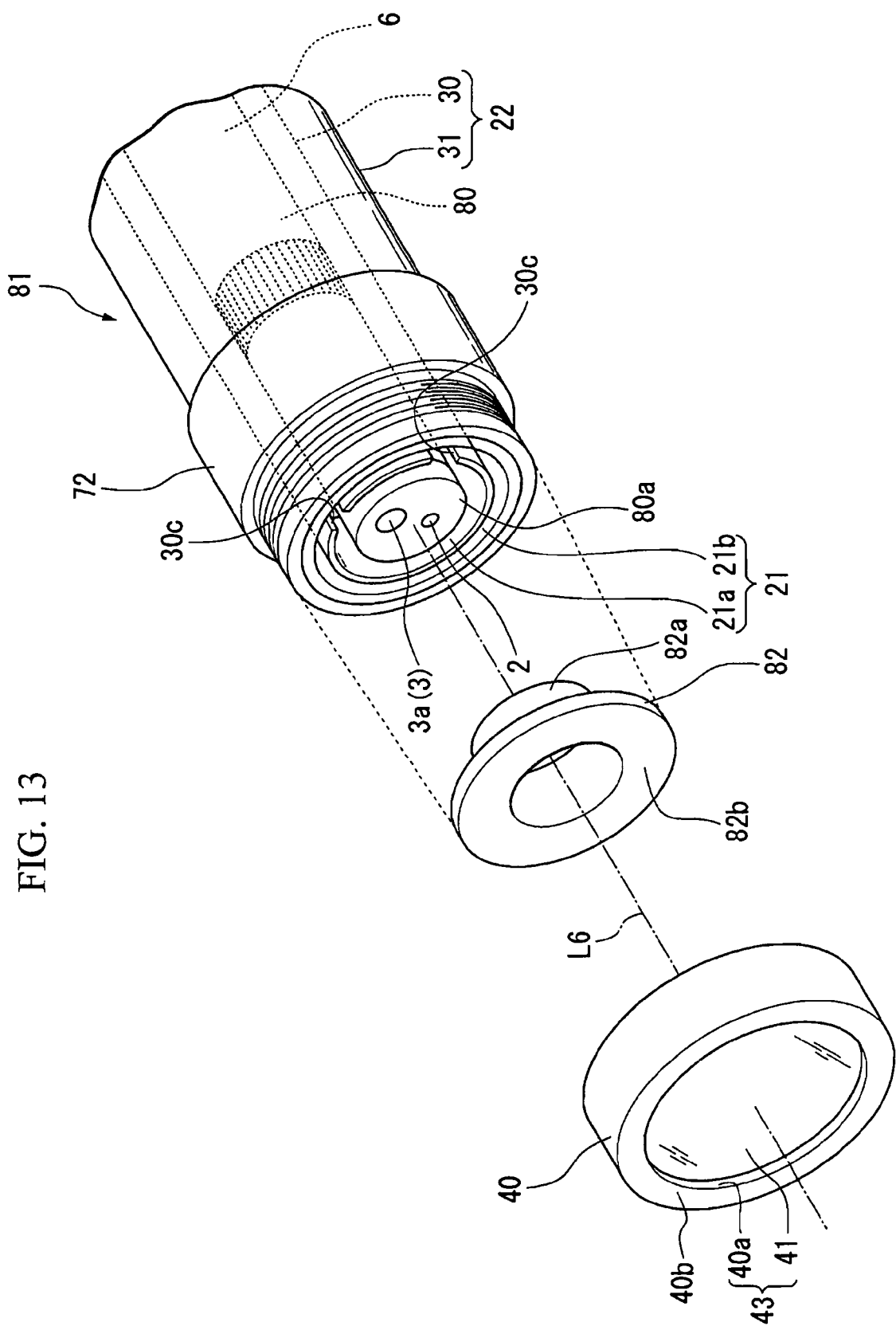
FIG. 13 is a view showing a fifth embodiment of the endoscope system of the present invention and an exploded perspective view of the distal end portion of the sheath constituting the endoscope cooling device included in the present embodiment.

As shown in FIG. 13, in the insertion portion 6 of the endoscope of the present embodiment, the adaptor 80a of the distal end portion 80 is not provided with a male thread portion formed on the outer circumferential face. Then, the endoscope cooling device 81 is provided with a fixing ring 82 fixed to the adaptor 80a. The fixing ring 82 is wholly formed of an elastic member such as rubber and has a fixing portion 82a elastically expanded in diameter and fitted to the outside of the adaptor 80a and an engagement portion 82b projecting in a flange shape from the fixing portion 82a.

In the endoscope cooling device of the present embodiment, since the fixing portion 82a of the fixing ring 82 is formed of an elastic member such as rubber, there is eliminated the necessity for providing a female thread portion on the adaptor 80a, and the fixing ring 82 can be fixed to the adaptor 80a by using generated friction. Therefore, the present embodiment is applicable to various types of adaptors and can be fixed directly to a main body portion at the distal end portion 80, without having an adaptor. Further, since the engagement portion 82b of the fixing ring 82 is also wholly formed of an elastic member such as rubber, the space between the cover glass 41 and the outer sheath 31 can be sealed without using an O-ring.

Sixth Embodiment

Next, an explanation will be made for a sixth embodiment of the endoscope system of the present invention by referring to FIG. 14 and FIG. 15. In the present embodiment, members common to those used in the previous embodiments will be given the same numerals or symbols, an explanation of which will be omitted.

Figure 14:
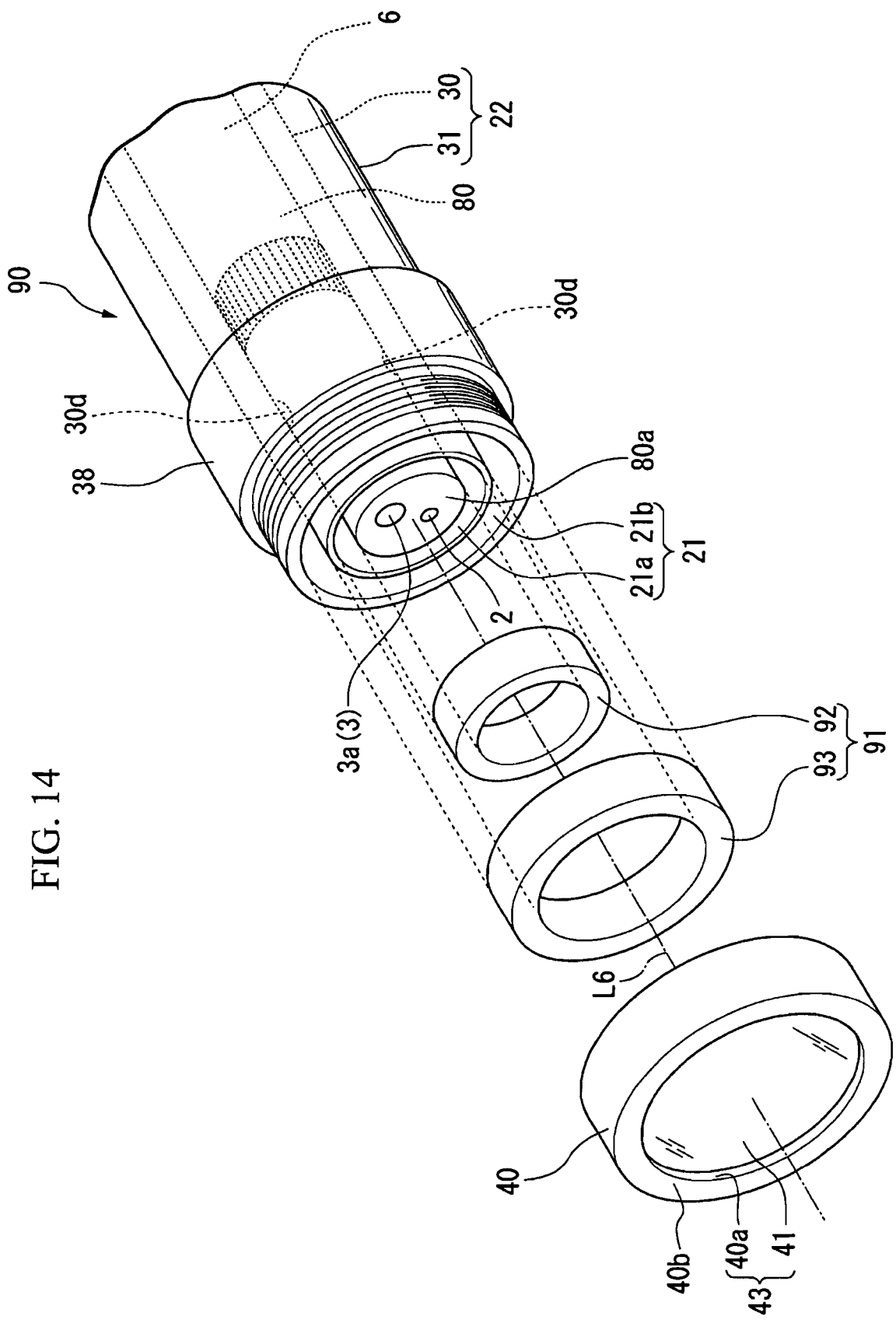
FIG. 14 is a view showing a sixth embodiment of the endoscope system of the present invention and an exploded perspective view of the distal end portion of the sheath constituting the endoscope cooling device included in the present embodiment.
Figure 15:
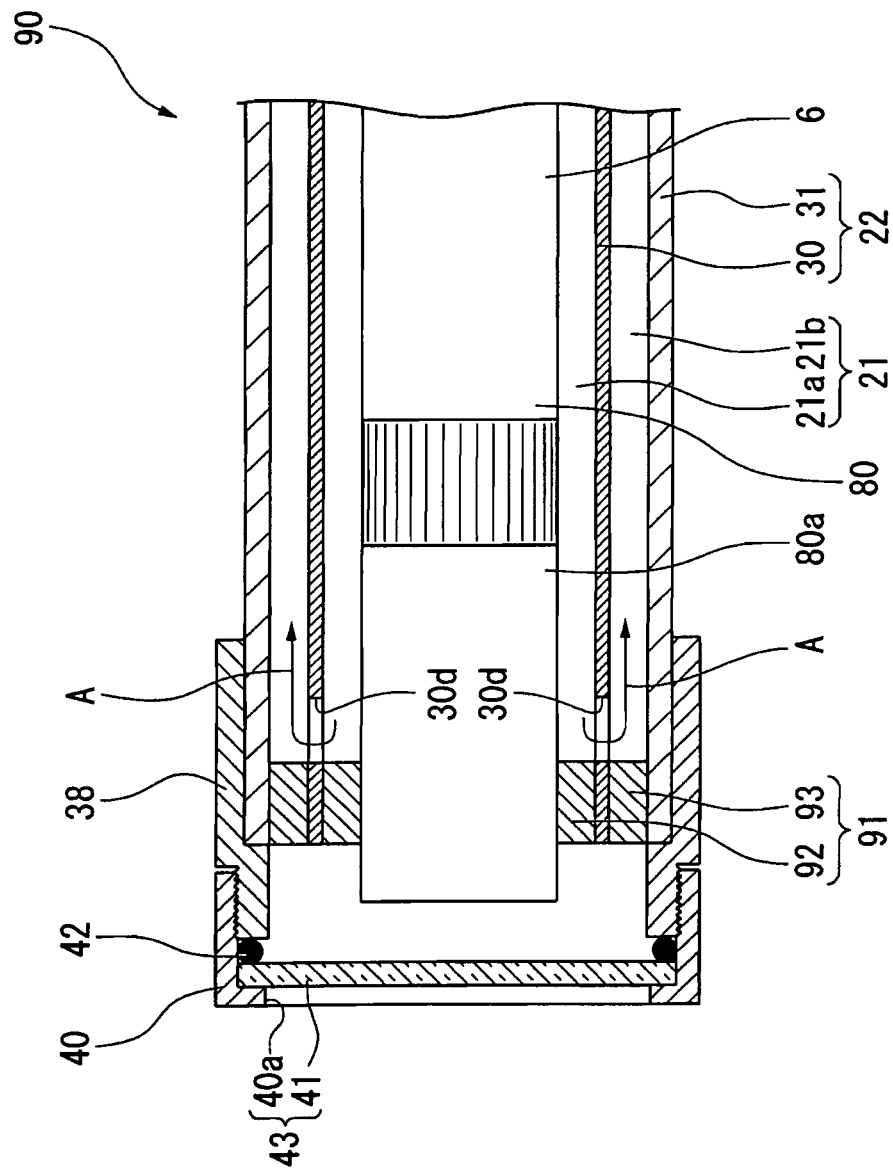
FIG. 15 is a sectional side view of the sheath of the endoscope cooling device included in the sixth embodiment.

As shown in FIG. 14 and FIG. 15, the endoscope cooling device 90 of the present embodiment is provided with a first annular member 92 fitted to the outside of the adaptor 80a at the distal end portion 80 of the insertion portion 6 as a regulating means 91 and a second annular member 93 fitted to the outside of the distal end of the inner sheath 30. The first annular member 92 and the second annular member 93 are both formed of an elastic member such as rubber. Then, the first annular member 92 is elastically expanded in inner diameter and fitted to the outside of the adaptor 80a, while elastically reduced in outer diameter and fitted into the inner circumferential face of the inner sheath 30. In a similar manner, the second annular member 93 is elastically expanded in inner diameter and fitted to the outside of the inner sheath 30, while elastically expanded in outer diameter and fitted into the inner circumferential face of the outer sheath 31. Further, a through hole 30d is formed as an opening portion at the distal end portion of the inner sheath 30, which is further at the proximal end side from a position into which the first annular member 92 and the second annular member 93 are fitted.

In the endoscope cooling device 90 of the present embodiment, the elastically deformed first annular member 92 presses the adaptor 80a of the insertion portion 6 and the inner sheath 30, thereby effectively generating friction between the respective spaces to regulate the insertion portion 6 in moving rotationally around the central axis L6 and moving back and forth in the direction of the central axis L6 through the inner sheath 30. In a similar manner, the elastically deformed second annular member 93 presses the inner sheath 30 and the outer sheath 31, thereby effectively generating friction between the respective spaces to regulate the inner sheath 30 in moving rotationally around the central axis L6 and moving back and forth in the direction of the central axis L6 through the outer sheath 31. In other words, the insertion portion 6 is regulated by the regulating means 91 composed of the first annular member 92 and the second annular member 93 in moving rotationally around the central axis L6 and moving back and forth in the direction of the central axis L6 through the outer sheath 31. Further, since the regulating means 91 is composed of the first annular member 92 and the second annular member 93 elastically formed and duly fitted, there is eliminated the necessity for providing a female thread portion or the like on the adaptor 80a. The present embodiment is also applicable to various types of adaptors and made available as a constitution free of any adaptor.

Seventh Embodiment

Next, an explanation will be made for a seventh embodiment of the endoscope system of the present invention by referring to FIG. 16 to FIG. 18. In the present embodiment, members common to those used in the previous embodiments will be given the same numerals or symbols, an explanation of which will be omitted.

Figure 16:
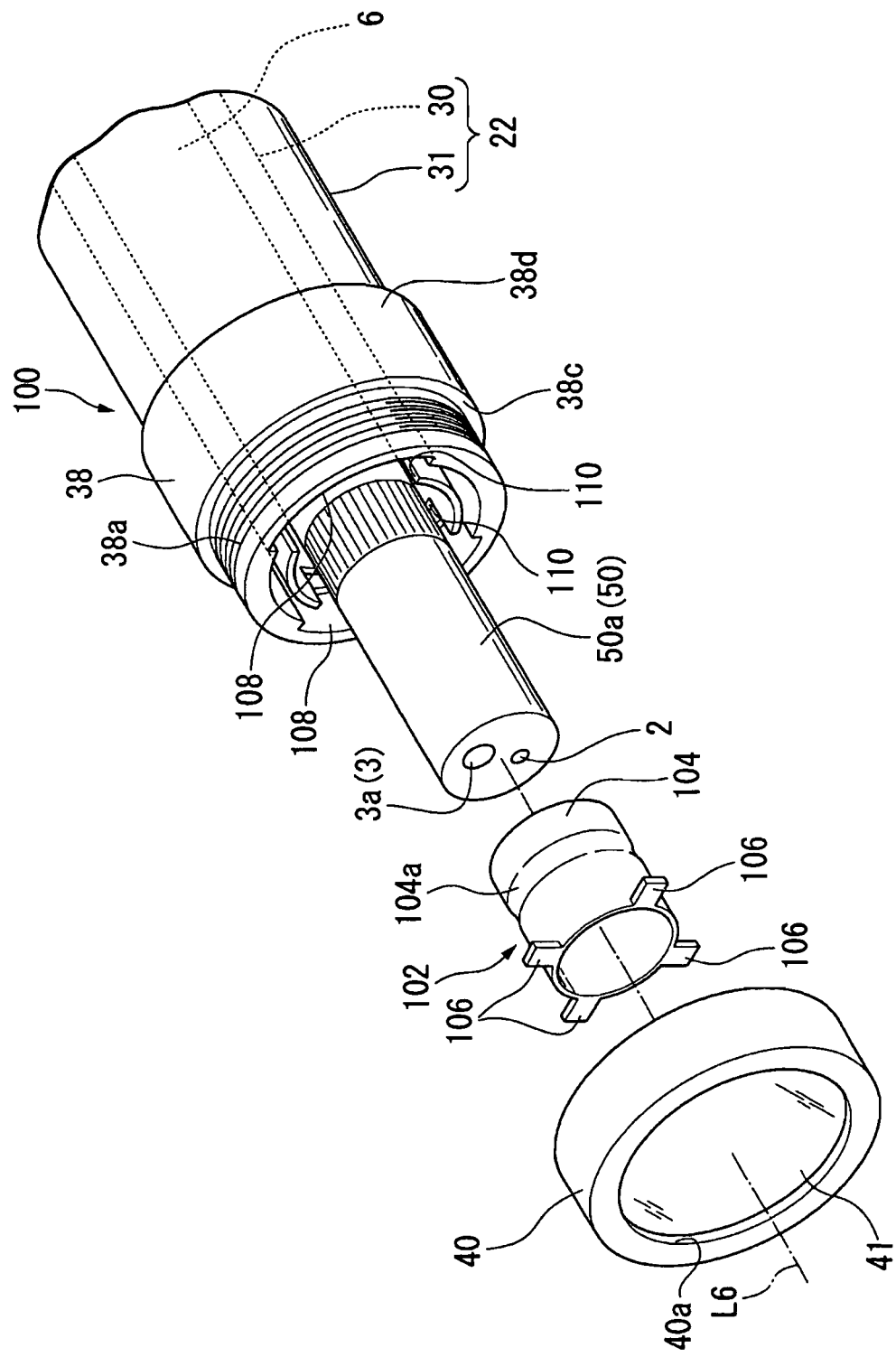
FIG. 16 is a view showing a seventh embodiment of the endoscope system of the present invention and an exploded perspective view of the distal end portion of the sheath constituting the endoscope cooling device included in the present embodiment.
Figure 17:
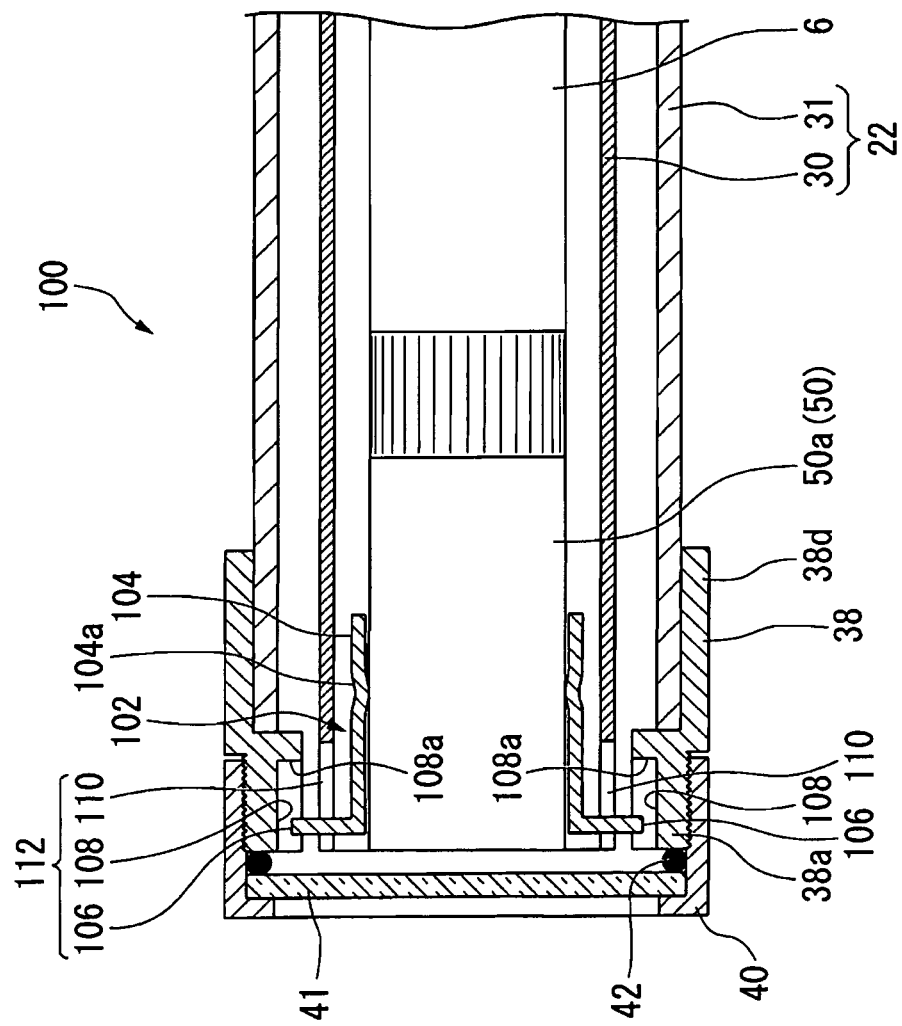
FIG. 17 is a sectional side view of the sheath of the endoscope cooling device included in the seventh embodiment.
Figure 18:
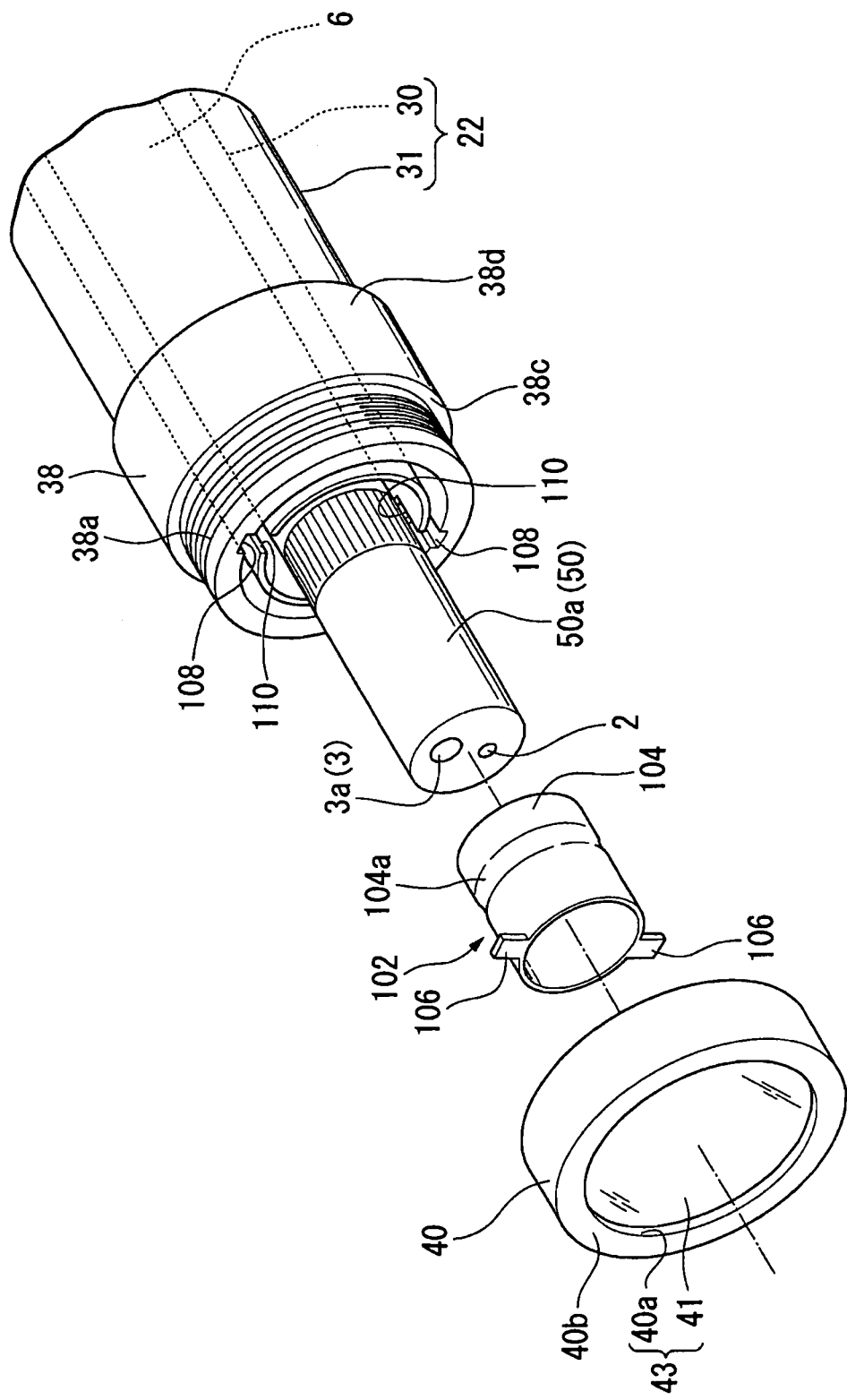
FIG. 18 is a view showing an exemplified variation of the seventh embodiment and an exploded perspective view of the distal end portion of the sheath constituting the endoscope cooling device included in the exemplified variation.

As shown in FIG. 16 and FIG. 17, the endoscope cooling device 100 of the present embodiment is provided with a cylindrical insertion portion fixing bracket 102 fitted to the outside of the distal end portion 50 of the insertion portion 6. The insertion portion fixing bracket 102 is provided with a cylindrical main body portion 104 and four projections 106 installed on the main body portion 104. The insertion portion fixing bracket 105 is made of a material such as metal, silicon, polyimide or Teflon. A diameter-reduced portion 104a, which is slightly reduced in inner diameter, is formed at an intermediate point of the main body portion 104 in the length direction. The inner diameter of the diameter-reduced portion 104a is slightly smaller than the outer diameter of the adaptor 50a. The insertion portion fixing bracket 102 is pressed in such a manner that the adaptor 50a expands the diameter of the diameter-reduced portion 104a, while allowing the main body portion 104 to deform elastically, and thereby fitted to the outside of the distal end portion 50 of the insertion portion 6. The four projections 106 are installed so as to be equally spaced in the circumferential direction on the outer circumferential face at the distal end of the main body portion 104. Each of the projections 106 is formed in such a manner that a tongue-shaped piece projecting from the distal end of the main body portion 104 is folded outwardly.

On the other hand, two recessed portions 108 are formed on the inner circumferential face at the distal end of the main body portion 38a of the distal end outer base 38 so as to face each other at the center of the main body portion 38a. The recessed portions 108 are formed so as to make the main body portion 38a thinner along the circumferential direction. Two notches 110 are formed at the distal end of the inner sheath 30 so as to face each other at the center of the inner sheath 30. These two notches 110 are arranged so as to correspond respectively to the two recessed portions 108.

Two adjacent projections 106 of the insertion portion fixing bracket 102 are fitted into a recessed portion 108 of one distal end outer base 38 and a notch 110 corresponding to the recessed portion 108, and two remaining projections 106 of the insertion portion fixing bracket 102 are fitted into another recessed portion 108 and a notch 110 corresponding to the recessed portion 108. These two projections 106 are respectively in contact with step portions on both ends of the recessed portion 108 and the edges on both ends of the notch 110. The observation portion 3 and the illuminating portion 2 of the endoscope 1 can be viewed forward via the opening portion 40a of the cap 40 screwed with the distal end outer base 38.

Further, the distal ends of the four projections 106 are respectively in contact with the bottom face of the recessed portion 108. Therefore, these four projections 106 installed on the insertion portion fixing bracket 102 are guided by two recessed portions 108 formed at the distal end of the distal end outer base 38 and two notches 110 formed at the distal end of the inner sheath 30, by which the insertion portion 6 is able to move back and forth in the direction of the central axis L6. However, the projections 106 are engaged with the recessed portions 108 and the notches 110, thereby the insertion portion 6 is regulated in moving rotationally around the central axis L6. Further, the projections 106 are in contact with a back face 108a of the recessed portion 108, thereby the distal end portion 50 is regulated in moving to the proximal end. In other words, a regulating means 112 is composed of the projections 106, the recessed portions 108 and the notches 110.

According to the endoscope cooling device 100 of the present embodiment, since the regulating means 112 is used to regulate the insertion portion 6 in moving rotationally around the central axis L6, it is possible to prevent the change in the observation state due to the fact that an image acquired by the observation portion 3 via the window portion 43 is rotated. Further, the projection 106 is able to move back and forth in the direction of the central axis L6 inside the recessed portion 108 and the notch 110 and also regulated in moving to the proximal end until the projection 106 comes in contact with the back face 108a. Therefore, when the insertion portion 6 is inserted into a curved test substance, the insertion portion 6 is allowed to move back and forth through the outer sheath 31 in the direction of the central axis L6, thereby eliminating a difference in the peripheral length between the insertion portion 6 and the outer sheath 31 positioned on the outer circumference. Further, the insertion portion 6 is regulated in moving excessively to the proximal end by the back face 108a, thus making it possible to prevent a great change in distance between the cover glass 41 and the observation portion 3. Thereby, it is possible to prevent the change in the observation state due to the fact that there is a great change in the state where a light reflected on the cover glass 41 enters the observation portion 3.

Since the distal ends of four projections 106 are in contact with the bottom face of the recessed portion 108 formed on the inner circumferential face of the outer sheath 31, the distal end portion 50 of the insertion portion 6 to which the adaptor 50a has been attached is always arranged at the center of the sheath 22. Thereby, cooling air is not localized but flowing uniformly around the distal end portion 50 of the insertion portion 6. Further, since the insertion portion fixing bracket 102 of the regulating means 112 is fitted to the outside of the adaptor 50a at the distal end portion 50 of the insertion portion 6, no special shape is needed for the adaptor 50a itself. As a result, the present embodiment is applicable to various types of adaptors. In an adaptor-free endoscope, the insertion portion fixing bracket 102 may be directly fitted to the outside of the main body portion 5a of the distal end portion 5.

Incidentally, in the present embodiment, four projections 106 are installed at the insertion portion fixing bracket 102. Any number of the projections 106 may be installed, however, on the condition that it is necessary to change the number and shape of the recessed portions 108 and the notches 110 according to the change in the number of the projections 106. For example, as shown in FIG. 18, two projections 106 may be installed at the insertion portion fixing bracket 102, and the recessed portion 108 and the notch 110 large enough to fit one projection 106 may be installed on the sheath 22.

Eight Embodiment

Next, an explanation will be made for an eighth embodiment of the endoscope system of the present invention by referring to FIG. 19 and FIG. 20. In the present embodiment, members common to those used in the previous embodiments will be given the same numerals or symbols, an explanation of which will be omitted.

Figure 19:
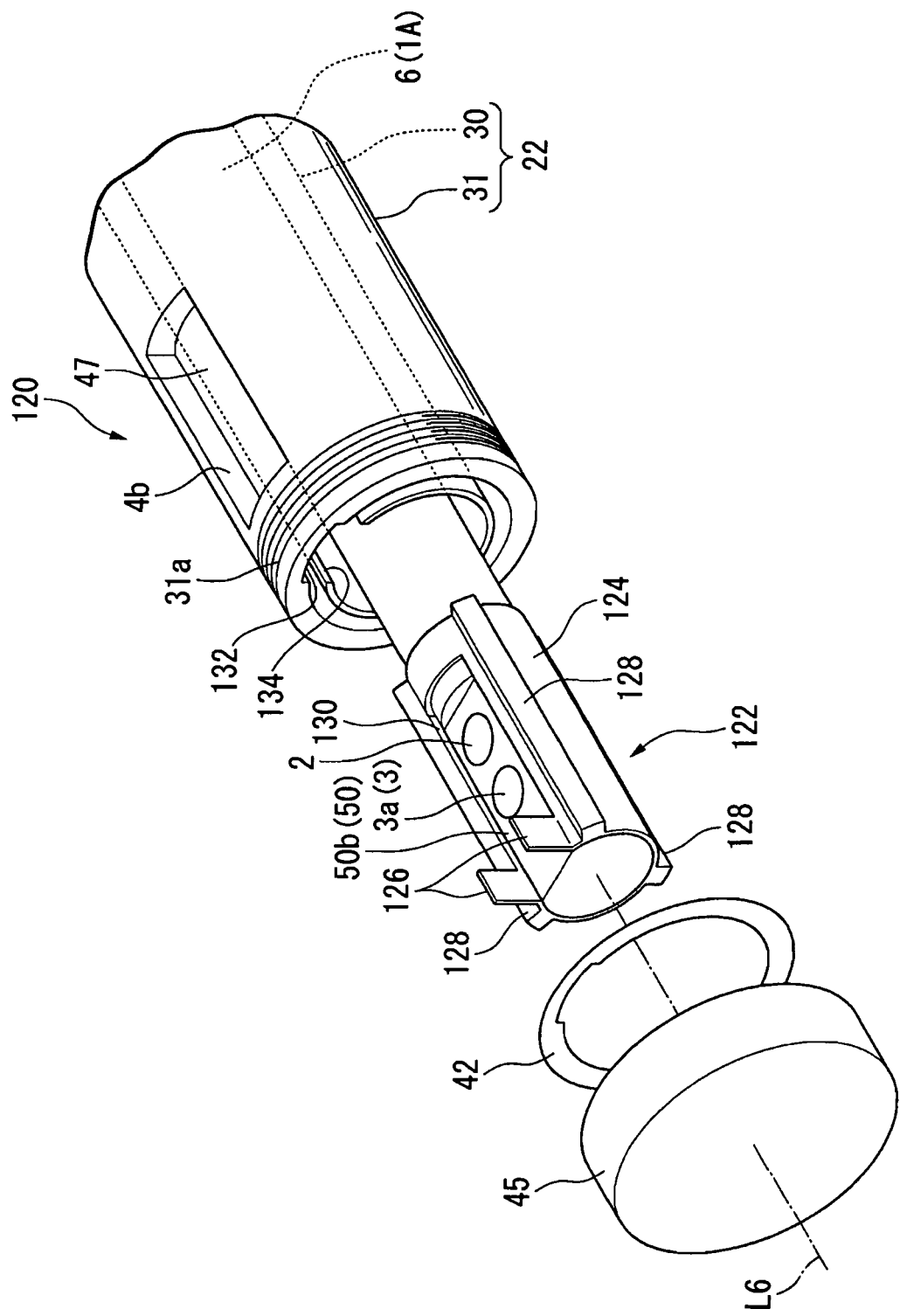
FIG. 19 is a view showing an eighth embodiment of the endoscope system of the present invention and an exploded perspective view of the distal end portion of the sheath constituting the endoscope cooling device included in the present embodiment.
Figure 20:
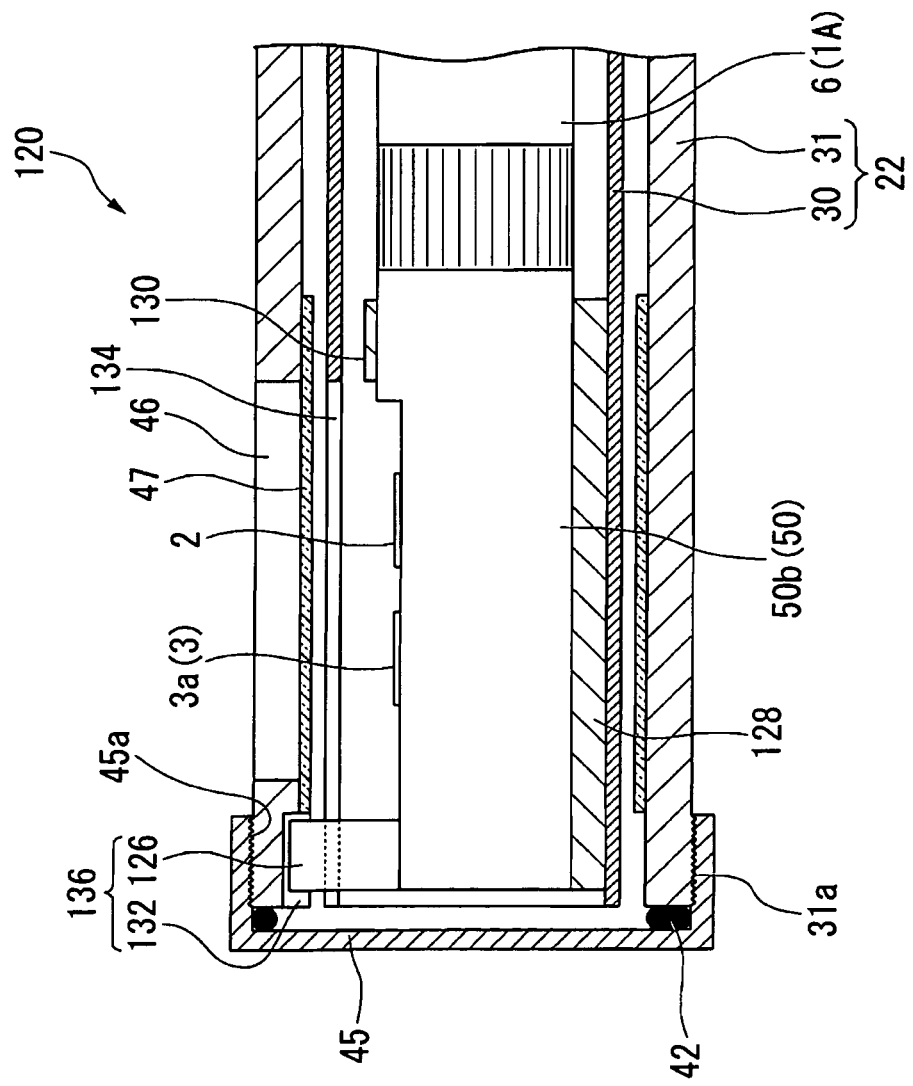
FIG. 20 is a sectional side view of the sheath of the endoscope cooling device included in the eighth embodiment.
Figure 21:
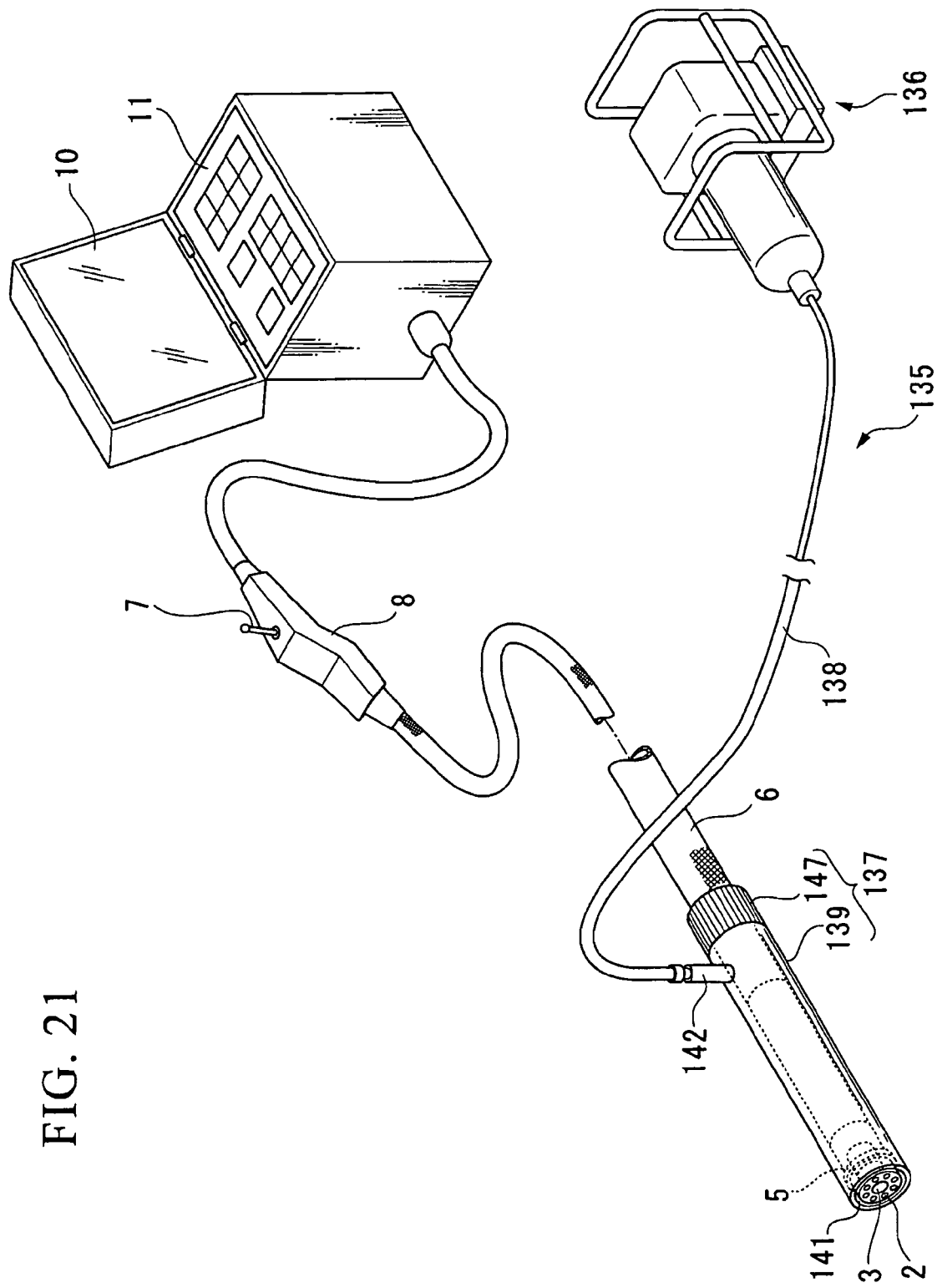
FIG. 21 is an overall block diagram showing a ninth embodiment of the endoscope system of the present invention.

As shown in FIG. 19 and FIG. 20, the endoscope used in the present embodiment is a so-called lateral vision-type endoscope 1A. The endoscope cooling device 120 of the present embodiment is provided with a cylindrical insertion portion fixing bracket 122 fitted to the outside of the distal end portion 50 at the insertion portion 6 of the above-described lateral vision-type endoscope 1A. The insertion portion fixing bracket 122 is provided with a cylindrical main body portion 124, two projections 126 installed on the main body portion 124 and three projecting streaks 128 also installed on the main body portion 124. The insertion portion fixing bracket 122 is made of a material such as metal, silicon, polyimide or Teflon. A notch 130 is formed in a part of the main body portion 124 so as to be deep in the length direction. The insertion portion fixing bracket 122 is pressed into the main body portion 124 in such a manner that the observation portion 3 and the illuminating portion 2 are exposed via the notch 130 by the lateral vision-type adaptor 50b attached at the distal end of the insertion portion 6 and thereby fitted to the outside of the distal end portion 50 of the insertion portion 6. Two projections 126 are formed so as to oppose the outer circumferential face at the distal end of the main body portion 124 across the notch 130. Three projecting streaks 128 are installed so as to be spaced at equal intervals in the circumferential direction on the outer circumferential face of the main body portion 124. Each of the projecting streaks 128 is formed from the front end to the back end of the main body portion 124 in the longitudinal direction of the main body portion 124.

On the other hand, a male thread portion 31a, which is screwed in a female thread portion 45a of the cap 45, is formed on the outer circumferential face at the distal end of the outer sheath 31, and a recessed portion 132 is formed on the inner circumferential face of the outer sheath 31. A distance between the side faces of the recessed portion 132 spaced apart in the circumferential direction is approximately equal to the distance between the two projections 126.

Since the lateral vision-type endoscope 1A is used in the present embodiment, no opening portion is formed on the cap 45 screwed with the distal end of the outer sheath 31 or no cover glass is installed. In place of these, a rectangular opening portion 46 extending in the length direction of the outer sheath 31 is formed on the outer sheath 31, and a cylindrical cover glass 47 is fitted into the outer sheath 31 so as to close the opening portion 46. Further, a notch 133 is formed in the distal end of the inner sheath 30 so as to correspond to the recessed portion 132 of the outer sheath 31. The notch 133 is arranged so as to correspond to the recessed portion 132 and also face the opening portion 46 of the outer sheath 31.

When the insertion portion fixing bracket 122 is inserted into the sheath 22, two projections 126 are fitted into the recessed portion 132 of the outer sheath 31 and the notch 133 corresponding to the recessed portion 132 and are also respectively in contact with both edges of the recessed portion 132. The observation portion 3 and the illuminating portion 2 of the endoscope 1A can be viewed laterally via the notch 110 of the insertion portion fixing bracket 122, the notch 133 of the inner sheath 30 and the opening portion 46 of the outer sheath 31.

The top faces of the three projecting streaks 128 are in contact with the inner circumferential face at the distal end side of the inner sheath 30. Therefore, the two projections 126 installed on the insertion portion fixing bracket 122 are guided by the recessed portion 132 formed at the distal end of the outer sheath 31 and the notch 133 formed in the distal end of the inner sheath 30, by which the insertion portion 6 is able to move back and forth in the direction of the central axis L6. However, the insertion portion 6 is regulated in moving rotationally around the central axis L6 because the projection 126 is engaged with the recessed portion 132. Further, the projection 126 is in contact with the back face 108a of the recessed portion 132, thereby regulating the distal end portion 50 in moving to the proximal end. In other words, a regulating means 134 is composed of the projections 126 and the recessed portion 132.

In the endoscope cooling device 120 of the present embodiment, since the regulating means 134 is used to regulate the insertion portion 6 in moving rotationally around the central axis L6, it is possible to prevent the change in the observation state due to the fact that an image acquired by the observation portion 3 via the window portion 43 is rotated. Further, the projection 106 is able to move back and forth inside the recessed portion 108 and the notch 110 in the direction of the central axis L6 and also regulated in moving to the proximal end until the projection 106 comes in contact with the back face 108a. Therefore, when a curved test substance is inserted into the insertion portion 6, the insertion portion 6 is allowed to move back and forth in the direction of the central axis L6 through the outer sheath 31, thus making it possible to eliminate a difference in the peripheral length between the insertion portion 6 and the outer sheath 31 positioned at the outer circumference.

Since the distal ends of the three projecting streaks 128 are in contact with the inner circumferential face of the inner sheath 30, the distal end portion 50 of the insertion portion 6 is arranged at the center of the inner sheath 30. Thereby, cooling air is not localized but flowing uniformly around the distal end portion 50 of the insertion portion 6, making it possible to prevent the change in the observation state due to the fact that there is a great change in the state where a light reflected on the cover glass 47 enters the observation portion 3. Further, since the insertion portion fixing bracket 122 of the regulating means 134 is fitted to the outside of the adaptor 50b at the distal end portion 50 of the insertion portion 6, no special shape is needed for the adaptor 50b itself. As a result, the present embodiment is applicable to various types of adaptors. In an adaptor-free endoscope, the insertion portion fixing bracket 122 may be directly fitted to the outside of the distal end of the insertion portion 6.

Incidentally, in the present embodiment, the three projecting streaks 128 are installed at the insertion portion fixing bracket 122. However, any number of the projecting streaks 128 may be installed.

Ninth Embodiment

Next, an explanation will be made for a ninth embodiment of the endoscope system of the present invention by referring to FIG. 21 to FIG. 25. In the present embodiment, members common to those used in the previous embodiments will be given the same numerals or symbols, an explanation of which will be omitted.

As shown in FIG. 21 to FIG. 25, the endoscope cooling device 135 of the present embodiment is provided with a compressor (a fluid supply means) 136 for cooling air (a cooling fluid), a sheath 137 extending in a cylindrical shape and a charge pipe 138 for connecting the compressor 136 with the sheath 137 for supplying the cooling air to the sheath 137.***2)

Figure 23:
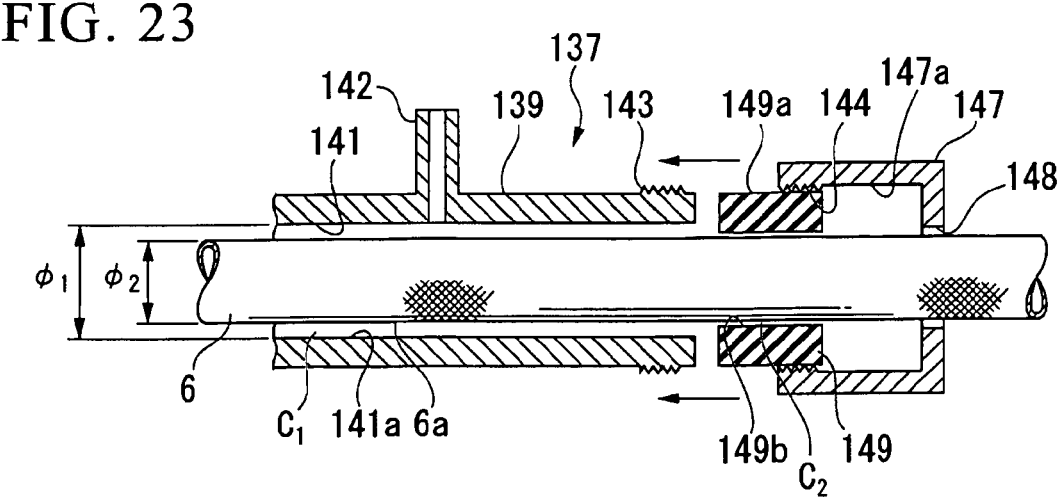
FIG. 23 to FIG. 25 are sectional side views of the proximal end portion of the sheath constituting the endoscope cooling device included in the ninth embodiment.

The sheath 137 is provided with a cylindrical sheath main body 139. The sheath main body 139 may be made of a rigid material such as a stainless steel tube or a soft material such as a heat-resistant PTFE tube. A cylindrical hole (insertion hole) 141 is formed on the sheath main body 139, and an insertion portion 6 of the endoscope 1 is inserted into the cylindrical hole 141. As shown in FIG. 23, an inner diameter φ1 of the sheath main body 139 is set to be larger than an outer diameter φ2 of the insertion portion 6. When the insertion portion 6 is inserted into the cylindrical hole 141, there is formed a clearance C1 between the outer circumferential face 6a of the insertion portion 6 and the inner circumferential face 141a of the cylindrical hole 141. Further, a fluid supply port (a cooling connection) 142 connected to the cylindrical hole 141 is installed at the proximal end portion of the sheath main body 139. The charge pipe 138 is attached to the fluid supply port 142.

Further, the sheath 137 of the present embodiment is provided with a bottomed cylindrical fixing ring 147. The fixing ring 147 is connected to the back end of the sheath main body 139 in a removable manner. In other words, a male thread portion 143 is formed on the outer circumferential face at the back end of the sheath main body 139, and a female thread portion 144 is formed on the inner circumferential face at the opening end of the fixing ring 147, and the male thread portion 143 is screwed in the female thread portion 144. Then, when the fixing ring 147 is rotated, the male thread portion 143 is screwed in the female thread portion 144 at a shifted position, by which the fixing ring 147 moves to the length direction of the sheath main body 139, that is, in a direction at which the back end face of the sheath main body 139 is brought closer to or spaced away from the bottom of the fixing ring 147. A hole 148 is formed on the bottom face of the fixing ring 147 and the insertion portion 6 is inserted into the hole 148.

Still further, an annular elastic ring (elastic body) 149 composed of an elastic member is installed inside the fixing ring 147. The outer diameter of the elastic ring 149 is set to be equal to or larger than the inner diameter of the fixing ring 147, and the inner diameter of the elastic ring 149 is set to be larger than the outer diameter φ2 of the insertion portion 6. Therefore, when the elastic ring 149 is fitted into the fixing ring 148, with the fixing ring 147 removed from the sheath main body 139, the outer circumferential face 149a of the elastic ring 149 comes in contact with the inner circumferential face 147a of the fixing ring 147. Further, when the insertion portion 6 is inserted into the fixing ring 147 via the elastic ring 149 in the state where the elastic ring 149 is fitted into the fixing ring 147, there is formed a clearance C2 between the outer circumferential face 6a of the insertion portion 6 and the inner circumferential face 149b of the elastic ring 149.

Further, when the male thread portion 144 of the fixing ring 147 is screwed in the female thread portion 143 formed at the proximal end portion of the sheath main body 139 and moved to a predetermined position of the sheath main body 139 in the state where the elastic ring 149 is fitted into the fixing ring 147, the front end face of the elastic ring 149 comes in contact with the rear end face of the sheath main body 139 and the rear end face of the elastic ring 149 comes in contact with the bottom face of the fixing ring 147.

Still further, the sheath 137 of the present embodiment is shorter than the insertion portion 6. Therefore, when the insertion portion 6 is inserted into the cylindrical hole 141, the sheath 137 is able to move along the length direction of the insertion portion 6.

Figure 22:
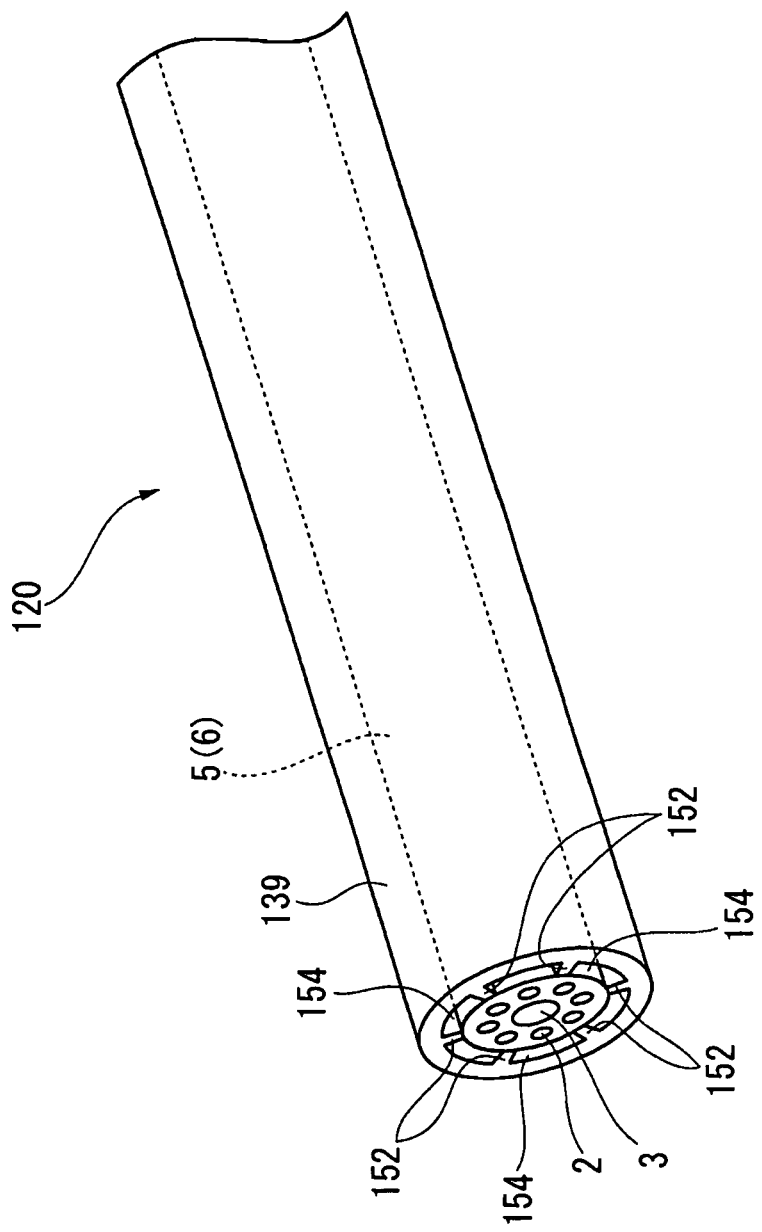
FIG. 22 is a perspective view of the distal end portion of the sheath constituting the endoscope cooling device included in the ninth embodiment.

As shown in FIG. 22, a plurality of projections 152 projecting to the center of the sheath main body 139 are installed on the inner circumferential face at the distal end of the sheath main body 139 so as to be spaced at equal intervals in the circumferential direction. The distance between two projections 152 facing each other across the center of the sheath main body 139 is equal to or slightly smaller than an outer diameter of the distal end portion 5 of the insertion portion 6. Thereby, the distal end portion 5 of the insertion portion 6 is supported by a plurality of projections 152 at the center of the sheath main body 139. A plurality of clearances 154 is formed between the outer circumferential face at the distal end portion 5 of the insertion portion 6 and the inner circumferential face of the sheath main body 139 so as to be divided by the projections 152.

Next, an explanation will be made for actions of the endoscope 1 and the endoscope cooling device 135, which constitute the endoscope system.

First, as will be described later, the sheath 137 is attached so as to cover the distal end portion 5 of the insertion portion 6. Then, the insertion portion 6 is inserted together with the sheath 137 into a test substance kept at high temperatures, for example, an engine immediately after use. Then, the illuminating portion 2 is used to illuminate the interior of the test substance, and the observation portion 3 is used to pick up an image of the interior of the test substance. Predetermined processing is given to an image pick-up signal generated at the observation portion 3, and the interior of the test substance is displayed on a display portion 10 as a picked-up image. While observing the image displayed on the display portion 10, the joy stick 13 is operated to change the direction of the distal end of the insertion portion 6, thus inspecting a desired portion.

The test substance is kept at high temperatures, which exceed maximum allowable temperatures at the observation portion 3 or the illuminating portion 2, as they are. Thus, there is a possibility that the observation portion 3 or the illuminating portion 2 may not be operated normally. Therefore, the compressor 136 is actuated to supply cooling air to the sheath 137. In other words, the cooling air from the compressor 136 is fed into a cylindrical hole 141 via the charge pipe 138 and the fluid supply port 142. As will be described later, since the space between the sheath 137 and the insertion portion 6 is sealed in an air-tight manner by an elastic ring 149, the cooling air fed into the cylindrical hole 141 is flown to the distal end of the sheath main body 139 through a clearance C1 formed between the sheath main body 139 and the insertion portion 6 and ejected from the distal end of the sheath main body 139 through a clearance 154. The cooling air passes through the distal end portion 5, by which the illuminating portion 2 and the observation portion 3 are cooled and protected.

Figure 24:
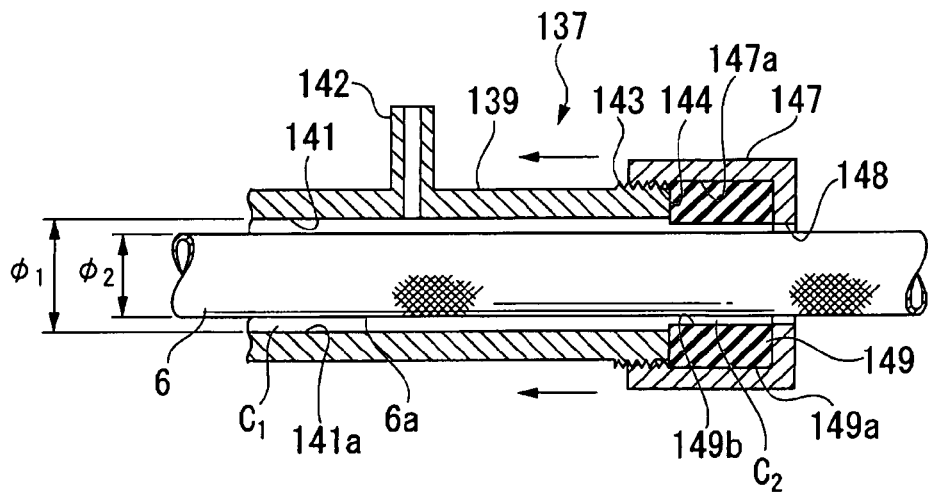

The endoscope cooling device 135 of the present embodiment will be fixed to the insertion portion 6 by the following procedures. Specifically, after the elastic ring 149 is fitted to a fixing ring 147, the fixing ring 147 is rotated to screw the male thread portion 143 in the female thread portion 144. When the fixing ring 147 is further rotated, the rear end face of the sheath main body 139 is brought closer to the bottom face of the fixing ring 147. As shown in FIG. 24, the front end face of the elastic ring 149 comes in contact with the rear end face of the sheath main body 139 and the rear end face of the elastic ring 149 comes in contact with the bottom face of the fixing ring 147. At this time, the outer circumferential face 149a of the elastic ring 149 comes in contact with the inner circumferential face 147a of the fixing ring 147, and a clearance C2 is formed between the inner circumferential face 149b of the elastic ring 149 and the outer circumferential face 6a of the insertion portion 6.

Subsequently, the insertion portion 6 is inserted into the cylindrical hole 141 of the sheath main body 139 through the elastic ring 149 from the hole 148 of the fixing ring 147. Thereby, the sheath 137 becomes movable all across the insertion portion 6 in the length direction thereof. In this instance, since it is necessary to cool the illuminating portion 2 and the observation portion 3 in particular, the sheath 137 is arranged so as to cover the distal end portion 5 of the insertion portion 6.

Figure 25:
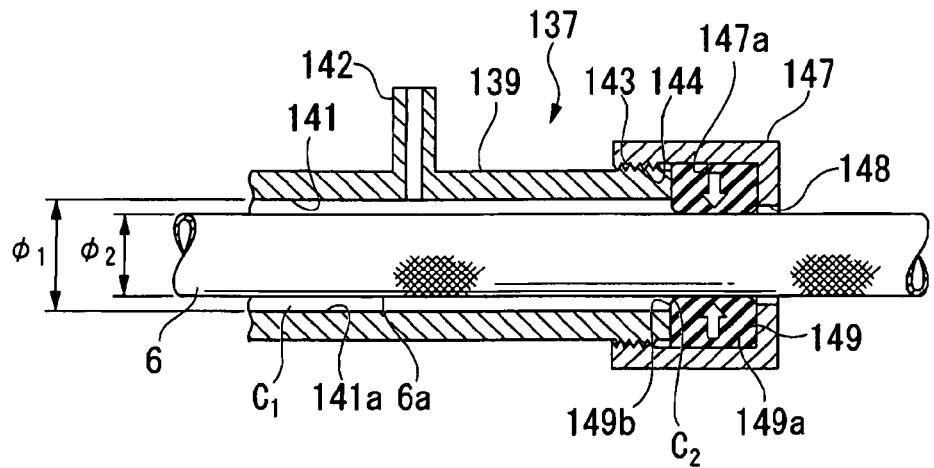

Thereafter, when the fixing ring 147 is further rotated in the same direction, the rear end face of the sheath main body 139 is brought closer to the bottom face of the fixing ring 147, and the elastic ring 149 is pressed from back and forth by the bottom face of the fixing ring 147 and the rear end face of the sheath main body 139. At this time, the outer circumferential face 149a of the elastic ring 149 is in contact with the inner circumferential face 147a of the fixing ring 147, thereby the elastic ring 149 is regulated in undergoing an elastic deformation so as to expand the diameter. Then, since a clearance C2 is formed between the inner circumferential face 149b of the elastic ring 149 and the outer circumferential face 6a of the insertion portion 6, the elastic ring 149 is elastically deformed so as to reduce the inner diameter, as shown in FIG. 25. Therefore, the outer circumferential face 6a of the insertion portion 6 is tightly adhered all across the circumference to the inner circumferential face 149b of the elastic ring 149, thereby regulating the movement of the sheath 137 and also sealing the space between the sheath 137 and the insertion portion 6 in an air-tight manner. Thereby, the sheath 137 is fixed to the insertion portion 6.

In this instance, it may be necessary to cool not only the distal end portion 5 of the insertion portion 6 but also the intermediate portion and the proximal end portion of the insertion portion 6 in particular, depending on the constitution of the insertion portion 6 or the state of the test substance. At this time, the sheath 137 is arranged on these portions necessary to be cooled and then fixed to the insertion portion 6, as described above.

According to the endoscope cooling device 135 of the present embodiment, the sheath 137 can be easily fixed to any given place of the insertion portion 6 necessary to be cooled. Then, the sheath 137 shorter than the insertion portion 6 is arranged at the given place necessary to be cooled, by which cooling air can be fed at the place necessary to be cooled in a concentrated manner to cool effectively the insertion portion 6 with a smaller quantity of the cooling air. As a result, providing only a single sheath 137 enables not only to easily cope with various types of insertion portions 6 different in length but also to improve the efficiency in cooling the insertion portion 6. Further, unlike a conventional endoscope cooling device, there is no need to provide a cooling medium or a cooling tank inside the sheath 137, thereby realizing a simple constitution to prevent the distal end portion of the insertion portion 6 from expanding in diameter.

Further, the fixing ring 147 is connected to the sheath main body 139 in a removable manner. Therefore, where the sheath main body 139 or the fixing ring 147 is in failure, one of them can be easily repaired or replaced to improve the economic efficiency and convenience. In particular, when the sheath main body 139 is made of an elastic member, the sheath main body 139 is easily breakable. However, even upon breakage of the sheath main body 139, only the sheath main body 139 needs to be easily repaired or replaced.

In the present embodiment, the elastic ring 149 is fitted into the fixing ring 147, thereby the outer circumferential face 149a of the elastic ring 149 is allowed to be in contact with the inner circumferential face 147a of the fixing ring 147 and regulating the elastic ring 149 so as not to expand the diameter. The present invention shall not be limited thereto and the elastic ring 149 can be changed in constitution for reducing the diameter, whenever necessary. For example, the elastic ring 149 is in advance given bending properties so as to reduce the diameter when pressed from the front and the back or a projection is installed on the inner circumferential face 147a of the fixing ring 147 radially and inwardly.

Tenth Embodiment

Next, an explanation will be made for a tenth embodiment of the endoscope system of the present invention by referring to FIG. 26 and FIG. 27. In the present embodiment, members common to those used in the previous embodiments will be given the same numerals or symbols, an explanation of which will be omitted.

Figure 26:
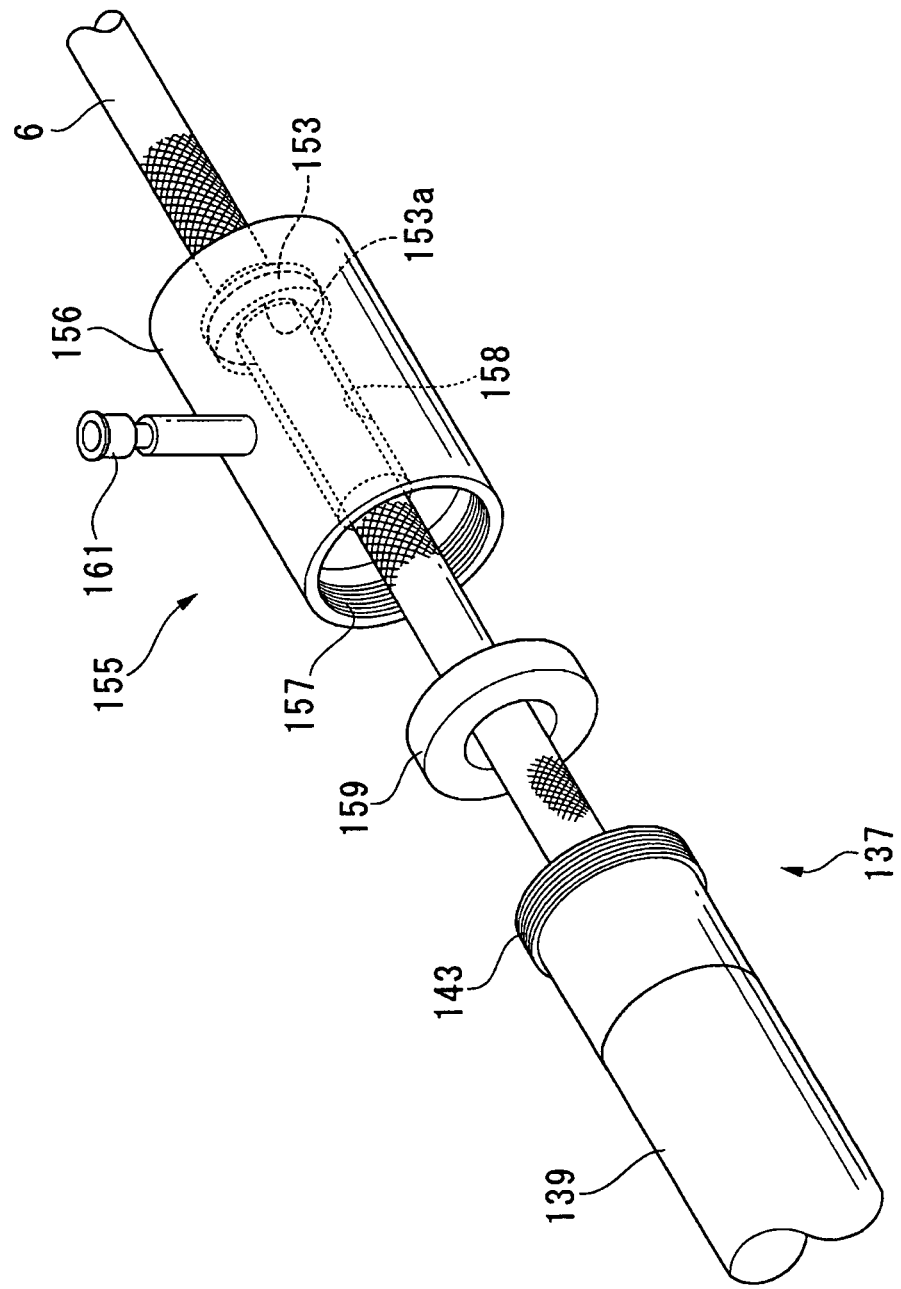
FIG. 26 is a view showing a tenth embodiment of the endoscope system of the present invention and an exploded perspective view of the proximal end portion of the sheath constituting the endoscope cooling device included in the present embodiment.
Figure 27:
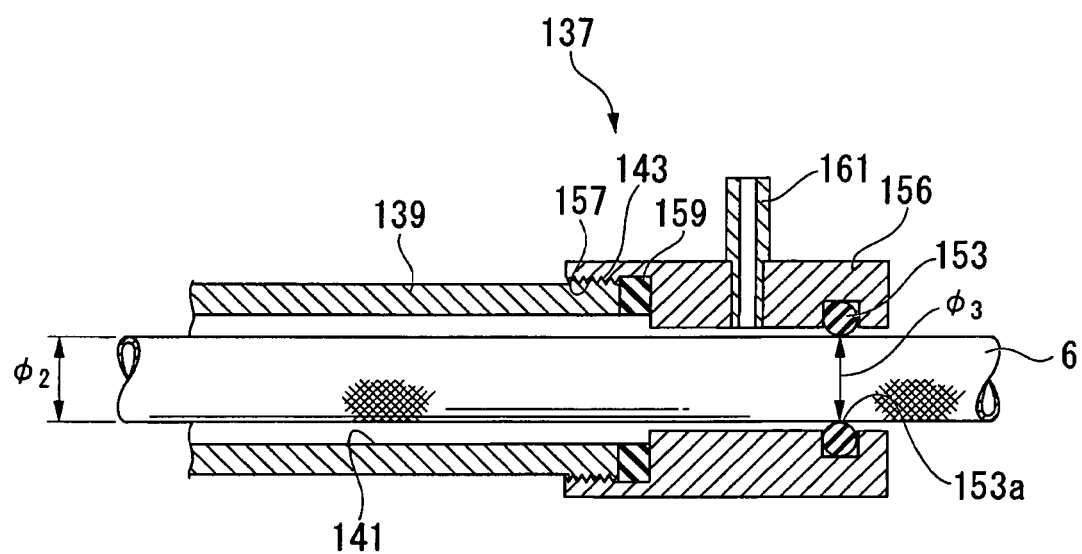
FIG. 27 is a sectional side view of the proximal end portion of the sheath constituting the endoscope cooling device included in the tenth embodiment.

As shown in FIG. 26 and FIG. 27, in the endoscope cooling device 155 of the present embodiment, the sheath 137 is provided with a cylindrical connection 156. A female thread portion 157 is formed on the inner circumferential face at the distal end of the connection 156. A male thread portion 143 on the sheath main body 139 is screwed in the female thread portion 157, by which the connection 156 is connected to the proximal end portion of the sheath main body 139 in a removable manner. The cylindrical hole 158 of the connection 156 is larger in inner diameter at the distal end than at the proximal end. An annular rubber packing 159 is installed at the distal end of the cylindrical hole 158, which is expanded in diameter.

An annular elastic O-ring 153 made of an elastic member is installed at the back end of the cylindrical hole 158. An inner diameter $\phi 3$ of the elastic O-ring 153 is smaller than an outer diameter $\phi 2$ of the insertion portion 6. Further, a fluid supply port 161 connected to the cylindrical hole 158 of the connection 156 is formed at the connection 156.

When the connection 156 is connected to the sheath main body 139, the space between the sheath main body 139 and the connection 156 is sealed by the rubber packing 159 in an air-tight manner. Then, the insertion portion 6 is inserted into the cylindrical hole 158 and the cylindrical hole 141 from the back end of the connection 156. Since the inner diameter $\phi 3$ of the elastic O-ring 153 is set to be smaller than the outer diameter $\phi 2$ of the insertion portion 6, the elastic O-ring 153 is in contact with the outer circumferential face 6a of the insertion portion 6 and also elastically deformed so as to be expanded in diameter. Then, the inner circumferential face 153a of the elastic o-ring 153 is tightly adhered to the outer circumferential face 6a of the insertion portion 6 all across the circumference due to a restoring force of the elastic O-ring 153, by which the space between the connection 156 and the insertion portion 6 is sealed in an air-tight manner.

Further, at this time, the sheath 137 is regulated in movement by a frictional force acting on the space between the elastic O-ring 153 and the outer circumferential face 6a of the insertion portion 6. However, when applying a larger force than the frictional force, the sheath 137 moves in the length direction, while the inner circumferential face 153a of the elastic O-ring 153 slides on the outer circumferential face 6a of the insertion portion 6.

Therefore, when a force larger than the frictional force is given to the length direction, with the sheath main body 139 gripped, the sheath 137 can be moved to a predetermined position at which cooling is needed. When the sheath main body 136 is released from a hand, the sheath 137 is fixed, as it is.

As described so far, according to the endoscope cooling device 155 of the present embodiment, not only are effects similar to those of the above embodiments obtained but also the constitution can be simplified.

In the present embodiment, the inner diameter φ3 of the elastic O-ring 153 is smaller than the outer diameter φ2 of the insertion portion 6. However, the inner diameter φ3 of the elastic O-ring 153 may be equal to the outer diameter φ2 of the insertion portion 6. In addition, when the inner diameter is set to be smaller, the sheath 137 can be fixed more firmly.

In the present embodiment, the connection 156 is fixed to the insertion portion 6 by a frictional force resulting from the elastic O-ring 160. However, the connection can be fixed securely to any given position at the insertion portion 6 by applying a method described in the ninth embodiment.

Eleventh Embodiment

Next, an explanation will be made for an eleventh embodiment of the endoscope system of the present invention by referring to FIG. 28 to FIG. 30. In the present embodiment, members common to those used in the previous embodiments will be given the same numerals or symbols, an explanation of which will be omitted.

Figure 28:
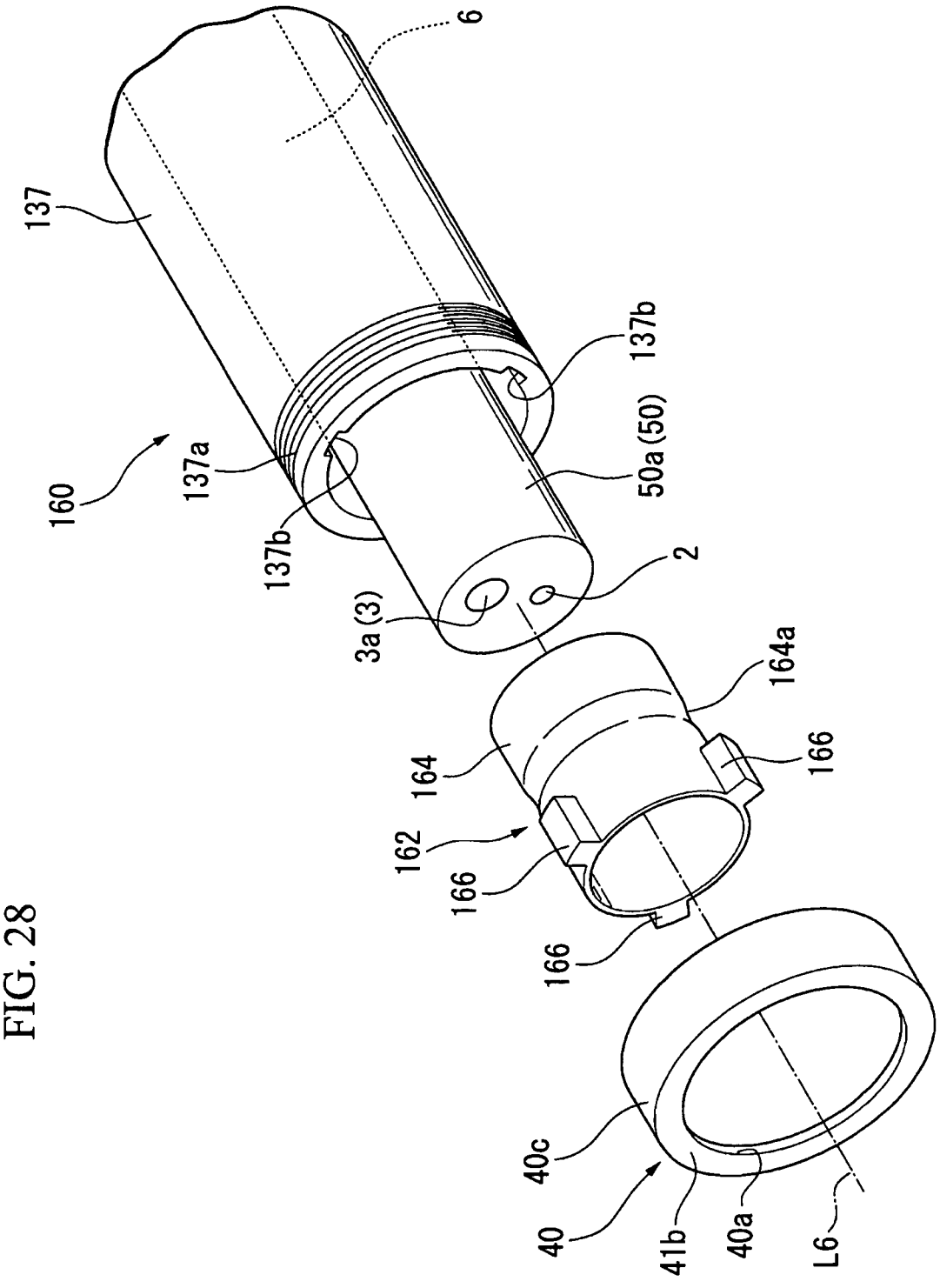
FIG. 28 is a view showing an eleventh embodiment of the endoscope system of the present invention and an exploded perspective view of the distal end portion of the sheath constituting the endoscope cooling device included in the present embodiment.
Figure 29:
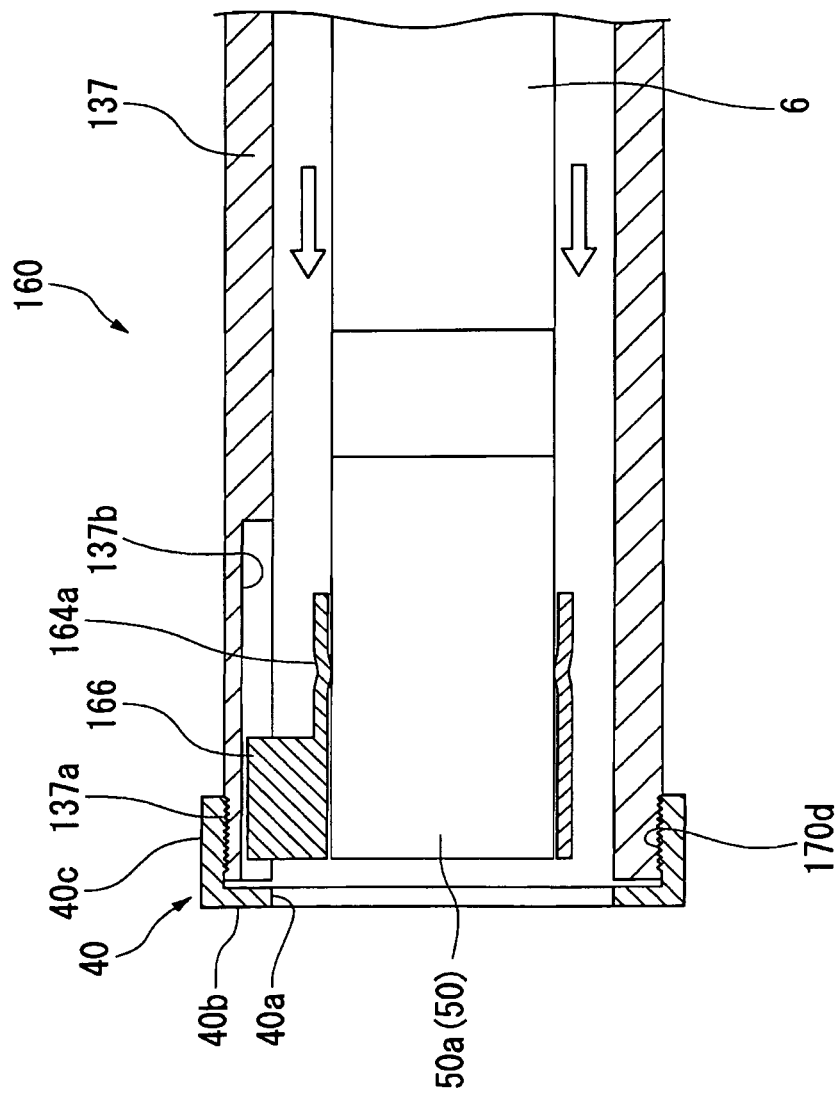
FIG. 29 is a sectional side view of the sheath of the endoscope cooling device included in the eleventh embodiment.

As shown in FIG. 28 and FIG. 29, the endoscope cooling device 160 of the present embodiment is provided with a cylindrical insertion portion fixing bracket 162 fitted to the outside of the distal end portion 50 of the insertion portion 6. The insertion portion fixing bracket 162 is provided with a cylindrical main body portion 164 and three projecting streaks 166 installed on the main body portion 164. The insertion portion fixing bracket 162 is made of a material such as metal, silicon, polyimide or Teflon. A diameter-reduced portion 164a is formed at an intermediate portion of the main body portion 164 in the length direction. The inner diameter of the diameter-reduced portion 164a is slightly smaller than the outer diameter of the adaptor 50a. The adaptor 50a is pressed into the main body portion 164 so as to expand the diameter of the diameter-reduced portion 164a, by which the insertion portion fixing bracket 162 is fitted to the outside of the distal end portion 50 of the insertion portion 6 and fixed thereto by utilizing the elastic force of the diameter-reduced portion 164a. The three projecting streaks 166 are installed on the outer circumferential face at the distal end of the main body portion 164 so as to be spaced at equal intervals in the peripheral direction and extended from the distal end to an intermediate portion in the length direction of the main body portion 164.

On the other hand, three grooves 137b are formed on the inner circumferential face at the distal end of the sheath 137 so as to be spaced at equal intervals in the circumferential direction. Each of the grooves 137b is formed to be longer than the projecting streaks 166 in the length direction of the sheath 137. These three projecting streaks 166 of the insertion portion fixing bracket 162 are respectively engaged with the three grooves 137b on the sheath 137, and the top faces of the projecting streaks 166 are respectively in contact with the bottom faces of the grooves 137b.

A male thread portion 137a is formed on the outer circumferential face at the distal end of the sheath 137. Only the cap 40 excluding the cover glass is attached at the distal end of the sheath 137. When the projecting streaks 166 of the insertion portion fixing bracket 162 attached at the distal end portion 50 of the insertion portion 6 are respectively engaged with the grooves 137b on the sheath 137 and the cap 40 is then attached at the distal end of the sheath 137, the main body portion 40b of the cap 40 is in contact with the distal end face of the sheath 137 all across the circumference, by which the projecting streaks 166 engaged with the grooves 137b are prevented from being detached from the grooves 137b. Cooling air is fed between the insertion portion fixing bracket 162 and the sheath 137 and discharged in front of the sheath 137 through the opening portion 40a of the cap 40.

Since the three projecting streaks 166 of the insertion portion fixing bracket 162 are respectively engaged with the three grooves 137b on the sheath 137, the insertion portion 6 is able to move back and forth in the direction of the central axis L6 by the projecting streaks 166 guided by the grooves 137b. However, since the projecting streaks 166 are engaged with the grooves 137b, the insertion portion 6 is regulated in moving rotationally around the central axis L6.

According to the endoscope cooling device 160 of the present embodiment, since the insertion portion 6 is regulated in moving rotationally around the central axis L6, it is possible to prevent the change in the observation state due to the fact that an image acquired by the observation portion 3 is rotated. Further, the projecting streaks 166 are guided by the grooves 137b. Therefore, when a curved test substance is inserted into the insertion portion 6, the insertion portion 6 is allowed to move back and forth in the direction of the central axis L6 through the sheath 137, thus making it possible to eliminate a difference in the peripheral length between the insertion portion 6 and the sheath 137 positioned at the outer circumference.

Since the top faces of the three projecting streaks 166 are respectively in contact with the bottom faces of the three grooves 137b formed on the inner circumferential face of the sheath 137, the distal end portion 50 of the insertion portion 6 attached to the adaptor 50a is always arranged at the center of the sheath 137. Thereby, cooling air is not localized but flowing uniformly around the distal end portion 50 of the insertion portion 6. Further, since the insertion portion fixing bracket 162 is fitted to the outside of the adaptor 50a at the distal end portion 50 of the insertion portion 6, no special shape is needed for the adaptor 50a itself. As a result, the present embodiment is applicable to various types of adaptors. In an adaptor-free endoscope, the insertion portion fixing bracket 162 may be directly fitted at the outside of the main body portion 5a at the distal end portion 5.

Incidentally, in the present embodiment, three projecting streaks 166 are installed at the insertion portion fixing bracket 162. Any number of the projecting streaks 166 may be installed, however, it is necessary to change the number of the grooves 137b according to the change in the number of the projecting streaks 166.

Figure 30:
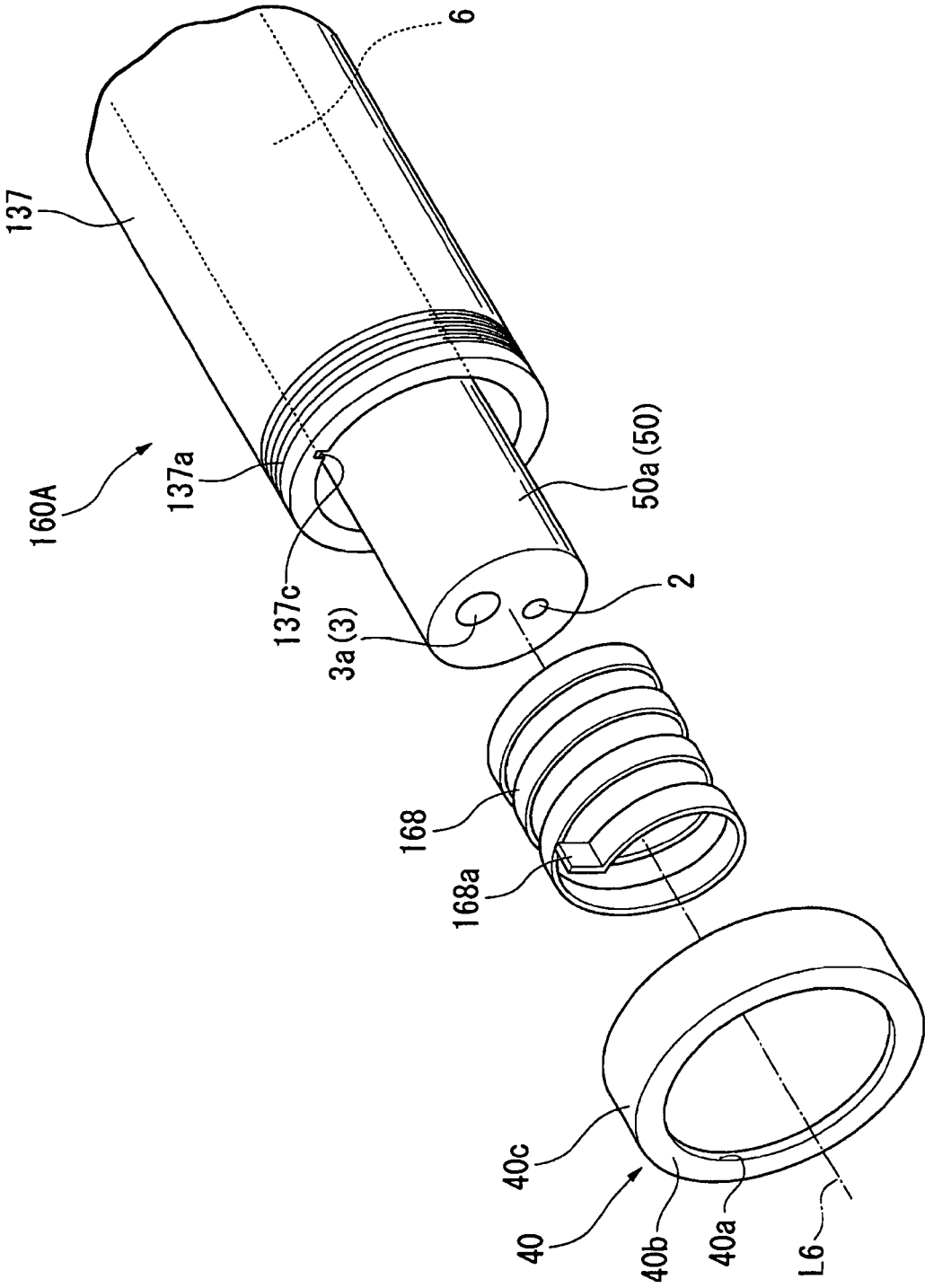
FIG. 30 is a view showing a first exemplified variation of the eleventh embodiment and an exploded perspective view of the distal end portion of the sheath included in the exemplified variation.

FIG. 30 shows a first exemplified variation of the present embodiment. The endoscope cooling device 160A of the present exemplified variation is provided with a coil-shaped insertion portion fixing bracket 168 fitted to the outside of the distal end portion 50 of the insertion portion 6. The insertion portion fixing bracket 168 is made by deforming a long metal plate into a helical shape, and the inner diameter thereof is slightly smaller than the outer diameter of the adaptor 50a. The adaptor 50a is pressed inside so as to expand the inner diameter of the insertion portion fixing bracket 168 or main body portion, by which the insertion portion fixing bracket 168 is fitted to the outside of the distal end portion 50 of the insertion portion 6 and fixed duly by utilizing an elastic force of the coil. A projection 168a, which is folded outwardly, is formed at one end of the metal plate.

On the other hand, one groove 137c is formed on the inner circumferential face at the distal end of the sheath 137. The groove 137c is formed so as to be longer than the width of the projection 168a in the length direction of the sheath 137. The projection 168a of the insertion portion fixing bracket 168 is engaged with the groove 137c on the sheath 137. Therefore, the distal end portion 50 of the insertion portion 6 is able to move back and forth in the direction of the central axis L6 but regulated in moving rotationally around the central axis L6 through the sheath 137 at the distal end portion 50 of the insertion portion 6.

Figure 31:
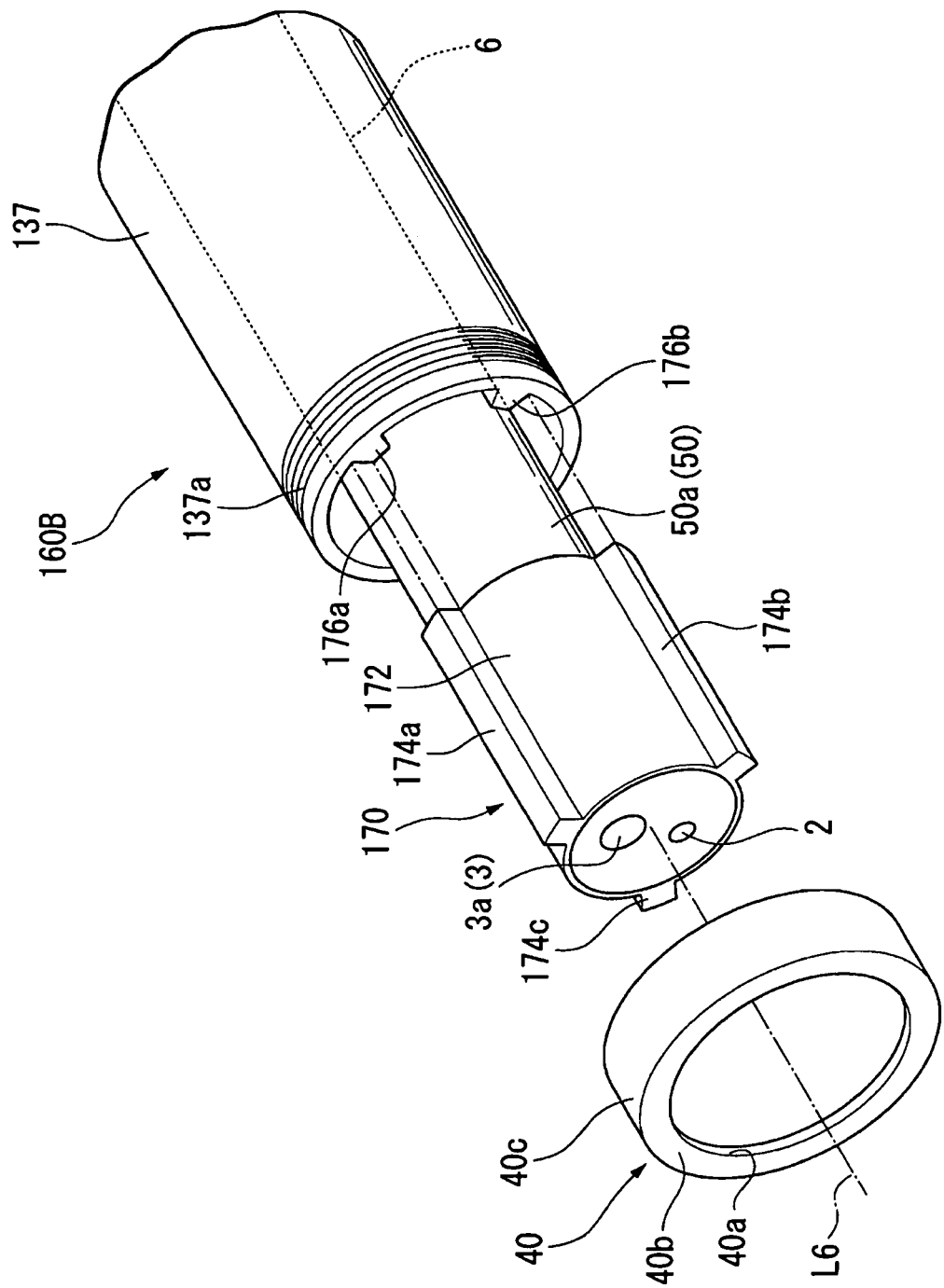
FIG. 31 is a view showing a second exemplified variation of the eleventh embodiment and an exploded perspective view of the distal end portion of the sheath included in the exemplified variation.

FIG. 31 shows a second exemplified variation of the present embodiment. The endoscope cooling device 160B of the present exemplified variation is provided with a cylindrical insertion portion fixing bracket 170 fitted to the outside of the distal end portion 50 of the insertion portion 6. The insertion portion fixing bracket 170 is provided with a cylindrical main body portion 172 and three projecting streaks 174a, 174b, 174c installed at the main body portion 172. The insertion portion fixing bracket 170 is made of a material such as metal, silicon, polyimide, or Teflon. The adaptor 50a is pressed into the main body portion 172, by which the insertion portion fixing bracket 170 is fitted to the outside of the distal end portion 50 of the insertion portion 6. Each of the projecting streaks 174a, 174b, 174c is installed so as to be spaced at equal intervals on the outer circumferential face at the distal end of the main body portion 172 in the circumferential direction and extended from the distal end to the back end in the length direction of the main body portion 172.

On the other hand, two projecting streaks 176a, 176b are formed on the inner circumferential face at the distal end of the sheath 137 so as to be spaced at equal intervals in the circumferential direction. Each of the projecting streaks 176a, 176b is formed so as to be longer than the projecting streak 174a in the length direction of the sheath 137. The projecting streaks 174a, 174b, 174c of the insertion portion fixing bracket 170 are in contact with the inner circumferential face of the sheath 137. Further, one projecting streak 176a of the sheath 137 is in contact with the projecting streak 174a of the insertion portion fixing bracket 170 so as to be adjacent to one side of the sheath 137 in the circumferential direction, while the other projecting streak 176b of the sheath 137 is in contact with the projecting streak 174b of the insertion portion fixing bracket 170 so as to be adjacent to the other side of the sheath 137 in the circumferential direction. Therefore, the distal end portion 50 of the insertion portion 6 is able to move back and forth in the direction of the central axis L6 but regulated in moving rotationally around the central axis L6 through the sheath 137 at the distal end portion 50 of the insertion portion 6.

Figure 32:
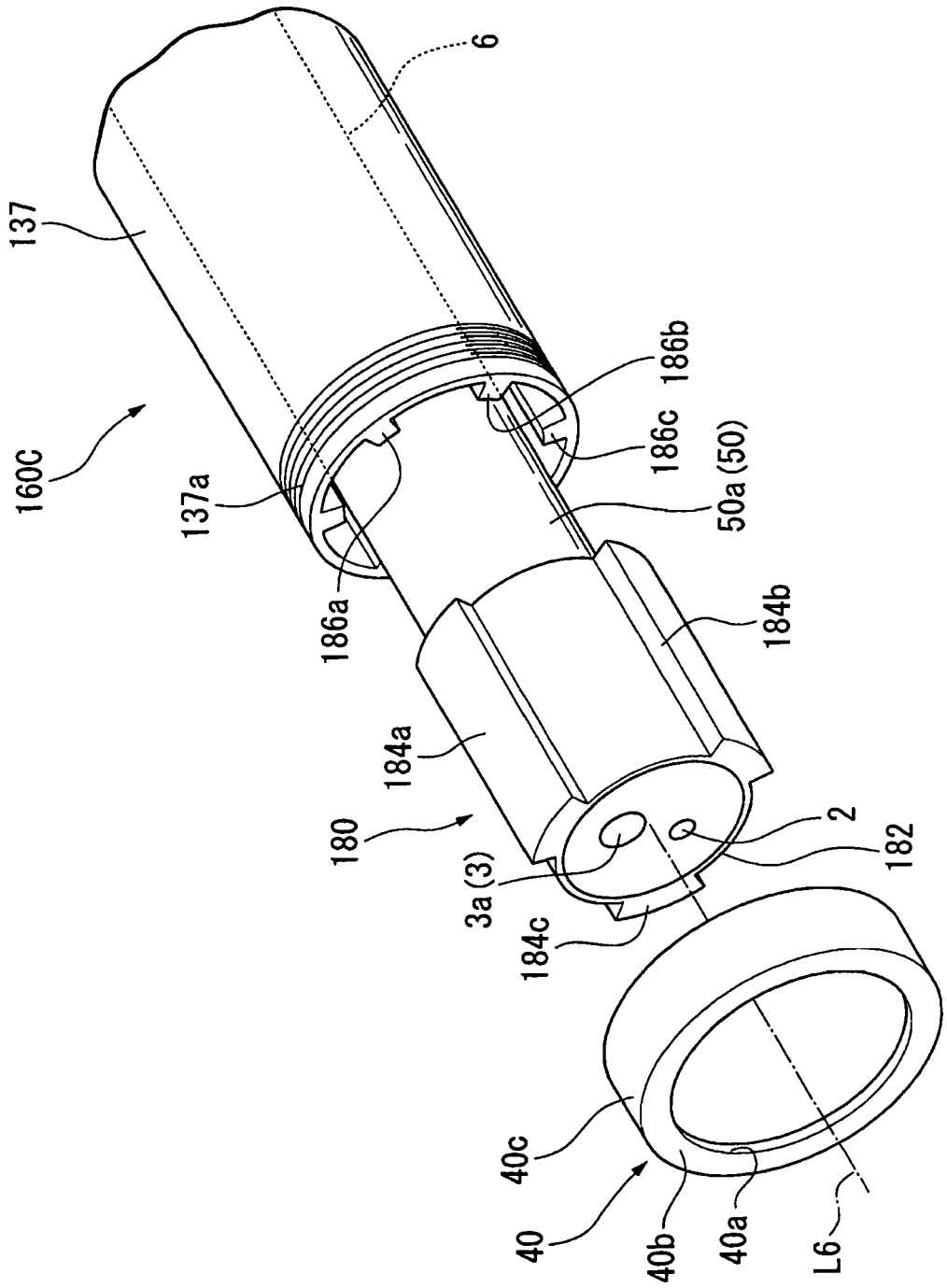
FIG. 32 is a view showing a third exemplified variation of the eleventh embodiment and an exploded perspective view of the distal end portion of the sheath included in the exemplified variation.
Figure 33:
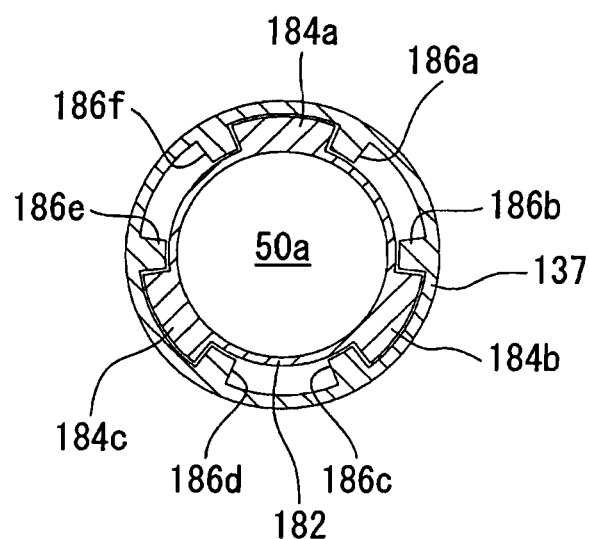
FIG. 33 is a sectional view of the sheath included in the third exemplified variation of the eleventh embodiment.

FIG. 32 and FIG. 33 show a third exemplified variation of the present embodiment. The endoscope cooling device 160C of the exemplified variation is provided with a cylindrical insertion portion fixing bracket 180 fitted to the outside of the distal end portion 50 of the insertion portion 6. The insertion portion fixing bracket 180 is provided with a cylindrical main body portion 182 and three projecting streaks 184a, 184b, 184c installed on the main body portion 182. The insertion portion fixing bracket 180 is made of a material such as metal, silicon, polyimide or Teflon. The adaptor 50a is pressed into the main body portion 182, by which the insertion portion fixing bracket 180 is fitted to the outside of the distal end portion 50 of the insertion portion 6. Each of the projecting streaks 184a, 184b, 184c is installed on the outer circumferential face at the distal end of the main body portion 182 so as to be spaced at equal intervals in the circumferential direction, and extended from the distal end to the back end in the length direction of the main body portion 182.

On the other hand, six projecting streaks 186a to 186f are formed on the inner circumferential face at the distal end of the sheath 137 so as to be spaced at equal intervals in the circumferential direction. Each of the projecting streaks 186a to 180f is formed so as to be longer than the projecting streak 184 in the length direction of the sheath 137. The projecting streaks 184a, 184b, 184c of the insertion portion fixing bracket 180 are in contact with the inner circumferential face of the sheath 137. Further, two projecting streaks 186a, 186b of the sheath 137 are arranged between the projecting streaks 184a, 184b of the insertion portion fixing bracket 180. In this instance, the projecting streak 186a is in contact with the projecting streak 184a so as to be adjacent to one side of the sheath 137 in the circumferential direction, while the projecting streak 186b is in contact with the projecting streak 184b so as to be adjacent to the other side of the sheath 137 in the circumferential direction. A flow path for cooling air is installed between the projecting streak 186a and the projecting streak 186b, between the projecting streak 186c and the projecting streak 186d and between the projecting streak 186e and the projecting streak 186f. In a similar manner, two projecting streaks 186c, 186d of the sheath 137 are arranged between the projecting streaks 184b, 184c of the insertion portion fixing bracket 180, and two projecting streaks 186e, 186f of the sheath 137 are arranged between the projecting streaks 184c, 184a of the insertion portion fixing bracket 180. Therefore, the distal end portion 50 of the insertion portion 6 is able to move back and forth in the direction of the central axis L6 but regulated in moving rotationally around the central axis L6 through the sheath 137 at the distal end portion 50 of the insertion portion 6. A flow path for cooling air is installed respectively between the projecting streak 186a and the projecting streak 186b, between the projecting streak 186c and the projecting streak 186d, and between the projecting streak 186e and the projecting streak 186f.

Figure 34:
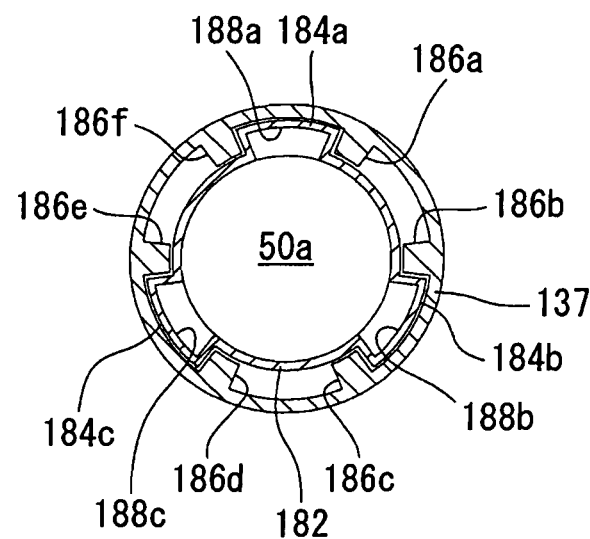
FIG. 34 is a sectional view showing another exemplified variation of the sheath included in the third exemplified variation of the eleventh embodiment.

Incidentally, in the present exemplified variation, as shown in FIG. 34, grooves 188a, 188b, 188c, which can be used as the flow path for cooling air, may be formed respectively inside the projecting streaks 184a, 184b, 184c of the insertion portion fixing bracket 180.

Figure 35:
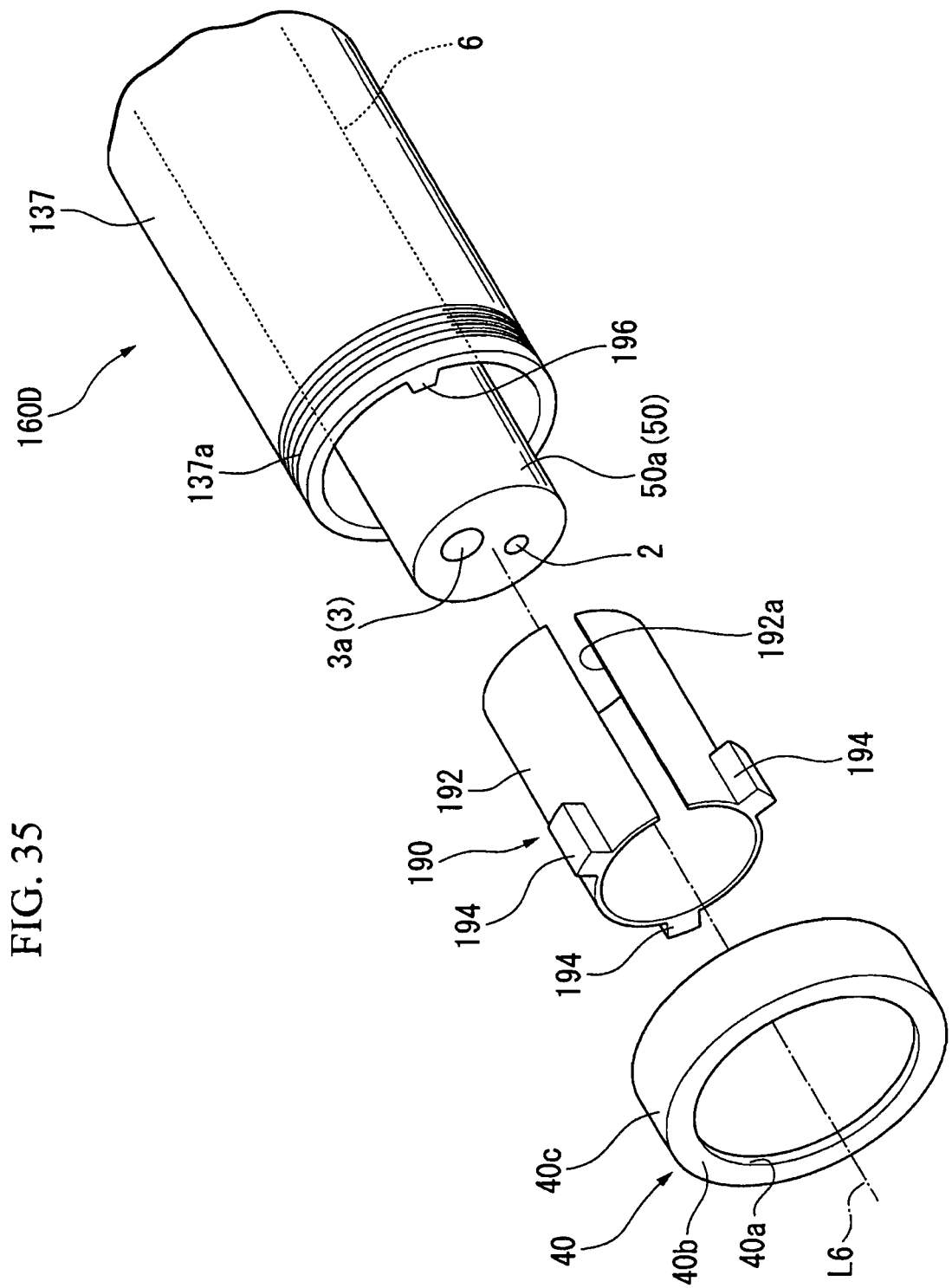
FIG. 35 is a view showing a fourth exemplified variation of the eleventh embodiment and an exploded perspective view of the distal end portion of the sheath included in the exemplified variation.

FIG. 35 shows a fourth exemplified variation of the present embodiment. The endoscope cooling device 160D of the exemplified variation is provided with a cylindrical insertion portion fixing bracket 190 fitted to the outside of the distal end portion 50 of the insertion portion 6. The insertion portion fixing bracket 190 is provided with a cylindrical main body portion 192 and three projecting streaks 194 installed at the main body portion 192. The insertion portion fixing bracket 190 is made of a material such as metal, silicon, polyimide or Teflon. The inner diameter of the main body portion 192 is slightly smaller than the outer diameter of the adaptor 50a.

Further, a slit 192*a* having a constant width is formed at the main body portion 192 in the length direction. The adaptor 50*a* is pressed into the main body portion 192 so as to expand the diameter of the main body portion 192, by which the insertion portion fixing bracket 190 is fitted to the outside of the distal end portion 50 of the insertion portion 6 and fixed duly by utilizing the elastic force of the main body portion 192. The three projecting streaks 196 are installed on the outer circumferential face at the distal end of the main body portion 192 so as to be spaced at equal intervals in the circumferential direction and extended from the distal end to the intermediate portion in the length direction of the main body portion 192.

On the other hand, a projecting streak 196 is formed on the inner circumferential face at the distal end of the sheath 137. The projecting streak 196 is formed so as to be longer than the slit 192*a* in the length direction of the sheath 137. Three projecting streaks 194 of the insertion portion fixing bracket 190 are in contact with the inner face of the sheath 137. Further, the projecting streak 196 of the sheath 137 is engaged with the slit 192*a* of the insertion portion fixing bracket 190. Therefore, the distal end portion 50 of the insertion portion 6 is able to move back and forth in the direction of the central axis L6 but regulated in moving rotationally around the central axis L6 through the sheath 137 at the distal end portion 50 of the insertion portion 6.

Twelfth Embodiment

Next, an explanation will be made for a twelfth embodiment of the endoscope system of the present invention by referring to FIG. 36 and FIG. 37. In the present embodiment, members common to those used in the previous embodiments will be given the same numerals or symbols, an explanation of which will be omitted.

Figure 36:
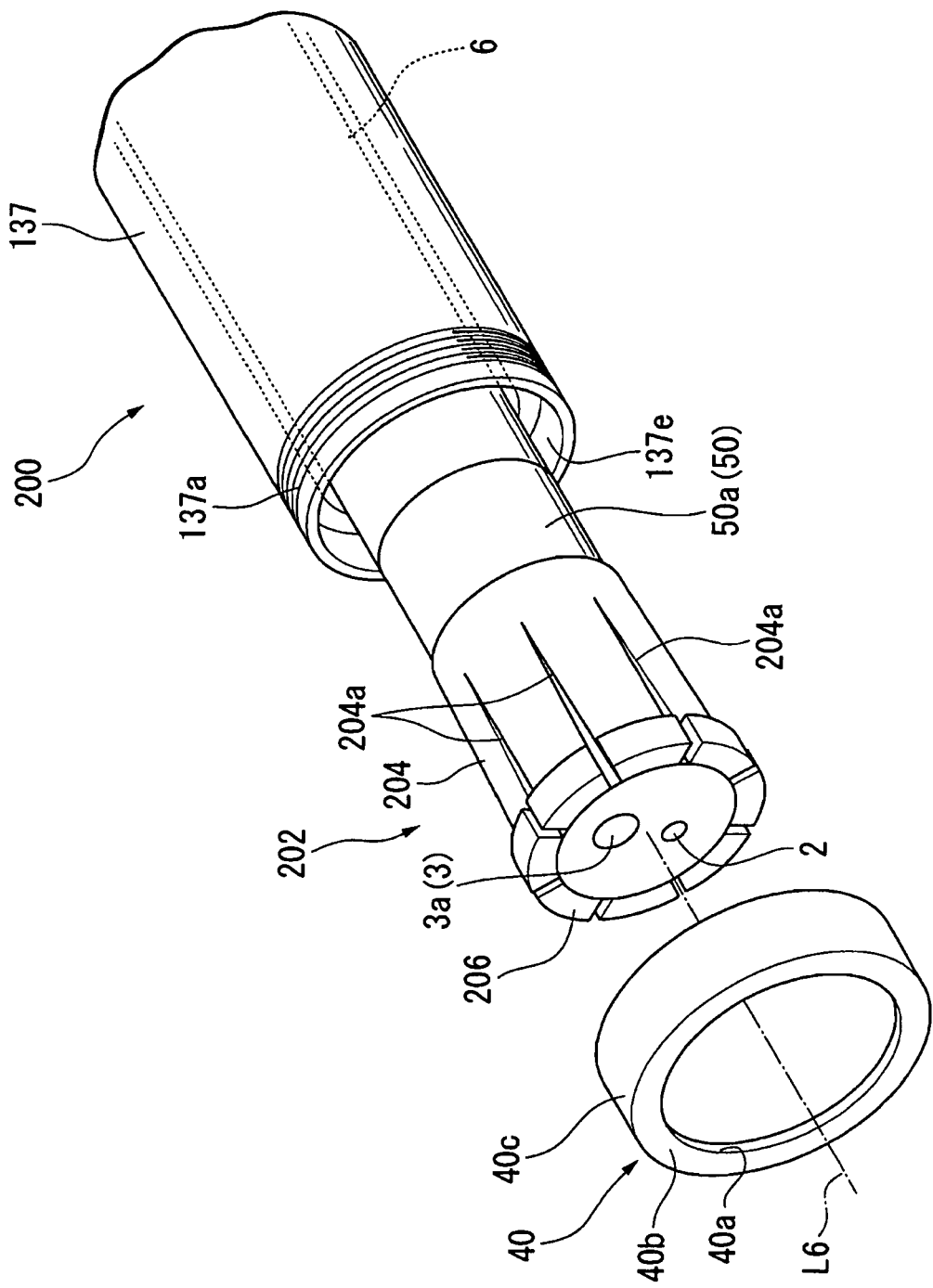
FIG. 36 is a view showing a twelfth embodiment of the endoscope system of the present invention and an exploded perspective view of the distal end portion of the sheath constituting the endoscope cooling device included in the present embodiment.
Figure 37:
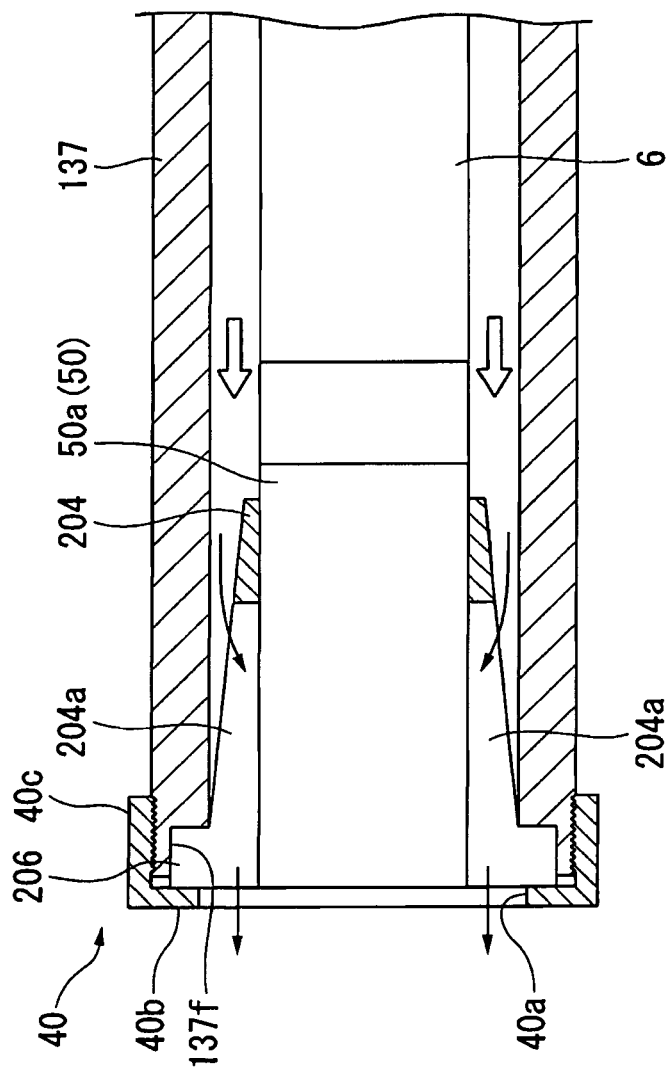
FIG. 37 is a sectional side view of the sheath of the endoscope cooling device included in the twelfth embodiment.

As shown in FIG. 36 and FIG. 37, the endoscope cooling device 200 of the present embodiment is provided with a cylindrical insertion portion fixing bracket 202 fitted to the outside of the distal end portion 50 of the insertion portion 6. The insertion portion fixing bracket 202 is provided with a cylindrical main body portion 204 and a circular flange portion 206 installed at the distal end main body portion 204. The insertion portion fixing bracket 202 is made of a material such as metal, silicon, polyimide or Teflon. A plurality of slits 204*a* is formed at the main body portion 204 so as to be cut from the distal end to an intermediate portion. The slits 204*a* are formed so as to be spaced at equal intervals in the circumferential direction of the main body portion 204, and the distal end portions of the flange portion 206 and the main body portion 204 are divided by the slits 204*a* in the circumferential direction. The inner diameter of the main body portion 204 is approximately equal to the outer diameter of the adaptor 50*a*, and the outer diameter of the main body portion 204 is gradually made smaller from the distal end to the back end. The outer diameter of the insertion portion fixing bracket 202 at the distal end of the main body portion 204 is larger than the inner diameter of the sheath 137, and the outer diameter of the main body portion 204 at the back end is smaller than the inner diameter of the sheath 137. The insertion portion fixing bracket 202 is fitted to the outside of the distal end portion 50 of the insertion portion 6, with the flange portion 206 placed forward.

On the other hand, a large diameter portion 137*e*, which is larger in diameter than other portions, is formed on the inner circumferential face at the distal end of the sheath 137. The diameter of the large diameter portion 137*e* is larger than the outer diameter of the flange portion 206, and the depth of the large diameter portion 137*e* is deeper than the thickness of the flange portion 206.

When the insertion portion fixing bracket 202 attached at the distal end portion 50 of the insertion portion 6 is inserted into the sheath 137 in such a manner that the flange portion 206 is fitted into the large diameter portion 137*e*, the inner circumferential face at the distal end of the sheath 137 comes in contact with the outer circumferential face at the main body portion 204 of the insertion portion fixing bracket 202. When the insertion portion fixing bracket 202 is further pressed into the sheath 137, the main body portion 204 is deformed so as to reduce the inner diameter at the distal end, thereby holding strongly the distal end portion 50 of the insertion portion 6. Then, when a cap 40 is attached to the distal end of the sheath 137, the flange portion 206 is held between the main body portion 40*b* of the cap 40 and the back face of the large diameter portion 137. Thereby, the distal end portion 50 of the insertion portion 6 is fixed to the sheath 137 to regulate the insertion portion 6 in moving rotationally around the central axis L6. Cooling air flows through the slits 204*a* on the insertion portion fixing bracket 202 and is discharged in front of the sheath 137 through the opening portion 40*a* of the cap 40.

According to the endoscope cooling device 200 of the present embodiment, the insertion portion 6 is regulated in moving rotationally around the central axis L6, thus making it possible to prevent the change in the observation state due to the fact that an image acquired by the observation portion 3 is rotated. Further, the distal end portion 50 of the insertion portion 6 attached to the adaptor 50*a* is always arranged at the center of the sheath 137 via the insertion portion fixing bracket 202. Thereby, cooling air is not localized but allowed to flow uniformly around the distal end portion 50 of the insertion portion 6. Still further, since the insertion portion fixing bracket 202 is fitted to the outside of the adaptor 50*a* at the distal end portion 50 of the insertion portion 6, no special shape is needed for the adaptor 50*a* in itself. As a result, the present embodiment is applicable to various types of adaptors. In an adaptor-free endoscope, the insertion portion fixing bracket 202 may be directly fitted to the outside of the main body portion 5*a* of the distal end portion 5.

Thirteenth Embodiment

Next, an explanation will be made for a thirteenth embodiment*4) of the endoscope system of the present invention by referring to FIG. 38**. In the present embodiment, members common to those used in the previous embodiments will be given the same numerals or symbols, an explanation of which will be omitted.

Figure 38:
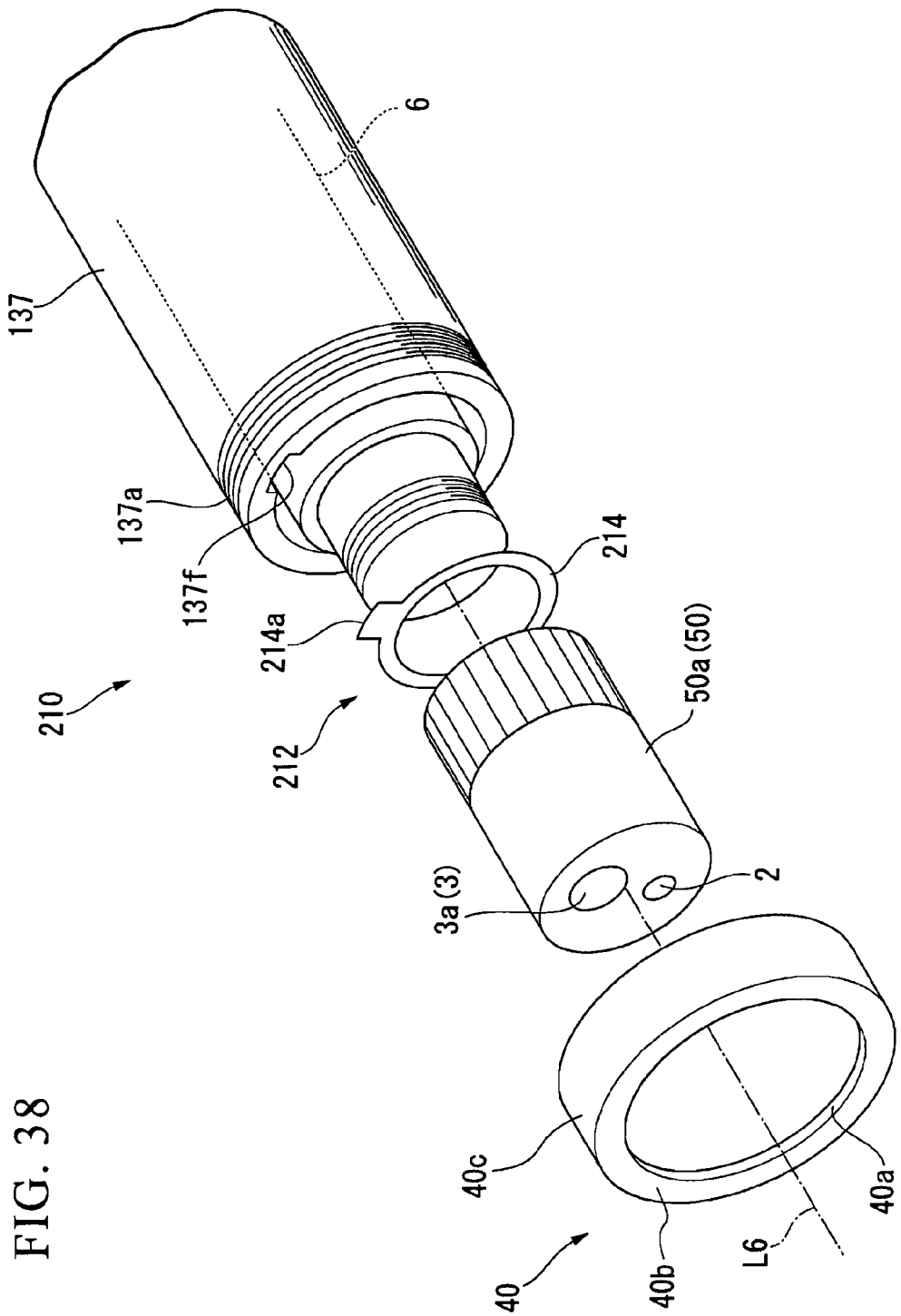
FIG. 38 is a view showing a thirteenth embodiment of the endoscope system of the present invention and an exploded perspective view of the distal end portion of the sheath constituting the endoscope cooling device included in the present embodiment.

As shown in FIG. 38, the endoscope cooling device 210 of the present embodiment is provided with an insertion portion fixing ring 212 attached at the distal end portion 50 of the insertion portion 6. The insertion portion fixing ring 212 is provided with a thin plate-shaped main body portion 214 and a tab 214*a* projecting from the main body portion 214. The insertion portion fixing ring 212 is made of a material such as metal, silicon, polyimide or Teflon. The inner diameter of the main body portion 214 is slightly larger than the outer diameter of the distal end of the insertion portion 6 free of the adaptor 50*a*, and the outer diameter of the main body portion 214 is approximately equal to the outer diameter of the insertion portion 6 and that of the adaptor 50*a*. When the distal end of the insertion portion 6 is inserted into the insertion portion fixing ring 212 and then the adaptor 50*a* is attached to the distal end of the insertion portion 6, the insertion portion fixing ring 212 is held between the distal end of the insertion portion 6 and the adaptor 50a and fixed by a frictional force. The insertion portion fixing ring 212 is fixed at the distal end portion 50 of the insertion portion 6 in the state where only the tab 214a is projected from the outer circumferential face of the insertion portion 6.

On the other hand, one groove 137f is formed on the inner circumferential face at the distal end of the sheath 137. The groove 137f is formed in the length direction of the sheath 137. The width of the groove 137f is slightly wider than that of the tab 214a. The tab 214a projecting from the distal end portion 50 of the insertion portion 6 is engaged with the groove 137f of the sheath 137. Therefore, the distal end portion 50 of the insertion portion 6 is able to move back and forth in the direction of the central axis L6 but regulated in moving rotationally around the central axis L6 through the sheath 137.

In addition, in order to fix the insertion portion fixing ring 212 more securely, a raised portion is installed at the insertion portion 6 and a recessed portion is installed inside the insertion portion fixing ring 212, so that the raised portion may be engaged with the recessed portion.

According to the endoscope cooling device 200 of the present embodiment, since the insertion portion 6 is regulated in moving rotationally around the central axis L6, it is possible to prevent the change in the observation state due to the fact that an image acquired by the observation portion 3 is rotated. Further, since the insertion portion fixing ring 212 is fixed so as to be held between the distal end of the insertion portion 6 and the adaptor 50a, no special shape is needed for the adaptor 50a itself. As a result, the present embodiment is applicable to various types of adaptors.

Incidentally, in the present embodiment, one tab 214a is installed at the insertion portion fixing ring 212. A any number of the tabs 214a may be installed. However, the number of grooves 137f must be changed according to the number of the tabs 214a.

Fourteenth Embodiment

Next, an explanation will be made for a fourteenth embodiment of the endoscope system of the present invention by referring to FIG. 39. In the present embodiment, members common to those used in the previous embodiments will be given the same numerals or symbols, an explanation of which will be omitted.

Figure 39:
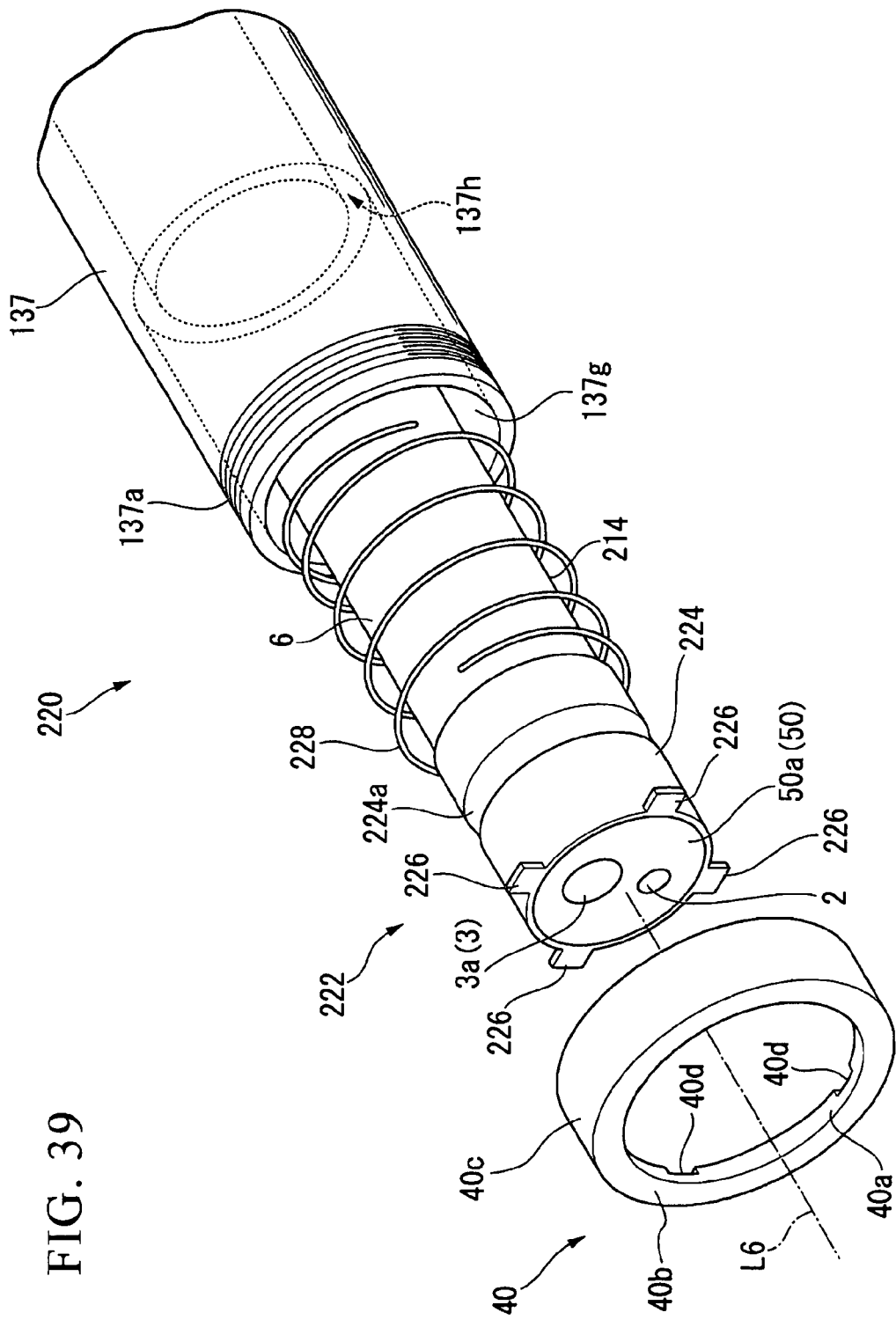
FIG. 39 is a view showing a fourteenth embodiment of the endoscope system of the present invention and an exploded perspective view of the distal end portion of the sheath constituting the endoscope cooling device included in the present embodiment.

As shown in FIG. 39, the endoscope cooling device 220 of the present embodiment is provided with a cylindrical insertion portion fixing bracket 222 fitted to the outside of the distal end portion 50 of the insertion portion 6. The insertion portion fixing bracket 222 is provided with a cylindrical main body portion 224 and four projections 226 installed on the main body portion 224. The insertion portion fixing bracket 222 is made of a material such as metal, silicon, polyimide or Teflon. A diameter-reduced portion 224a is formed at an intermediate portion in the length direction of the main body portion 224. The adaptor 50a is pressed into the main body portion 224 so as to expand the diameter of the diameter-reduced portion 224a, by which the insertion portion fixing bracket 222 is fitted to the outside of the distal end portion 50 of the insertion portion 6 and fixed duly by utilizing the elastic force of the diameter-reduced portion 224a. Four projections 226 are installed on the outer circumferential face at the distal end of the main body portion 224 so as to be spaced at equal intervals in the circumferential direction. Each of the projections 226 is formed in such a manner that a tongue-shaped piece projecting from the distal end of the main body portion 224 is folded outwardly.

On the other hand, a large diameter portion 137g larger in diameter than other portions is formed on the inner circumferential face at the distal end of the sheath 137. A coil spring 228 is installed at the distal end of the insertion portion 6. In the coil spring 228, one end thereof is in contact with the projections 226 of the insertion portion fixing bracket 222 from the back thereof and the other end is in contact with the back face 137h at the large diameter portion 137g of the sheath 137, and its own elastic force is used to urge the distal end portion 50 of the insertion portion 6 through the sheath 137. Recessed portions 40e engaged with the projections 226 of the insertion portion fixing bracket 222 are formed on the back face of the main body portion 20b of the cap 40 at equal intervals in the circumferential direction. When the cap 40 is attached at the distal end of the sheath 137, the main body portion 40b of the cap 40 is in contact all across the distal end face of the sheath 137. The insertion portion fixing bracket 222 is urged by the coil spring 228, by which the projections 226 of the insertion portion fixing bracket 222 are prevented from being detached from the recessed portion 40e of the cap 40. Cooling air flows between the insertion portion fixing bracket 222 and the sheath 137 and is discharged in front of the sheath 137 through the opening portion 40a of the cap 40.

According to the endoscope cooling device 220 of the present embodiment, the projections 226 of the insertion portion fixing bracket 222 are engaged with the recessed portions 40e of the cap 40, thereby regulating the insertion portion 6 in moving rotationally around the central axis L6, thus making it possible to prevent the change in the observation state due to the fact that an image acquired by the observation portion 3 is rotated. Further, since the insertion portion fixing bracket 222 is fitted to the outside of the adaptor 50a at the distal end portion 50 of the insertion portion 6, no special shape is needed for the adaptor 50a itself. As a result, the present embodiment is applicable to various types of adaptors. In an adaptor-free endoscope, the insertion portion fixing bracket 222 may be directly fitted to the outside of the main body portion 5a of the distal end portion 5.

Incidentally, in the present embodiment, four projections 226 are installed at the insertion portion fixing bracket 222. A number of the projections 226 may be installed in any number, however, it is necessary to change the number of the recessed portions 40e according to change in the number of the projections 226.

Fifteenth Embodiment

Next, an explanation will be made for a fifteenth embodiment of the endoscope system of the present invention by referring to FIG. 40 and FIG. 41. In the present embodiment, members common to those used in the previous embodiments will be given the same numerals or symbols, an explanation of which will be omitted.

Figure 40:
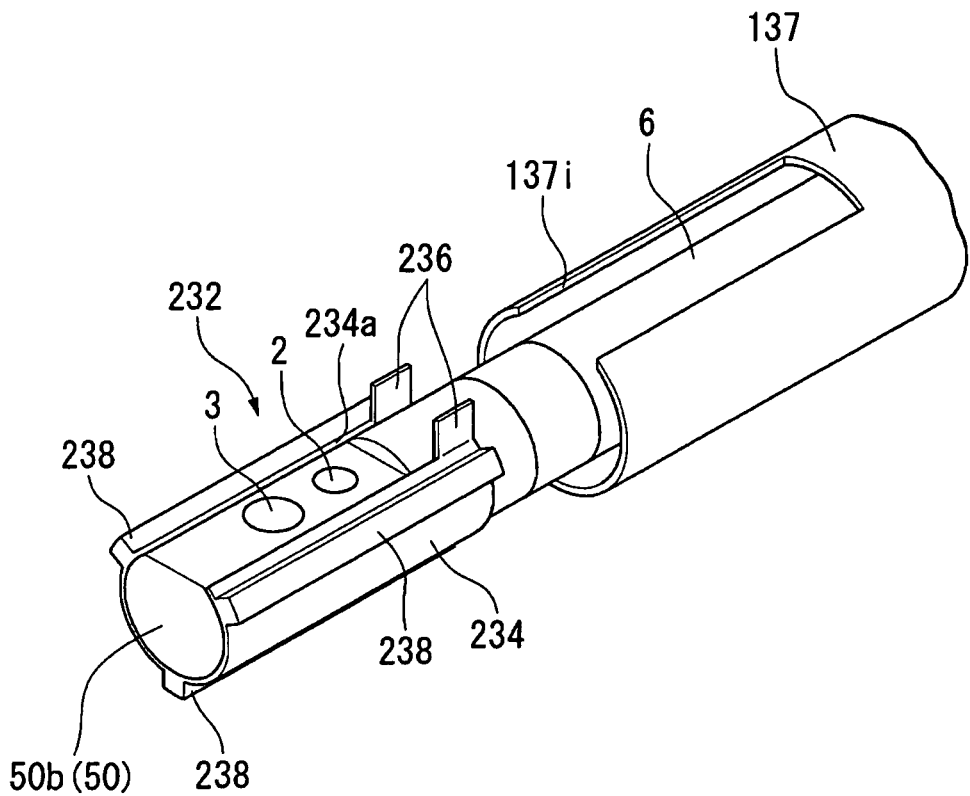
FIG. 40 is a view showing a fifteenth embodiment of the endoscope system of the present invention and an exploded perspective view of the distal end portion of the sheath constituting the endoscope cooling device included in the present embodiment.
Figure 41:
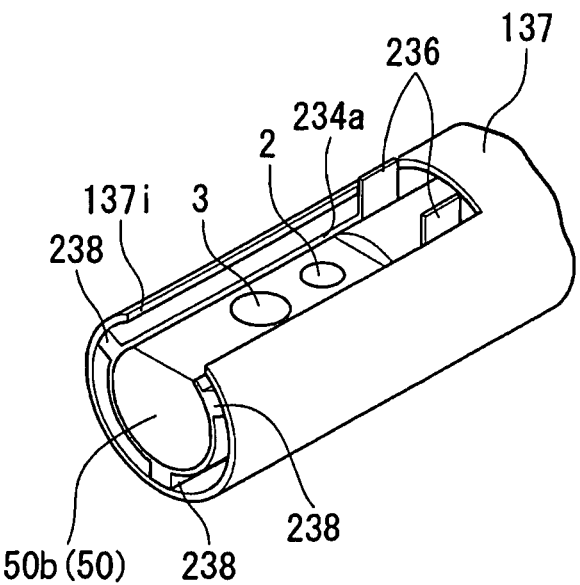
FIG. 41 is a perspective view of the distal end portion of the sheath of the endoscope cooling device included in the fifteenth embodiment.

As shown in FIG. 40 and FIG. 41, the endoscope used in the present embodiment is a so-called lateral vision-type endoscope 1A. The endoscope cooling device 230 of the present embodiment is provided with an insertion portion fixing bracket 232 fitted to the outside of the distal end portion 50 of the insertion portion 6. The insertion portion fixing bracket 232 is provided with a semi-cylindrical main body portion 234, the cross section of which is formed in a C-shape, two projections 236 installed at the main body portion 234 and three projecting streaks 238 also installed at the main body portion 234. The insertion portion fixing bracket 232 is made of a material such as metal, silicon, polyimide or Teflon. The inner diameter of the main body portion 234 is slightly smaller than the outer diameter of the lateral vision-type adaptor 50b. Further, a slit 234a is formed partially in the main body portion 234 in the length direction. The adaptor 50b attached at the distal end of the insertion portion 6 is pressed into the main body portion 234 so as to expose the observation portion 3 and the illuminating portion 2 via the slit 234a, by which the insertion portion fixing bracket 232 is fitted to the outside of the distal end portion 50 of the insertion portion 6. The two projections 236 are formed on the outer circumferential face at the back end of the main body portion 234 in such a manner so as to face to each other across the slit 234a. The three projecting streaks 238 are installed on the outer circumferential face of the main body portion 234 so as to be spaced at equal intervals in the circumferential direction. Each of the projecting streaks 238 is formed from the front end to the back end of the main body portion 234 in the longitudinal direction of the main body portion 234.

On the other hand, a notch portion 137i is formed in the distal end of the sheath 137 in the length direction. When the insertion portion fixing bracket 232 is inserted into the sheath 137, two projections 236 are fitted into the notch portion 133 and are also respectively in contact with both edges of the notch portion 137i. The observation portion 3 and the illuminating portion 2 of the endoscope 1A can be viewed laterally via the notch portion 137i of the insertion portion fixing bracket 232. In addition, no cap 40 is attached at the distal end of the sheath 137 in the present embodiment. Therefore, no male thread portion 137a is installed on the sheath 137.

The top faces of the three projecting streaks 238 are in contact with the inner circumferential faces at the distal end of the sheath 137. Therefore, two projections 236 of the insertion portion fixing bracket 232 are guided into the notch portion 137i of the sheath 137, by which the insertion portion 6 is able to move back and forth in the direction of the central axis L6 and regulated in moving rotationally around the central axis L6. Cooling air flows between the insertion portion fixing bracket 232 and the sheath 137 and is discharged in front of the sheath 137 from the distal end of the sheath 137.

According to the endoscope cooling device 230 of the present embodiment, since the insertion portion 6 is regulated in moving rotationally around the central axis L6, it is possible to prevent the change in the observation state due to the fact that an image acquired by the observation portion 3 via the window portion 43 is rotated. Further, the projections 236 are guided into the notch portions 137i, by which the insertion portion 6 is able to move back and forth in the direction of the central axis L6. Therefore, when the insertion portion 6 is inserted into a curved test substance, the insertion portion 6 is allowed to move back and forth through the sheath 137 in the direction of the central axis L6, thus making it possible to eliminate a difference in the peripheral length between the insertion portion 6 and the sheath 137 positioned at the outer circumference.

Since the distal ends of three projecting streaks 238 are respectively in contact with the inner circumferential face of the sheath 137, the distal end portion 50 of the insertion portion 6 is arranged at the center of the sheath 137. Thereby, cooling air is not localized but flowing uniformly around the distal end portion 50 of the insertion portion 6. Further, since the insertion portion fixing bracket 232 is fitted to the outside of the adaptor 50b at the distal end portion 50 of the insertion portion 6, no special shape is needed for the adaptor 50b itself. As a result, the present embodiment is applicable to various types of adaptors. In an adaptor-free endoscope, the insertion portion fixing bracket 232 may be directly fitted to the outside of the distal end of the insertion portion 6.

Incidentally, in the present embodiment, three projecting streaks 238 are installed at the insertion portion fixing bracket 232. However, any number of the projecting streaks 238 may be installed in any number.

Sixteenth Embodiment

Next, an explanation will be made for a sixteenth embodiment of the endoscope system of the present invention by referring to FIG. 42 and FIG. 43. In the present embodiment, members common to those used in the previous embodiments will be given the same numerals or symbols, an explanation of which will be omitted.

Figure 42:
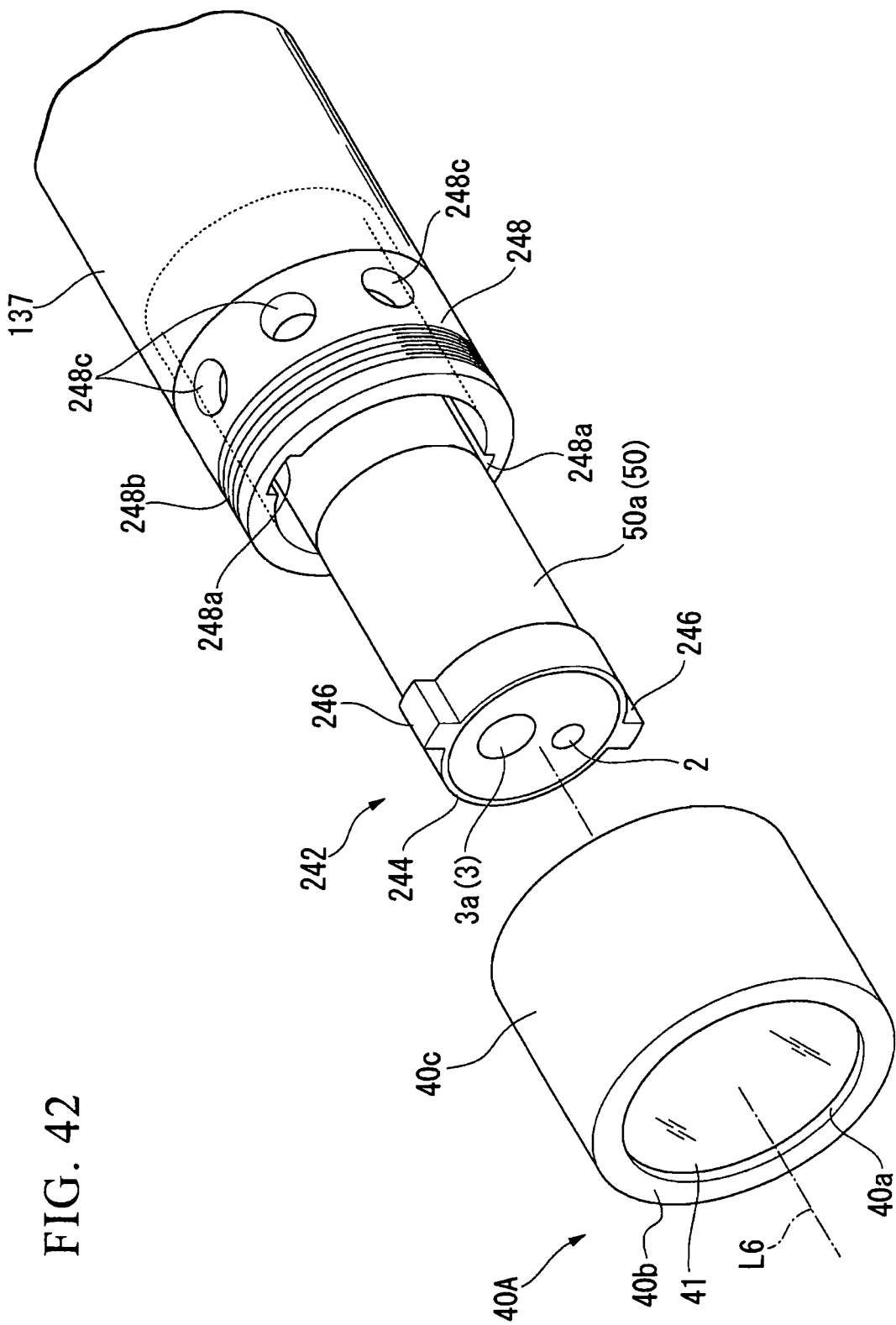
FIG. 42 is a view showing a sixteenth embodiment of the endoscope system of the present invention and an exploded perspective view of the distal end portion of the sheath constituting the endoscope cooling device included in the present embodiment.
Figure 43:
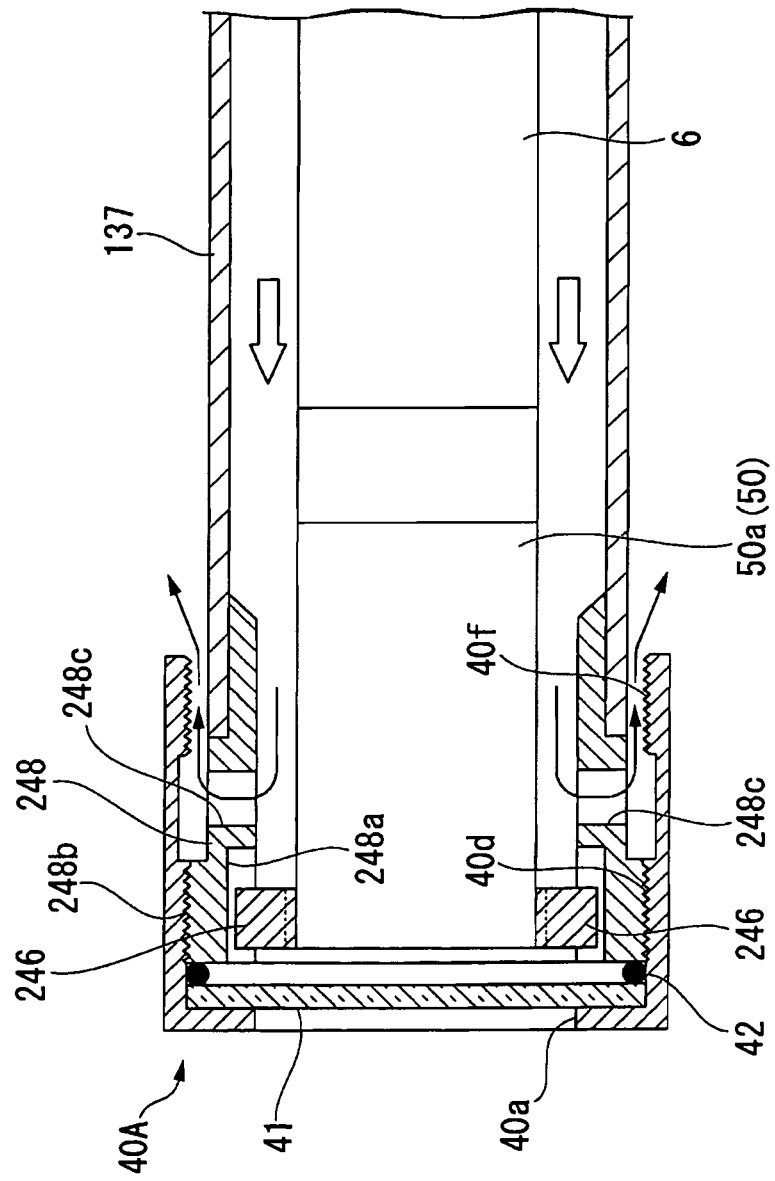
FIG. 43 is a sectional side view of the sheath of the endoscope cooling device included in the sixteenth embodiment.

As shown in FIG. 42 and FIG. 43, the endoscope cooling device 240 of the present embodiment is provided with an insertion portion fixing ring 242 fitted to the outside of the distal end portion 50 of the insertion portion 6. The insertion portion fixing ring 242 is provided with an annular main body portion 244 and two projecting streaks 246 installed at the main body portion 244. The insertion portion fixing ring 242 is made of a material such as metal, silicon, polyimide or Teflon. The adaptor 50a is pressed into the main body portion 244, by which the insertion portion fixing ring 242 is fitted to the outside of the distal end portion 50 of the insertion portion 6. These two projecting streaks 246 are installed on the outer circumferential face at the distal end of the main body portion 244 so as to be spaced at equal intervals in the circumferential direction and extended in the width direction of the main body portion 244.

On the other hand, a distal end outer base 248 is attached at the distal end of the sheath 137. Two grooves 248a are formed in the inner circumferential face of the distal end outer base 248 so as to be spaced at equal intervals in the circumferential direction. Each of the grooves 248a is formed to be longer than the projecting streaks 246 in the length direction of the distal end outer base 248. Two projecting streaks 246 of the insertion portion fixing ring 242 are respectively engaged with the two grooves 248a of the distal end outer base 248, and the top faces of the projecting streaks 246 are also respectively in contact with the bottom faces of the grooves 248a. In addition, a plurality of through holes 248c communicatively connected from the inside to the outside is provided at the distal end outer base 248, which is further at the back end from the male thread portion 248b, so as to be spaced at equal intervals in the circumferential direction.

A cap 40A is attached at the distal end of the distal end outer base 248. The cap 40A is provided with a main body portion 40b having an opening portion 40a and an outward fitting portion 40c. The outward fitting portion 40c of the cap 40 is expanded in width, and two female thread portions 40d, 40f are formed on the inner circumferential face. The male thread portion 248b of the distal end outer base 248 can be screwed in both of the female thread portion 40d and 40f but finally screwed in the female thread portion 40d located behind the cap 40A. In other words, the female thread portion 40f is installed for preventing the cap 40A from falling off. Further, a cover glass 41 and an O-ring 42 are interposed between the main body portion 40b of the cap 40A and the end face at the distal end of the distal end outer base 248. The observation portion 3 and the illuminating portion 2 of the endoscope 1 can be viewed forward via the cover glass 41. Cooling air flows between the insertion portion 6 and the sheath 137 and is discharged outside the sheath 137 through the through hole 248c of the distal end outer base 248. Further, the cooling air collides against the inner circumferential face of the outward fitting portion 40c of the face cap 40A to change its direction and is discharged behind the sheath 137.

Two projecting streaks 246 of the insertion portion fixing ring 242 are respectively engaged with two grooves 248a of the distal end outer base 248. Therefore, the projecting streaks 246 are guided by the grooves 248a, by which the insertion portion 6 is able to move back and forth in the direction of the central axis L6 but regulated in moving rotationally around the central axis L6 because of the projecting streak 166 engaged with the groove 137b.

According to the endoscope cooling device 240 of the present embodiment, since the insertion portion 6 is regulated in moving rotationally around the central axis L6, it is possible to prevent the change in the observation state due to the fact that an image acquired by the observation portion 3 is rotated. Further, the projecting streaks 246 are guided by the grooves 248a. As a result, when the insertion portion 6 is inserted into a curved test substance, the insertion portion 6 is allowed to move back and forth through the outer sheath 137 in the direction of the central axis L6, thus making it possible to eliminate a difference in the peripheral length between the insertion portion 6 and the sheath 137 positioned at the outer circumference.

Since the top faces of the three projecting streaks 246 are respectively in contact with the bottom faces of the three grooves 248a, the distal end portion 50 of the insertion portion 6 attached to the adaptor 50a is always arranged at the center of the sheath 137. Thereby, cooling air is not localized but flowing uniformly around the distal end portion 50 of the insertion portion 6. Further, since the insertion portion fixing ring 242 is fitted to the outside of the adaptor 50a at the distal end portion 50 of the insertion portion 6, no special shape is needed for the adaptor 50a itself. As a result, the present embodiment is applicable to various types of adaptors. In an adaptor-free endoscope, the insertion portion fixing bracket 162 may be directly fitted to the outside of the main body portion 5a at the distal end portion 5.

Incidentally, in the present embodiment, two projecting streaks 246 are installed at the insertion portion fixing ring 242. Any number of the projecting streaks 246 may be installed, however, it is necessary to change the number of the grooves 248a according to the change in the number of the projecting streaks 246.

Seventeenth Embodiment

Figure 44:
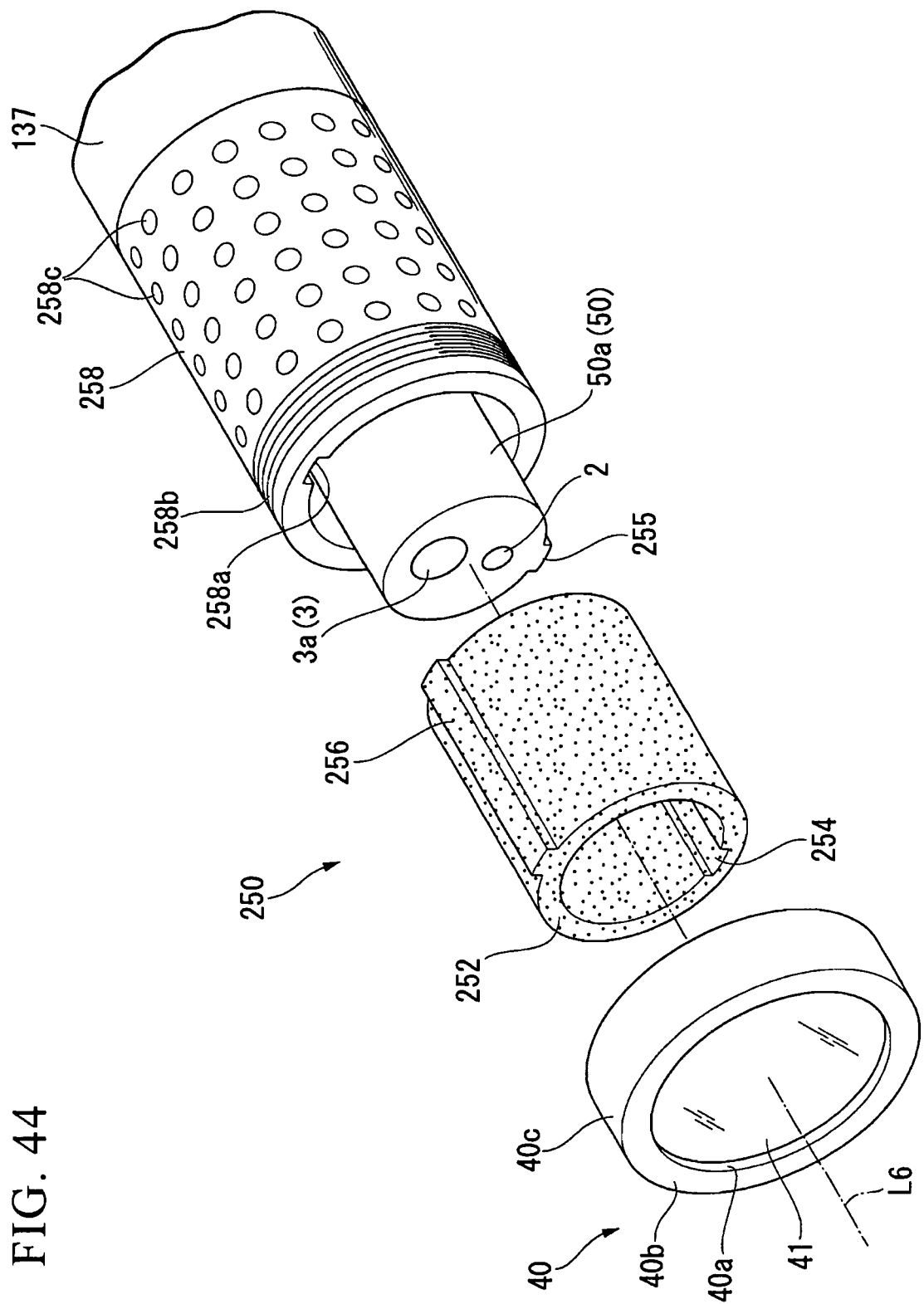
FIG. 44 is a view showing a seventeenth embodiment of the endoscope system of the present invention and an exploded perspective view of the distal end portion of the sheath constituting the endoscope cooling device included in the present embodiment.
Figure 45:
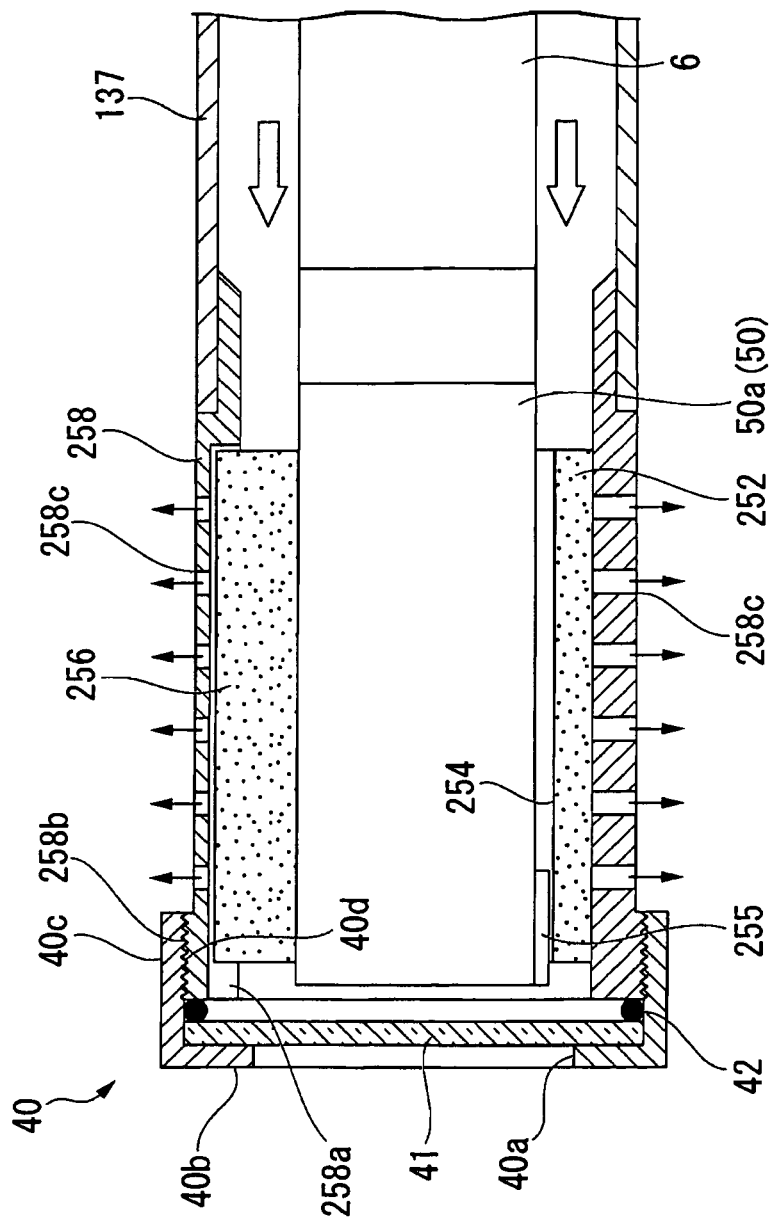
FIG. 45 is a sectional side view of the sheath of the endoscope cooling device included in the seventeenth embodiment.

Next, an explanation will be made for a seventeenth embodiment of the endoscope system of the present invention by referring to FIG. 44 and FIG. 45. In the present embodiment, members common to those used in the previous embodiments will be given the same numerals or symbols, an explanation of which will be omitted.

In the endoscope cooling device 250 of the present embodiment, water is used as a cooling fluid. As shown in FIG. 44 and FIG. 45, the endoscope cooling device 250 is provided with a cylindrical porous member 252 fitted to the outside of the distal end portion 50 of the insertion portion 6. The porous member 252 is made of a material such as porous ceramic, porous silicon or ceramic fiber. The inner diameter of the porous member 252 is approximately equal to the outer diameter of the distal end portion 50 of the insertion portion 6, while the outer diameter of the porous member 252 is approximately equal to the inner diameter of the distal end outer base 258, which will be described later. One groove 254 is formed on the inner circumferential face of the porous member 252 along the length direction, and one projecting streak 256 is formed on the outer circumferential face of the porous member 252 along the length direction. The porous member 252 is fitted to the outside of the distal end portion 50 of the insertion portion 6. A projection 255 is formed on the outer circumferential face of the adaptor 50a attached at the distal end of the insertion portion 6 along the length direction.

A distal end outer base 258 is attached at the distal end of the sheath 137. One groove 258a is formed on the inner circumferential face of the distal end outer base 258 along the length direction. A plurality of through-holes 258c communicatively connected from the inside to the outside are provided on the distal end outer base 258, which is further at the back end from the male thread portion 258b, so as to be spaced at equal intervals both in the circumferential direction and in the length direction. When the insertion portion 6 fitted to the outside of the porous member 252 is inserted into the distal end outer base 258, the groove 254 inside the porous member 252 is engaged with the projection 255 of the adaptor 50a, while the projecting streak 256 outside the porous member 252 is engaged with the groove 258a of the distal end outer base 258.

A cap 40 is attached at the distal end of the distal end outer base 258. A cover glass 41 and an O-ring 42 are interposed between the main body portion 40b of the cap 40 and the end face at the distal end of the distal end outer base 258. The observation portion 3 and the illuminating portion 2 of the endoscope 1 can be viewed forward via the cover glass 41. Cooling water flows between the insertion portion 6 and the sheath 137 and permeates into the porous member 252 arranged inside the distal end outer base 258. Water permeated into the porous member 252 is warmed by heat therearound, evaporated and discharged outside the through-holes 258c. In this instance, the distal end portion 50 of the insertion portion 6 is cooled by latent heat of evaporation resulting from the water.

The projection 255 of the adaptor 50a is engaged with the groove 254 inside the porous member 252, while the groove 258a of the distal end outer base 258 is engaged with the projecting streak 256 outside the porous member 252. Therefore, the projection 255 is guided into the groove 254, by which the insertion portion 6 is able to move back and forth in the direction of the central axis L6 but regulated in moving rotationally around the central axis L6 because of the projecting streak 256 engaged with the groove 258a.

According to the endoscope cooling device 250 of the present embodiment, since the insertion portion 6 is regulated in moving rotationally around the central axis L6, it is possible to prevent the change in the observation state due to the fact that an image acquired by the observation portion 3 is rotated. Further, the projections 255 are guided by the grooves 254. As a result, when the insertion portion 6 is inserted into a curved test substance, the insertion portion 6 is allowed to move back and forth through the sheath 137 in the direction of the central axis L6, thus making it possible to eliminate a difference in the peripheral length between the insertion portion 6 and the sheath 137 positioned at the outer circumference.

The porous member 252 is arranged between the distal end portion 50 of the insertion portion 6 and the distal end outer base 258 without any clearance, by which the distal end portion 50 of the insertion portion 6 attached to the adaptor 50a is always arranged at the center of the sheath 137. Thereby, cooling water is not localized but flowing uniformly around the distal end portion 50 of the insertion portion 6.

Eighteenth Embodiment

Figure 46:
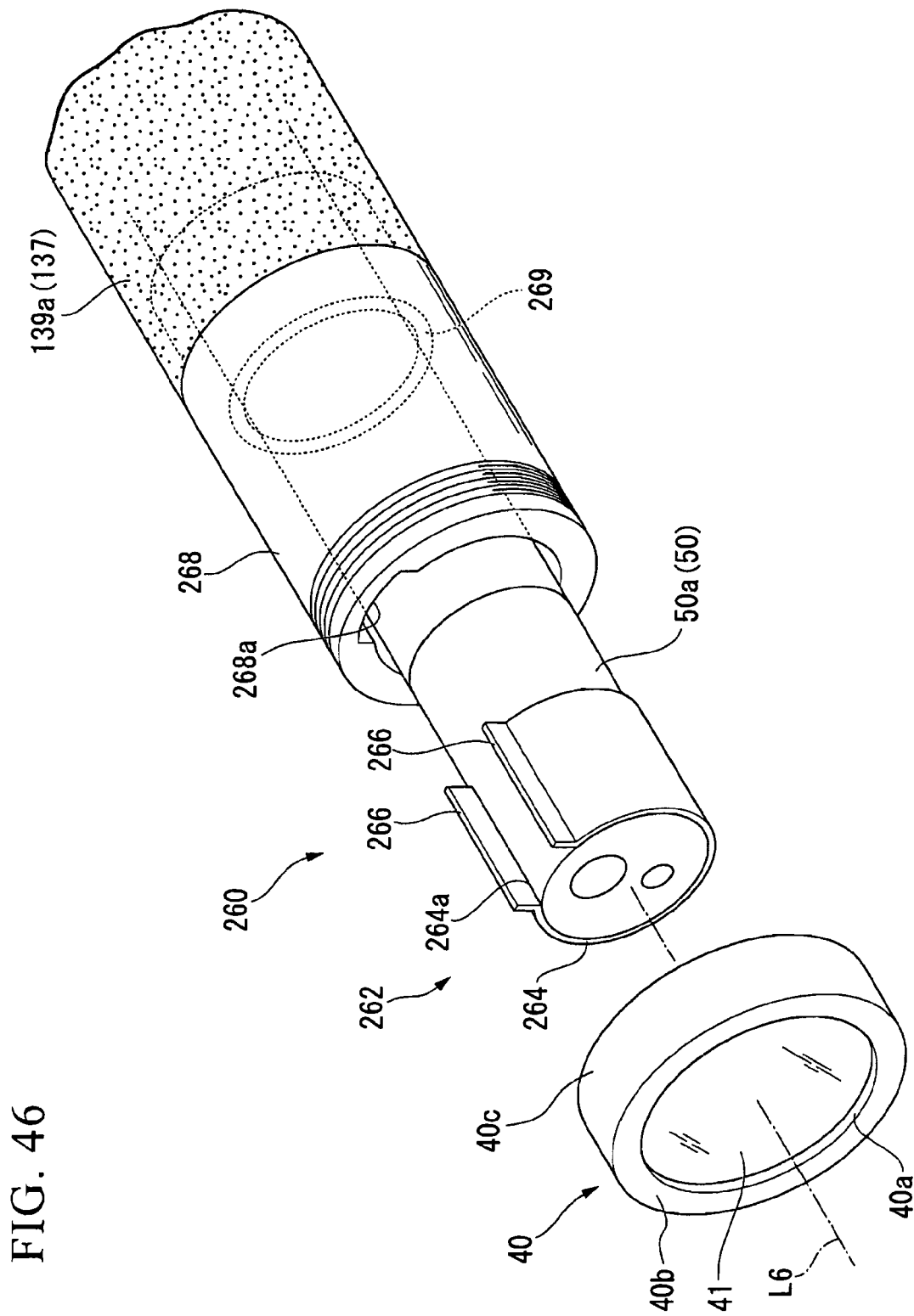
FIG. 46 is a view showing an eighteenth embodiment of the endoscope system of the present invention and an exploded perspective view of the distal end portion of the sheath constituting the endoscope cooling device included in the present embodiment.
Figure 47:
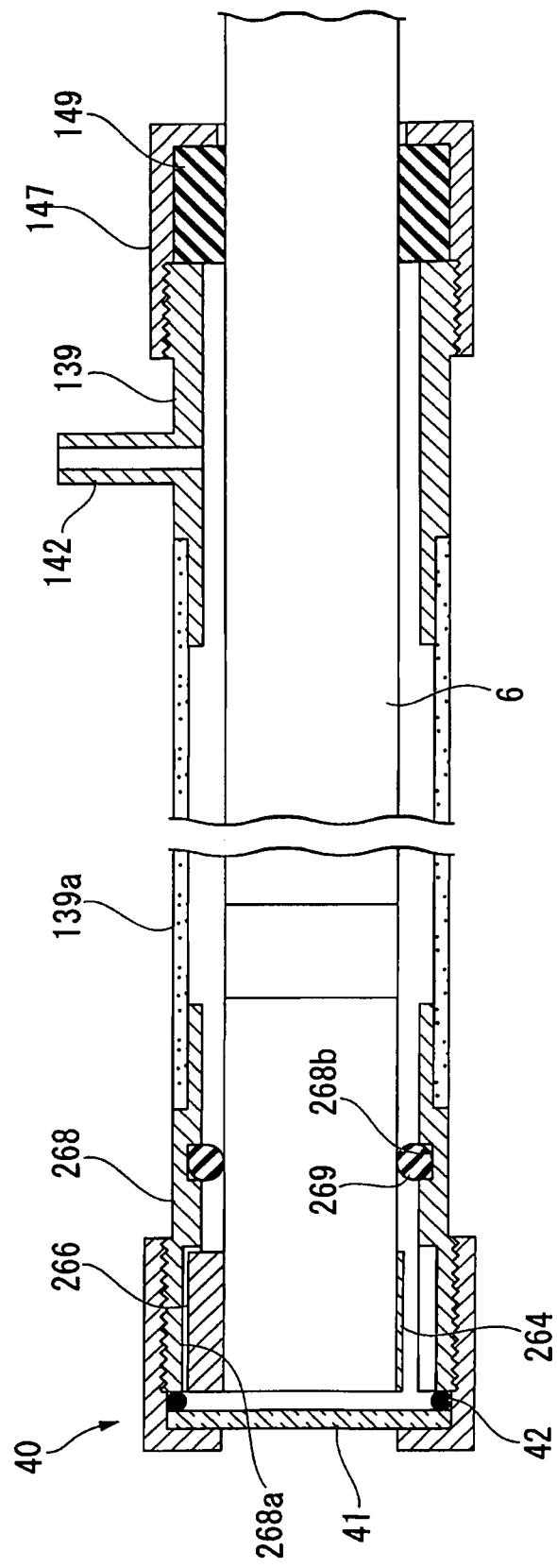
FIG. 47 is a sectional side view of the sheath of the endoscope cooling device included in the eighteenth embodiment.

Next, an explanation will be made for an eighteenth embodiment of the endoscope system of the present invention by referring to FIG. 46 and FIG. 47. In the present embodiment, members common to those used in the previous embodiments will be given the same numerals or symbols, an explanation of which will be omitted.

In the endoscope cooling device 260 of the present embodiment, water is used as a cooling fluid. As shown in FIG. 46 and FIG. 47, the endoscope cooling device 260 is provided with a cylindrical insertion portion fixing bracket 262 fitted to the outside of the distal end portion 50 of the insertion portion 6. The insertion portion fixing bracket 262 is provided with a cylindrical main body portion 264 and two projecting streaks 266 installed at the main body portion 264. The insertion portion fixing bracket 262 is made of a material such as metal, silicon, polyimide or Teflon. The inner diameter of the main body portion 264 is slightly smaller than the outer diameter of the adaptor 50a. Further, a slit 264a having a constant width is formed in the main body portion 264 in the length direction. The adaptor 50a is pressed inside the main body portion 264 so as to expand the diameter of the main body portion 264, by which the insertion portion fixing bracket 262 is fitted to the outside of the distal end portion 50 of the insertion portion 6 and fixed thereto by utilizing the elastic force of the main body portion 264. The two projecting streaks 266 are formed in such a manner that the side edge of the main body portion 264 forming the slit 264a is folded outwardly.

On the other hand, the sheath main body 139a of the sheath 137 is made of a porous material such as porous silicon. Further, the distal end outer base 268 is attached at the distal end of the sheath 137. One groove 268a is formed in the inner circumferential face of the distal end outer base 268 along the length direction. The distance between the side faces of the groove 268a facing each other in the circumferential direction is approximately equal to the distance between the two projecting streaks 266. Still further, a groove 268b is formed in the inner circumferential face of the distal end outer base 268 along the circumferential direction, and an O-ring 269 is fitted into the groove 268b. The inner diameter of the O-ring 269 is smaller than the outer diameter of the insertion portion 6. When the insertion portion 6 fitted to the outside of the insertion portion fixing bracket 262 is inserted into the distal end outer base 268, the two projecting streaks 266 are engaged with the groove 268a so as to be respectively in contact with both sides of the groove 268a. Further, since the inner diameter of the O-ring 269 is smaller than the outer diameter of the insertion portion 6, the O-ring 269 seals the space between the insertion portion 6 and the distal end outer base 268 in a liquid-tight manner.

The cap 40 is attached at the distal end of the distal end outer base 268. The cover glass 41 and the O-ring 42 are interposed between the main body portion 40b of the cap 40 and the end face at the distal end of the distal end outer base 268. The observation portion 3 and the illuminating portion 2 of the endoscope 1 can be viewed forward via the cover glass 41. Since the O-ring 269 intervenes between the distal end outer base 268 and the distal end portion 50 of the insertion portion 6 to seal them in a liquid-tight manner, cooling water permeates into the sheath main body 139a made of a porous material in the process of flowing between the insertion portion 6 and the sheath 137. Water permeated into the sheath main body 139a is warmed by the heat therearound and evaporated. In this instance, the insertion portion 6 is cooled by latent heat of evaporation resulting from the water.

According to the endoscope cooling device 250 of the present embodiment, the projecting streaks 266 of the insertion portion fixing bracket 262 are engaged with the grooves 268a of the distal end outer base 268, by which the insertion portion 6 is regulated in moving rotationally around the central axis L6. Therefore, it is possible to prevent the change in the observation state due to the fact that an image acquired by the observation portion 3 is rotated.

Since the insertion portion fixing bracket 262 is fitted to the outside of the adaptor 50a at the distal end portion 50 of the insertion portion 6, no special shape is needed for the adaptor 50a itself. As a result, the present embodiment is applicable to various types of adaptors. In an adaptor-free endoscope, the insertion portion fixing bracket 262 may be directly fitted to the outside of the main body portion 5a of the distal end portion 5.

Figure 48:
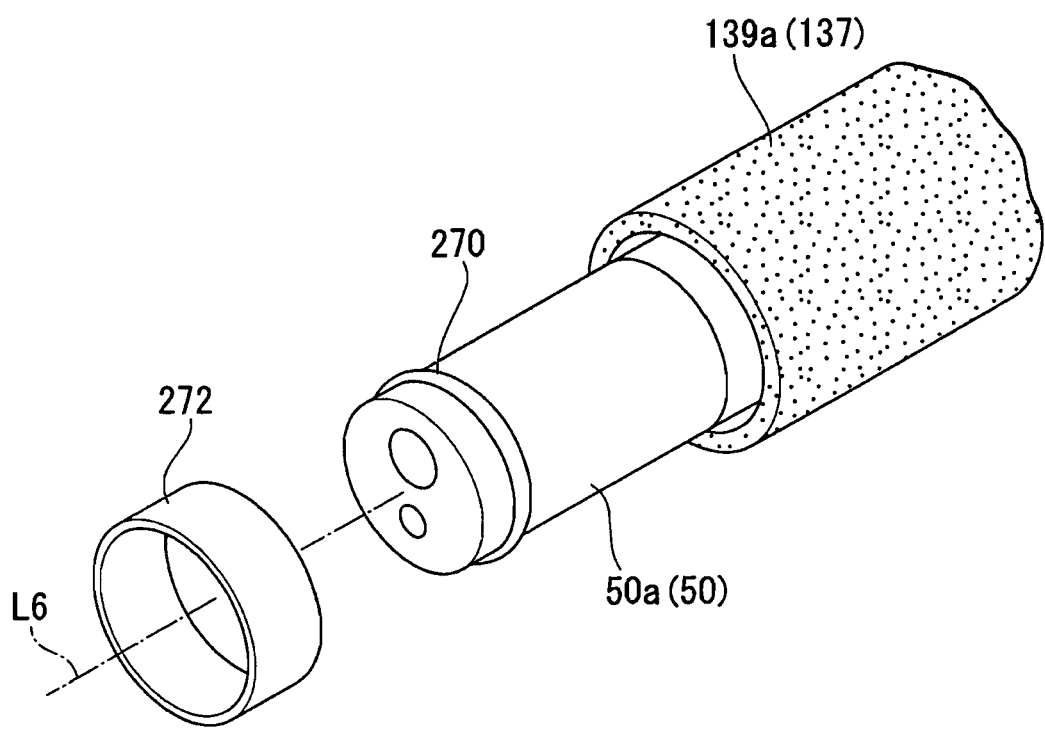
FIG. 48 is a view showing an exemplified variation of the eighteenth embodiment and an exploded perspective view of the distal end portion of the sheath included in the exemplified variation.
Figure 49:
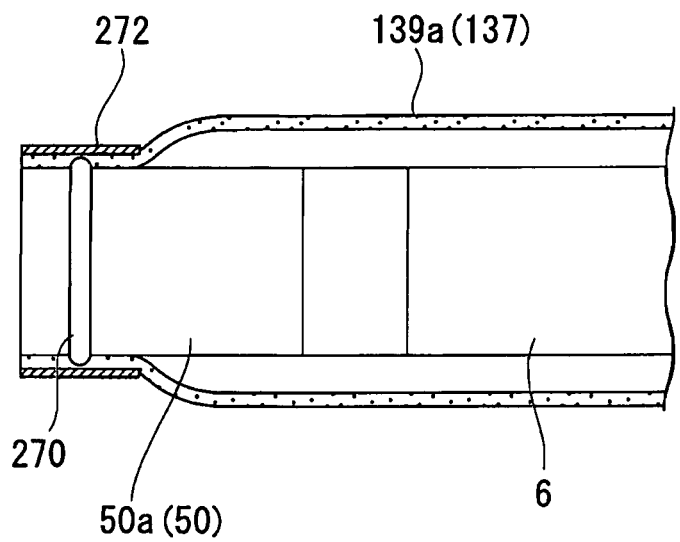
FIG. 49 is a sectional view of the sheath included in the exemplified variation of the eighteenth embodiment.

FIG. 48 and FIG. 49 show an exemplified variation of the present embodiment. The endoscope cooling device 250A of the present exemplified variation is not provided with the distal end outer base 268 at the distal end of the sheath 137, but the distal end of the sheath main body 139a made of a porous material is directly fixed at the distal end portion 50 of the insertion portion 6. A projecting streak 270 is formed along the circumferential direction on the outer circumferential face at the distal end of the adaptor 50a attached at the distal end of the insertion portion 6. The insertion portion 6 is inserted into the sheath main body 139a so as to align the distal end. Thereafter, the insertion portion fixing ring 272 is fitted to the outside of the outer circumferential face at the distal end of the sheath main body 139a. The insertion portion fixing ring 272 is fitted to the outside thereof, by which the distal end of the sheath main body 139a is held between the insertion portion 6 and the insertion portion fixing ring 272. The sheath main body 139a at a part having the projecting streak 270 formed thereon is pressed on the inner circumferential face of the insertion portion fixing ring 272 more strongly than other parts, thereby the sheath main body 139a is firmly fixed to the distal end portion 50 of the insertion portion 6.

Nineteenth Embodiment

Figure 50:
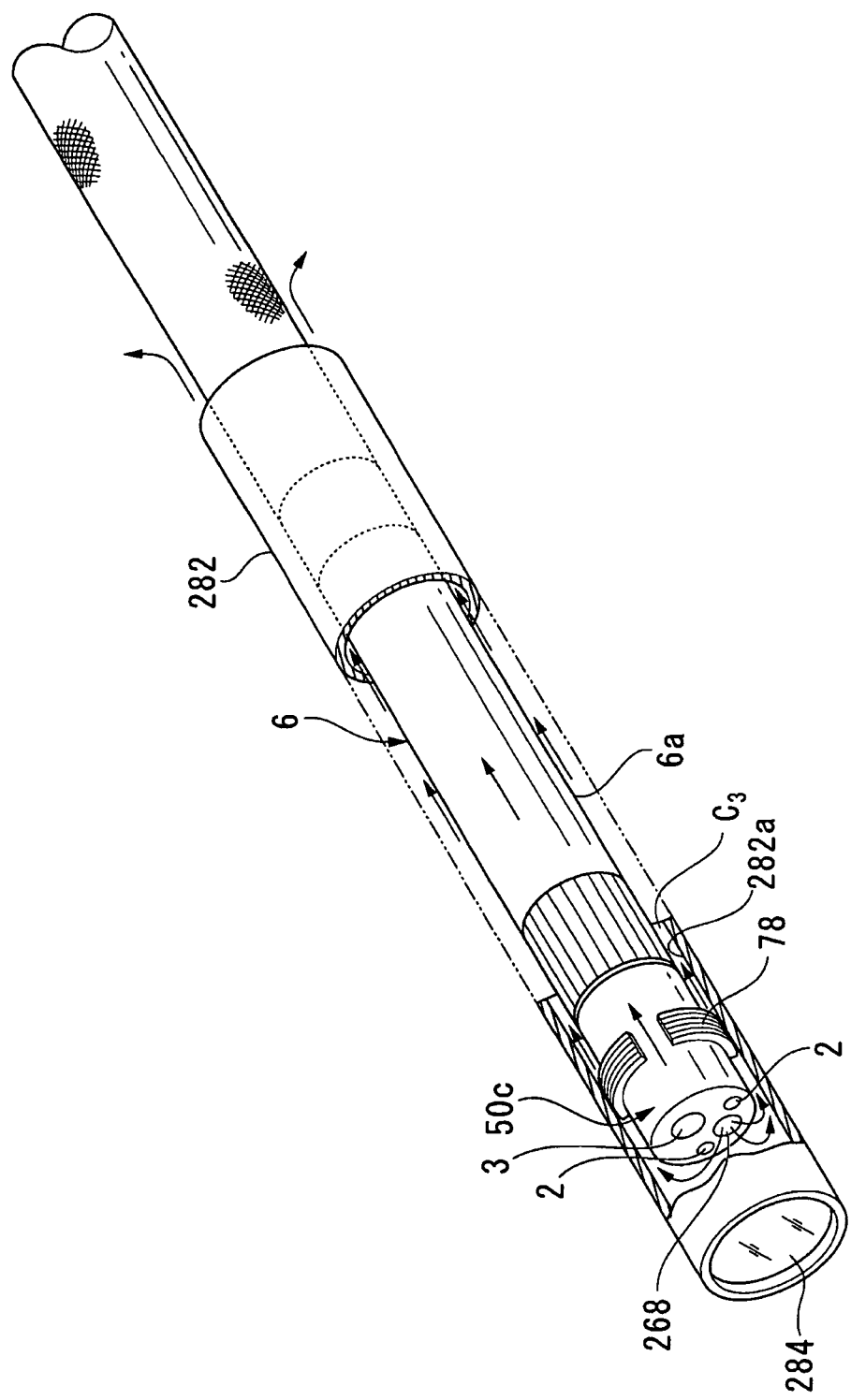
FIG. 50 is a view showing a nineteenth embodiment of the endoscope system of the present invention and a perspective view of the sheath constituting the endoscope cooling device included in the present embodiment.

Next, an explanation will be made for a nineteenth embodiment of the endoscope system of the present invention by referring to FIG. 50 and FIG. 51. In the present embodiment, members common to those used in the previous embodiments will be given the same numerals or symbols, an explanation of which will be omitted.

The endoscope cooling device 280 of the present embodiment supplies a cooling fluid to the distal end of the insertion portion 6 through a working channel of the endoscope 1. As shown in FIG. 50, the endoscope cooling device 280 is provided with a bottomed cylindrical guide tube 282 made of an elastic member. A transparent cover 284 for sealing the distal end of the guide tube 282 in an air-tight manner is installed at the distal end of the guide tube 282. The insertion portion 6 is inserted inside from the proximal end of the guide tube 282.

A male thread portion 78 is installed on the outer circumferential face of the adaptor 50c attached at the distal end of the insertion portion 6. The male thread portion 78 is divided into a plurality of parts. On the other hand, a female thread portion 79 is installed on the inner circumferential face at the distal end of the guide tube 282. The female thread portion 79 is screwed with the male thread portion 78, by which the guide tube 282 is attached at the insertion portion 6 so as to cover an outlet of the working channel 286 opened at the distal end of the adaptor 50c. The observation portion 3 and the illuminating portion 2 of the endoscope 1 can be viewed forward via the cover glass 284. When the guide tube 282 is attached at the distal end of the insertion portion 6, a clearance C3 is formed between the outer circumferential face 6a of the insertion portion 6 and the inner circumferential face 282a of the guide tube 282.

Cooling air supplied to the working channel 286 of the endoscope 1 is ejected in front of the insertion portion 6 from an outlet of the working channel 286. Since the distal end of the guide tube 282 is sealed by the transparent cover 284, cooling air is reversed, passing through a clearance between the thus divided male thread portions 78, flowing through the clearance C3 toward the proximal end of the guide tube 282. Then, it is discharged from the back end of the guide tube 282.

As described so far, according to the endoscope 1 of the present embodiment, it is possible to turn back cooling air toward the proximal end of the guide tube 282 without providing a member for sealing the guide tube 282. Therefore, the guide tube 282 can be made smaller in diameter than a conventional guide tube. As a result, any other parts, which are inserted into a test substance, can also be made smaller in diameter. Further, since the outlet of the working channel 286 is installed at the adaptor 50c, a cooling fluid is allowed to flow into the distal end of the insertion portion 6, thus making it possible to easily cool the observation portion 3 and the illuminating portion 2.

Figure 51:
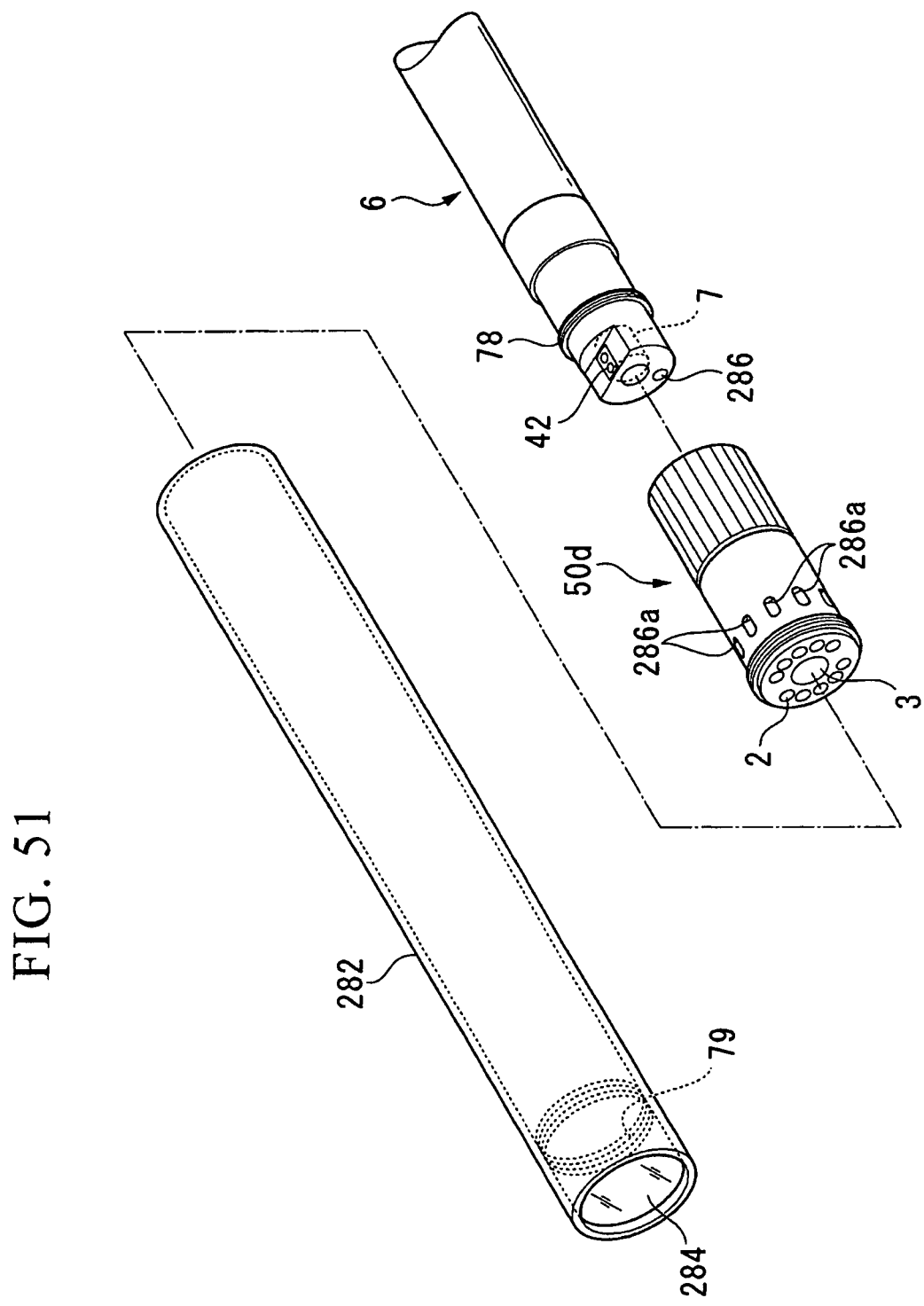
FIG. 51 is a view showing an exemplified variation of the nineteenth embodiment and an exploded perspective view of the sheath included in the exemplified variation.

FIG. 51 shows an exemplified variation of the endoscope cooling device 280 of the present embodiment. A plurality of outlets 286a of the working channel 286 are installed on the outer circumferential face of the adaptor 50d attached at the distal end of the insertion portion 6 so as to be spaced at equal intervals in the circumferential direction. In the present exemplified variation, cooling air supplied to the working channel 286 of the endoscope 1 is ejected in a radial manner from the outlet 286a to the periphery of the insertion portion 6. Since the distal end of the guide tube 282 is sealed by the transparent cover 284, cooling air flows through the clearance C3 toward the proximal end of the guide tube 282 and is discharged from the back end of the guide tube 282.

In addition, each of the above-described embodiments adopts a system in which the distal end portion of a sheath is covered with the sheath to circulate a fluid inside the sheath. However, the present invention is not be limited thereto and, for example, such a system that the distal end portion of the sheath is opened and cooled by releasing a fluid flowing inside the sheath may be used.

An explanation has been so far made for preferred embodiments of the present invention, to which the present invention is not limited. The present invention may be subjected to addition of the constitution, omission, replacement, combination and other modifications within the scope not departing from the gist of the present invention. The present invention shall not be limited to the above description but shall be limited only by the gist of the attached claims.

What is claimed is:

1. An endoscope cooling device configured for cooling a flexible insertion portion of an endoscope, the flexible insertion portion having an observation portion at a distal end thereof, and the endoscope further comprising a display portion which is configured to visually display a test substance picked up by the observation portion, the endoscope cooling device comprising:
   an inner sheath into which a distal end portion of the insertion portion including the observation portion is inserted to form a first flow path of a cooling fluid between an outer circumferential face of the insertion portion and an inner circumferential face of the inner sheath, the inner sheath which is an elastic sheath;
   an outer sheath into which the inner sheath is inserted to form a second flow path of the cooling fluid between an outer circumferential face of the inner sheath and an inner circumferential face of the outer sheath, the outer sheath which is an elastic sheath; wherein a cap is attached to a distal end of the outer sheath to fluidly seal the distal end of the outer sheath
   a regulating device configured to prevent the distal end portion from rotationally moving around a central axis of the distal end portion at least within one of the inner sheath and the outer sheath, the regulating device being disposed at the distal end of the insertion portion and comprising a raised portion extending radially outward from the outer circumferential face of the distal end portion of the insertion portion and a slot formed within a distal end portion of the inner sheath, wherein mating between the raised portion and the slot enables the distal end portion of the insertion portion to be axially translated within the inner sheath while preventing the distal end portion of the insertion portion from rotationally moving around a central axis of the insertion portion relative to the inner sheath; and
   a fluid supply device configured to supply the cooling fluid to the first flow path and the second flow path.

2. The endoscope cooling device according to claim 1, wherein the regulating device regulates the distal end portion in moving back and forth in a central axis direction at least either through the inner sheath or the outer sheath.

3. The endoscope cooling device according to claim 1, wherein the raised portion is installed at either one of the inner sheath and the outer sheath of the distal end portion; and a recessed portion installed at one of the other of the inner sheath and the outer sheath or the distal end portion and engaged with the raised portion.

4. The endoscope cooling device according to claim 1, wherein the regulating device is provided with a fixing member fitted to an outside of the distal end portion, and the raised portion or the recessed portion is formed on the fixing member.

5. The endoscope cooling device according to claim 1, further comprising: a first sealing member configured to seal a proximal end of the first flow path; and a second sealing member configured to seal a proximal end of the second flow path.

* * * * *